US012148078B2

(12) United States Patent
Ren et al.

(10) Patent No.: US 12,148,078 B2
(45) Date of Patent: Nov. 19, 2024

(54) SYSTEM AND METHOD OF SPATIAL GROUPS IN MULTI-USER COMMUNICATION SESSIONS

(71) Applicant: Apple Inc., Cupertino, CA (US)

(72) Inventors: Miao Ren, Sunnyvale, CA (US); Shih-Sang Chiu, Menlo Park, CA (US); Connor A. Smith, Sunnyvale, CA (US); Joseph P. Cerra, San Francisco, CA (US); Willem Mattelaer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/463,739

(22) Filed: Sep. 8, 2023

(65) Prior Publication Data

US 2024/0095984 A1 Mar. 21, 2024

Related U.S. Application Data

(60) Provisional application No. 63/514,505, filed on Jul. 19, 2023, provisional application No. 63/375,956, filed on Sep. 16, 2022.

(51) Int. Cl.
*G06T 11/60* (2006.01)
*G06T 15/20* (2011.01)

(52) U.S. Cl.
CPC .............. *G06T 11/60* (2013.01); *G06T 15/20* (2013.01)

(58) Field of Classification Search
CPC ................................ G06T 11/60; G06T 15/20
See application file for complete search history.

(56) References Cited

U.S. PATENT DOCUMENTS

| | | | |
|---|---|---|---|
| 5,515,488 | A | 5/1996 | Hoppe et al. |
| 5,524,195 | A | 6/1996 | Clanton et al. |

(Continued)

FOREIGN PATENT DOCUMENTS

| | | | |
|---|---|---|---|
| CA | 3033344 | A1 | 2/2018 |
| CN | 104714771 | A | 6/2015 |

(Continued)

OTHER PUBLICATIONS

AquaSnap Window Manager: dock, snap, tile, organize [online], Nurgo Software, Available online at: < https://www.nurgo-software.com/products/aquasnap>, [retrieved on Jun. 27, 2023], 5 pages.

(Continued)

*Primary Examiner* — Xin Sheng
(74) *Attorney, Agent, or Firm* — Kubota & Basol LLP

(57) ABSTRACT

Some examples of the disclosure are directed to systems and methods for presenting content in a three-dimensional environment by one or more electronic devices in a multi-user communication session. In some examples, a first electronic device and a second electronic device are communicatively linked in a multi-user communication session, wherein the first electronic device and the second electronic device are configured to display a three-dimensional environment, respectively. In some examples, the first electronic device and the second electronic device are grouped in a first spatial group within the multi-user communication session. In some examples, if the second electronic device determines that the first electronic device changes states (and/or vice versa), the user of the first electronic device and the user of the second electronic device are no longer grouped into the same spatial group within the multi-user communication session.

24 Claims, 27 Drawing Sheets

(56) References Cited

U.S. PATENT DOCUMENTS 5,610,828 A 3/1997 Kodosky et al.
5,737,553 A 4/1998 Bartok
5,740,440 A 4/1998 West
5,751,287 A 5/1998 Hahn et al.
5,758,122 A 5/1998 Corda et al.
5,794,178 A 8/1998 Caid et al.
5,877,766 A 3/1999 Bates et al.
5,900,849 A 5/1999 Gallery
5,933,143 A 8/1999 Kobayashi
5,990,886 A 11/1999 Serdy et al.
6,061,060 A 5/2000 Berry et al.
6,108,004 A 8/2000 Medl
6,112,015 A 8/2000 Planas et al.
6,323,846 B1 11/2001 Westerman et al.
6,456,296 B1 9/2002 Cataudella et al.
6,570,557 B1 5/2003 Westerman et al.
6,584,465 B1 6/2003 Zhu et al.
6,677,932 B1 1/2004 Westerman
6,756,997 B1 6/2004 Ward et al.
7,035,903 B1 4/2006 Baldonado
7,137,074 B1 11/2006 Newton et al.
7,230,629 B2 6/2007 Reynolds et al.
7,614,008 B2 11/2009 Ording
7,633,076 B2 12/2009 Huppi et al.
7,653,883 B2 1/2010 Hotelling et al.
7,657,849 B2 2/2010 Chaudhri et al.
7,663,607 B2 2/2010 Hotelling et al.
7,844,914 B2 11/2010 Andre et al.
7,957,762 B2 6/2011 Herz et al.
8,006,002 B2 8/2011 Kalayjian et al.
8,239,784 B2 8/2012 Hotelling et al.
8,279,180 B2 10/2012 Hotelling et al.
8,381,135 B2 2/2013 Hotelling et al.
8,479,122 B2 7/2013 Hotelling et al.
8,793,620 B2 7/2014 Stafford
8,803,873 B2 8/2014 Yoo et al.
8,947,323 B1 2/2015 Raffle et al.
8,970,478 B2 3/2015 Johansson
8,970,629 B2 3/2015 Kim et al.
8,994,718 B2 3/2015 Latta et al.
9,185,062 B1 11/2015 Yang et al.
9,348,458 B2 5/2016 Hotelling et al.
9,400,559 B2 7/2016 Latta et al.
9,448,635 B2 9/2016 Macdougall et al.
9,465,479 B2 10/2016 Cho et al.
9,563,331 B2 2/2017 Poulos et al.
9,681,112 B2 6/2017 Son
9,684,372 B2 6/2017 Xun et al.
9,778,814 B2 10/2017 Ambrus et al.
9,851,866 B2 12/2017 Goossens et al.
9,886,087 B1 2/2018 Wald et al.
9,933,833 B2 4/2018 Tu et al.
9,933,937 B2 4/2018 Lemay et al.
9,934,614 B2 4/2018 Ramsby et al.
10,049,460 B2 8/2018 Romano et al.
10,203,764 B2 2/2019 Katz et al.
10,307,671 B2 6/2019 Barney et al.
10,353,532 B1 7/2019 Holz et al.
10,534,439 B2 1/2020 Raffa et al.
10,664,048 B2 5/2020 Cieplinski et al.
10,699,488 B1 6/2020 Terrano
10,732,721 B1* 8/2020 Clements ................ B66B 1/468
10,754,434 B2 8/2020 Hall et al.
10,768,693 B2 9/2020 Powderly et al.
10,956,724 B1 3/2021 Terrano
10,983,663 B2 4/2021 Iglesias
11,055,920 B1 7/2021 Bramwell et al.
11,200,742 B1 12/2021 Post et al.
11,294,475 B1 4/2022 Pinchon et al.
11,348,300 B2 5/2022 Zimmerman et al.
2001/0047250 A1 11/2001 Schuller et al.
2002/0015024 A1 2/2002 Westerman et al.
2002/0044152 A1 4/2002 Abbott et al.
2003/0151611 A1 8/2003 Turpin et al.
2003/0222924 A1 12/2003 Baron
2004/0059784 A1 3/2004 Caughey
2004/0243926 A1 12/2004 Trenbeath et al.
2005/0100210 A1 5/2005 Rice et al.
2005/0138572 A1 6/2005 Good et al.
2005/0144570 A1 6/2005 Loverin et al.
2005/0144571 A1 6/2005 Loverin et al.
2005/0190059 A1 9/2005 Wehrenberg
2005/0198143 A1 9/2005 Moody et al.
2006/0017692 A1 1/2006 Wehrenberg et al.
2006/0033724 A1 2/2006 Chaudhri et al.
2006/0080702 A1 4/2006 Diez et al.
2006/0197753 A1 9/2006 Hotelling
2006/0283214 A1 12/2006 Donadon et al.
2008/0211771 A1 9/2008 Richardson
2009/0064035 A1 3/2009 Shibata et al.
2009/0231356 A1 9/2009 Barnes et al.
2010/0097375 A1* 4/2010 Tadaishi .................. A63F 13/63
345/420
2010/0150526 A1 6/2010 Rose et al.
2010/0188503 A1 7/2010 Tsai et al.
2011/0018895 A1 1/2011 Buzyn et al.
2011/0018896 A1 1/2011 Buzyn et al.
2011/0216060 A1 9/2011 Weising et al.
2011/0254865 A1 10/2011 Yee et al.
2011/0310001 A1 12/2011 Madau et al.
2012/0113223 A1* 5/2012 Hilliges .................. G06F 3/011
348/46
2012/0151416 A1 6/2012 Bell et al.
2012/0170840 A1 7/2012 Caruso et al.
2012/0218395 A1 8/2012 Andersen et al.
2012/0257035 A1 10/2012 Larsen
2013/0127850 A1 5/2013 Bindon
2013/0211843 A1 8/2013 Clarkson
2013/0229345 A1 9/2013 Day et al.
2013/0271397 A1 10/2013 Hildreth et al.
2013/0278501 A1 10/2013 Bulzacki
2013/0286004 A1 10/2013 Mcculloch et al.
2013/0326364 A1 12/2013 Latta et al.
2013/0342564 A1 12/2013 Kinnebrew et al.
2013/0342570 A1 12/2013 Kinnebrew et al.
2014/0002338 A1 1/2014 Raffa et al.
2014/0028548 A1 1/2014 Bychkov et al.
2014/0075361 A1 3/2014 Reynolds et al.
2014/0108942 A1 4/2014 Freeman et al.
2014/0125584 A1 5/2014 Xun et al.
2014/0198017 A1 7/2014 Lamb et al.
2014/0258942 A1 9/2014 Kutliroff et al.
2014/0282272 A1 9/2014 Kies et al.
2014/0320404 A1 10/2014 Kasahara
2014/0347391 A1 11/2014 Keane et al.
2015/0035822 A1 2/2015 Arsan et al.
2015/0035832 A1* 2/2015 Sugden ................... G06F 3/011
345/426
2015/0067580 A1 3/2015 Um et al.
2015/0123890 A1 5/2015 Kapur et al.
2015/0177937 A1 6/2015 Poletto et al.
2015/0187093 A1* 7/2015 Chu ......................... G09G 5/00
345/426
2015/0205106 A1 7/2015 Norden
2015/0227285 A1 8/2015 Lee et al.
2015/0242095 A1 8/2015 Sonnenberg
2015/0317832 A1 11/2015 Ebstyne et al.
2015/0331576 A1 11/2015 Piya et al.
2015/0332091 A1 11/2015 Kim et al.
2015/0370323 A1 12/2015 Cieplinski et al.
2016/0015470 A1 1/2016 Border
2016/0018898 A1 1/2016 Tu et al.
2016/0018900 A1 1/2016 Tu et al.
2016/0026253 A1 1/2016 Bradski et al.
2016/0062636 A1 3/2016 Jung et al.
2016/0093108 A1 3/2016 Mao et al.
2016/0098094 A1 4/2016 Minkkinen
2016/0171304 A1 6/2016 Golding et al.
2016/0196692 A1 7/2016 Kjallstrom et al.
2016/0253063 A1 9/2016 Critchlow
2016/0253821 A1 9/2016 Romano et al.
2016/0275702 A1 9/2016 Reynolds et al.
2016/0306434 A1 10/2016 Ferrin
2016/0313890 A1 10/2016 Walline et al.

(56) References Cited

U.S. PATENT DOCUMENTS

2016/0379409 A1 12/2016 Gavriliuc et al.
2017/0038829 A1 2/2017 Lanier et al.
2017/0038837 A1 2/2017 Faaborg et al.
2017/0038849 A1 2/2017 Hwang
2017/0039770 A1 2/2017 Lanier et al.
2017/0046872 A1 2/2017 Geselowitz et al.
2017/0060230 A1 3/2017 Faaborg et al.
2017/0123487 A1 5/2017 Hazra et al.
2017/0131964 A1 5/2017 Baek et al.
2017/0132694 A1 5/2017 Damy
2017/0132822 A1 5/2017 Marschke et al.
2017/0153866 A1 6/2017 Grinberg et al.
2017/0206691 A1 7/2017 Harrises et al.
2017/0228130 A1 8/2017 Palmaro
2017/0285737 A1 10/2017 Khalid et al.
2017/0315715 A1 11/2017 Fujita et al.
2017/0344223 A1 11/2017 Holzer et al.
2017/0358141 A1 12/2017 Stafford et al.
2018/0045963 A1 2/2018 Hoover et al.
2018/0075658 A1 3/2018 Lanier et al.
2018/0081519 A1 3/2018 Kim
2018/0095634 A1* 4/2018 Alexander .............. G06T 15/20
2018/0095635 A1 4/2018 Valdivia et al.
2018/0101223 A1 4/2018 Ishihara et al.
2018/0114364 A1 4/2018 Mcphee et al.
2018/0150997 A1 5/2018 Austin
2018/0158222 A1 6/2018 Hayashi
2018/0181199 A1 6/2018 Harvey et al.
2018/0188802 A1 7/2018 Okumura
2018/0210628 A1 7/2018 McPhee et al.
2018/0239144 A1* 8/2018 Woods .................. A63F 13/213
2018/0300023 A1 10/2018 Hein
2018/0315248 A1 11/2018 Bastov et al.
2018/0348861 A1 12/2018 Uscinski et al.
2019/0034076 A1 1/2019 Vinayak et al.
2019/0050062 A1 2/2019 Chen et al.
2019/0080572 A1 3/2019 Kim et al.
2019/0088149 A1 3/2019 Fink et al.
2019/0094979 A1 3/2019 Hall et al.
2019/0101991 A1 4/2019 Brennan
2019/0130633 A1 5/2019 Haddad et al.
2019/0130733 A1 5/2019 Hodge
2019/0146128 A1 5/2019 Cao et al.
2019/0204906 A1 7/2019 Ross et al.
2019/0227763 A1 7/2019 Kaufthal
2019/0258365 A1 8/2019 Zurmoehle et al.
2019/0310757 A1 10/2019 Lee et al.
2019/0324529 A1* 10/2019 Stellmach ............... G06F 3/013
2019/0362557 A1 11/2019 Lacey et al.
2019/0371072 A1 12/2019 Lindberg et al.
2019/0377487 A1 12/2019 Bailey et al.
2019/0379765 A1 12/2019 Fajt et al.
2019/0384406 A1 12/2019 Smith et al.
2020/0004401 A1 1/2020 Hwang et al.
2020/0043243 A1 2/2020 Bhushan et al.
2020/0082602 A1 3/2020 Jones
2020/0089314 A1 3/2020 Poupyrev et al.
2020/0098140 A1 3/2020 Jagnow et al.
2020/0098173 A1 3/2020 Mccall
2020/0117213 A1 4/2020 Tian et al.
2020/0159017 A1 5/2020 Lin et al.
2020/0225747 A1 7/2020 Bar-Zeev et al.
2020/0225830 A1* 7/2020 Tang ....................... G06F 3/011
2020/0226814 A1 7/2020 Tang et al.
2020/0356221 A1 11/2020 Behzadi et al.
2020/0357374 A1 11/2020 Verweij et al.
2020/0387228 A1 12/2020 Ravasz et al.
2021/0074062 A1 3/2021 Madonna et al.
2021/0090337 A1 3/2021 Ravasz et al.
2021/0096726 A1 4/2021 Faulkner et al.
2021/0191600 A1 6/2021 Lemay et al.
2021/0295602 A1 9/2021 Scapel et al.
2021/0303074 A1 9/2021 Vanblon et al.
2021/0319617 A1* 10/2021 Ahn ...................... G06T 15/205
2021/0327140 A1 10/2021 Rothkopf et al.
2021/0339134 A1 11/2021 Knoppert
2021/0350564 A1 11/2021 Peuhkurinen et al.
2021/0375022 A1* 12/2021 Lee ......................... G06T 19/00
2022/0011855 A1 1/2022 Hazra et al.
2022/0030197 A1 1/2022 Ishimoto
2022/0083197 A1* 3/2022 Rockel .................... G06F 3/011
2022/0092862 A1 3/2022 Faulkner et al.
2022/0101593 A1 3/2022 Rockel et al.
2022/0101612 A1* 3/2022 Palangie ............... G06T 19/006
2022/0121344 A1 4/2022 Pastrana Vicente et al.
2022/0137705 A1 5/2022 Hashimoto et al.
2022/0155909 A1* 5/2022 Kawashima .......... G06F 3/0481
2022/0157083 A1 5/2022 Jandhyala et al.
2022/0191570 A1 6/2022 Reid et al.
2022/0229524 A1 7/2022 Mckenzie et al.
2022/0229534 A1 7/2022 Terre et al.
2022/0245888 A1 8/2022 Singh et al.
2022/0326837 A1 10/2022 Dessero et al.
2022/0413691 A1 12/2022 Becker et al.
2023/0008537 A1 1/2023 Henderson et al.
2023/0068660 A1 3/2023 Brent et al.
2023/0074080 A1 3/2023 Miller et al.
2023/0093979 A1 3/2023 Stauber et al.
2023/0152935 A1 5/2023 Mckenzie et al.
2023/0154122 A1 5/2023 Dascola et al.
2023/0163987 A1* 5/2023 Young .................... G06V 40/20
345/419
2023/0244857 A1* 8/2023 Weiss ................... G06Q 10/109
715/230
2023/0273706 A1 8/2023 Smith et al.
2023/0274504 A1 8/2023 Ren et al.
2023/0315385 A1 10/2023 Akmal et al.
2023/0316634 A1 10/2023 Chiu et al.
2023/0325004 A1 10/2023 Burns et al.
2023/0350539 A1 11/2023 Owen et al.
2023/0384907 A1 11/2023 Boesel et al.
2024/0086031 A1 3/2024 Palangie et al.
2024/0086032 A1 3/2024 Palangie et al.
2024/0087256 A1 3/2024 Hylak et al.
2024/0094863 A1 3/2024 Smith et al.
2024/0103684 A1 3/2024 Yu et al.
2024/0103707 A1 3/2024 Henderson et al.
2024/0104836 A1 3/2024 Dessero et al.
2024/0104877 A1 3/2024 Henderson et al.
2024/0111479 A1 4/2024 Paul

FOREIGN PATENT DOCUMENTS

CN 105264461 A 1/2016
CN 105264478 A 1/2016
CN 108633307 A 10/2018
CN 110476142 A 11/2019
CN 110673718 A 1/2020
EP 2741175 A2 6/2014
EP 2947545 A1 11/2015
EP 3503101 A1 6/2019
EP 3588255 A1 1/2020
EP 3654147 A1 5/2020
JP H10-51711 A 2/1998
JP 2005-215144 A 8/2005
JP 2012-234550 A 11/2012
JP 2013-196158 A 9/2013
JP 2013-257716 A 12/2013
JP 2014-514652 A 6/2014
JP 2015-515040 A 5/2015
JP 2015-118332 A 6/2015
JP 2016-194744 A 11/2016
JP 2017-27206 A 2/2017
JP 2018-5516 A 1/2018
JP 2019-169154 A 10/2019
JP 2022-53334 A 4/2022
KR 10-2016-0012139 A 2/2016
KR 10-2019-0100957 A 8/2019
WO 2013/169849 A2 11/2013
WO 2014/105276 A1 7/2014
WO 2019/142560 A1 7/2019
WO 2020/066682 A1 4/2020

(56) References Cited

FOREIGN PATENT DOCUMENTS

| | | | |
|---|---|---|---|
| WO | 2021/202783 | A1 | 10/2021 |
| WO | 2022/066399 | A1 | 3/2022 |
| WO | 2023/141535 | A1 | 7/2023 |

OTHER PUBLICATIONS

Corrected Notice of Allowance received for U.S. Appl. No. 17/478,593, mailed on Dec. 21, 2022, 2 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Final Office Action received for U.S. Appl. No. 17/448,875, mailed on Mar. 16, 2023, 24 pages.
Home | Virtual Desktop [online], Virtual Desktop, Available online at: < https://www.vrdesktop.net>, [retrieved on Jun. 29, 2023 ], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060943, mailed on Jun. 6, 2023, 7 pages.
International Search Report received for PCT Patent Application No. PCT/US2021/049131, mailed on Dec. 21, 2021, 4 pages.
International Search Report received for PCT Patent Application No. PCT/US2021/050948, mailed on Mar. 4, 2022, 6 pages.
International Search Report received for PCT Patent Application No. PCT/US2021/065240, mailed on May 23, 2022, 6 pages.
International Search Report received for PCT Patent Application No. PCT/US2021/071595, mailed on Mar. 17, 2022, 7 pages.
International Search Report received for PCT Patent Application No. PCT/US2022/013208, mailed on Apr. 26, 2022, 7 pages.
International Search Report received for PCT Patent Application No. PCT/US2021/065242, mailed on Apr. 4, 2022, 3 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/580,495, mailed on Dec. 11, 2023, 27 pages.
Non-Final Office Action received for U.S. Appl. No. 18/182,300, mailed on Oct. 26, 2023, 29 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Restriction Requirement received for U.S. Appl. No. 17/932,999, mailed on Oct. 3, 2023, 6 pages.
Bhowmick, Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan, Dominic, "4 Virtual Reality Desktops for Vive, Rift, and Windows VR Compared", [online]. Road to VR, Available online at: < https://www.roadtovr.com/virtual-reality-desktop-compared-oculus-rift-htc-vive/>, [retrieved on Jun. 29, 2023], Jan. 3, 2018, 4 pages.
Camalich, Sergio, "CSS Buttons with Pseudo-elements", Available online at: < https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Lin et al., "Towards Naturally Grabbing and Moving Objects in VR", IS&T International Symposium on Electronic Imaging and The Engineering Reality of Virtual Reality, 2016, 6 pages.
McGill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Extended European Search Report received for European Patent Application No. 23197572.3, mailed on Feb. 19, 2024, 7 pages.
Final Office Action received for U.S. Appl. No. 17/580,495, mailed on May 13, 2024, 29 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/305,201, mailed on May 23, 2024, 11 pages.
Notice of Allowance received for U.S. Appl. No. 17/659,147, mailed on May 29, 2024, 13 pages.
Notice of Allowance received for U.S. Appl. No. 18/154,757, mailed on May 10, 2024, 12 pages.
Corrected Notice of Allowability received for U.S. Appl. No. 17/448,875, mailed on Apr. 24, 2024, 4 pages.
Corrected Notice of Allowability received for U.S. Patent Application No. 17/659, 147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/465,098, mailed on Mar. 13, 2024, 3 pages.
European Search Report received for European Patent Application No. 21791153.6, mailed on Mar. 22, 2024, 5 pages.
Final Office Action received for U.S. Appl. No. 17/659,147, mailed on Oct. 4, 2023, 17 pages.
Final Office Action received for U.S. Appl. No. 18/182,300, mailed on Feb. 16, 2024, 32 pages.
International Search Report received for PCT Patent Application No. PCT/US2021/071596, mailed on Apr. 8, 2022, 7 pages.
International Search Report received for PCT Patent Application No. PCT/US2022/071704, mailed on Aug. 26, 2022, 6 pages.
International Search Report received for PCT Patent Application No. PCT/US2023/074257, mailed on Nov. 21, 2023, 5 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Notice of Allowance received for U.S. Appl. No. 17/448,875, mailed on Apr. 17, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/659,147, mailed on Jan. 26, 2024, 13 pages.
Notice of Allowance received for U.S. Appl. No. 17/932,655, mailed on Jan. 24, 2024, 7 pages.

(56) References Cited

OTHER PUBLICATIONS

Notice of Allowance received for U.S. Appl. No. 17/932,655, mailed on Sep. 29, 2023, 7 pages.
Notice of Allowance received for U.S. Appl. No. 18/154,757, mailed on Jan. 23, 2024, 10 pages.
Notice of Allowance received for U.S. Appl. No. 18/421,675, mailed on Apr. 11, 2024, 9 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Search Report received for Chinese Patent Application No. 202310873465.7, mailed on Feb. 1, 2024, 5 pages (2 pages of English Translation and 3 pages of Official Copy).

* cited by examiner

700

702 — While in a communication session with a second electronic device, display, via a display, a computer-generated environment including an avatar corresponding to a user of the second electronic device

704 — While displaying the computer-generated environment including the avatar corresponding to the user of the second electronic device, receive, via one or more input devices, a first input corresponding to a request to display content in the computer-generated environment

706 — In response to receiving the first input:

708 — In accordance with a determination that the content is a first type of content:

710 — Display, via the display, a first object corresponding to the content in the computer-generated environment

712 — Replace display of the avatar corresponding to the user of the second electronic device with a two-dimensional representation of the user of the second electronic device

714 — In accordance with a determination that the content is a second type of content, different from the first type of content, concurrently display, via the display, the first object corresponding to the content and the avatar corresponding to the user of the second electronic device in the computer-generated environment

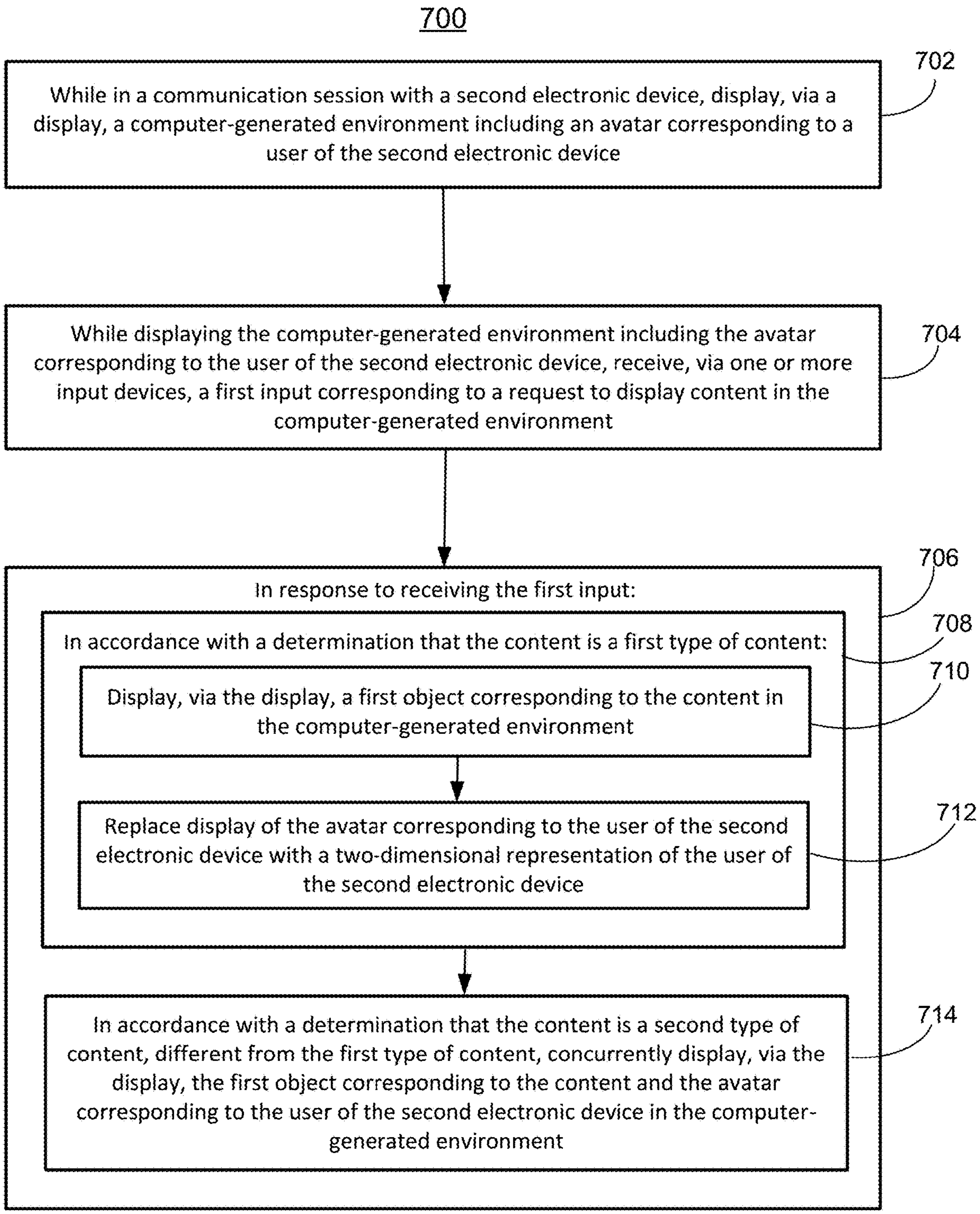

FIG. 7

SYSTEM AND METHOD OF SPATIAL GROUPS IN MULTI-USER COMMUNICATION SESSIONS

CROSS-REFERENCE TO RELATED APPLICATIONS

This application claims priority to U.S. Provisional Application No. 63/375,956, filed Sep. 16, 2022, and U.S. Provisional Application No. 63/514,505, filed Jul. 19, 2023, the contents of which are herein incorporated by reference in their entireties for all purposes

FIELD OF THE DISCLOSURE

This relates generally to systems and methods of spatial groups within multi-user communication sessions.

BACKGROUND OF THE DISCLOSURE

Some computer graphical environments provide two-dimensional and/or three-dimensional environments where at least some objects displayed for a user's viewing are virtual and generated by a computer. In some examples, the three-dimensional environments are presented by multiple devices communicating in a multi-user communication session. In some examples, an avatar (e.g., a representation) of each user participating in the multi-user communication session (e.g., via the computing devices) is displayed in the three-dimensional environment of the multi-user communication session. In some examples, content can be shared in the three-dimensional environment for viewing and interaction by multiple users participating in the multi-user communication session.

SUMMARY OF THE DISCLOSURE

Some examples of the disclosure are directed to systems and methods for presenting content in a three-dimensional environment by one or more electronic devices in a multi-user communication session. In some examples, a first electronic device and a second electronic device are communicatively linked in a multi-user communication session, wherein the first electronic device and the second electronic device are configured to display a three-dimensional environment, respectively. In some examples, the first electronic device and the second electronic device are grouped in a first spatial group within the multi-user communication session. In some examples, the first electronic device displays an avatar corresponding to a user of the second electronic device in the three-dimensional environment, and the second electronic device displays an avatar corresponding to a user of the first electronic device in the three-dimensional environment. In some examples, an audio corresponding to a voice of the user of the first electronic device and the second electronic device, respectively, is presented with the avatar in the multi-user communication session. In some examples, the first electronic device and the second electronic device may share and present content in the three-dimensional environment. In some examples, if the second electronic device determines that the first electronic device changes states (and/or vice versa), the user of the first electronic device and the user of the second electronic device are no longer grouped into the same spatial group within the multi-user communication session. In some examples, when the users of the electronic devices are grouped into separate spatial groups in the multi-user communication session, the first electronic device replaces display of the avatar corresponding to the user of the second electronic device with a two-dimensional representation of the user of the second electronic device, and the second electronic device replaces display of the avatar corresponding to the user of the first electronic device with a two-dimensional representation of the user of the first electronic device.

In some examples, while the first electronic device and the second electronic device are communicatively linked and grouped into a first spatial group (e.g., a baseline spatial group) within the multi-user communication session, the determination that one of the electronic devices has changed states is based on a manner in which the avatars and/or content is displayed in the shared three-dimensional environment. In some examples, while the avatars corresponding to the users of the first electronic device and the second electronic device are displayed, if the first electronic device activates an audio mode, which causes the avatar corresponding to the user of the first electronic device to no longer be displayed at the second electronic device, the first electronic device and the second electronic device are no longer operating in the same state. Accordingly, the user of the first electronic device is grouped into a second spatial group (e.g., an audio-only spatial group), separate from the first spatial group. In some examples, if the first electronic device displays content that is private and exclusive to the user of the first electronic device, the first electronic device and the second electronic device are no longer operating in the same state, which causes the user of the first electronic device to be grouped into a second spatial group (e.g., a private exclusive spatial group), separate from the first spatial group. In some examples, while the first electronic device and the second electronic device are displaying shared content in the three-dimensional environment, if the first electronic device displays the shared content in a full-screen mode, the first electronic device and the second electronic device are no longer operating in the same state. Accordingly, the user of the first electronic device is grouped into a second spatial group (e.g., a shared exclusive spatial group), separate from the first spatial group.

In some examples, a spatial group in the multi-user communication session has a spatial arrangement that dictates locations of users and content that are located in the spatial group. In some examples, users in the same spatial group within the multi-user communication session experience spatial truth according to the spatial arrangement of the spatial group. In some examples, when the user of the first electronic device is in a first spatial group and the user of the second electronic device is in a second spatial group in the multi-user communication session, the users experience spatial truth that is localized to their respective spatial groups. In some examples, while the user of the first electronic device and the user of the second electronic device are grouped into separate spatial groups within the multi-user communication session, if the first electronic device and the second electronic device return to the same operating state, the user of the first electronic device and the user of the second electronic device are regrouped into the same spatial group within the multi-user communication session.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 7 illustrates a flow diagram illustrating an example process for displaying content in a spatial group within a multi-user communication session according to some examples of the disclosure.

DETAILED DESCRIPTION

Figure 1:
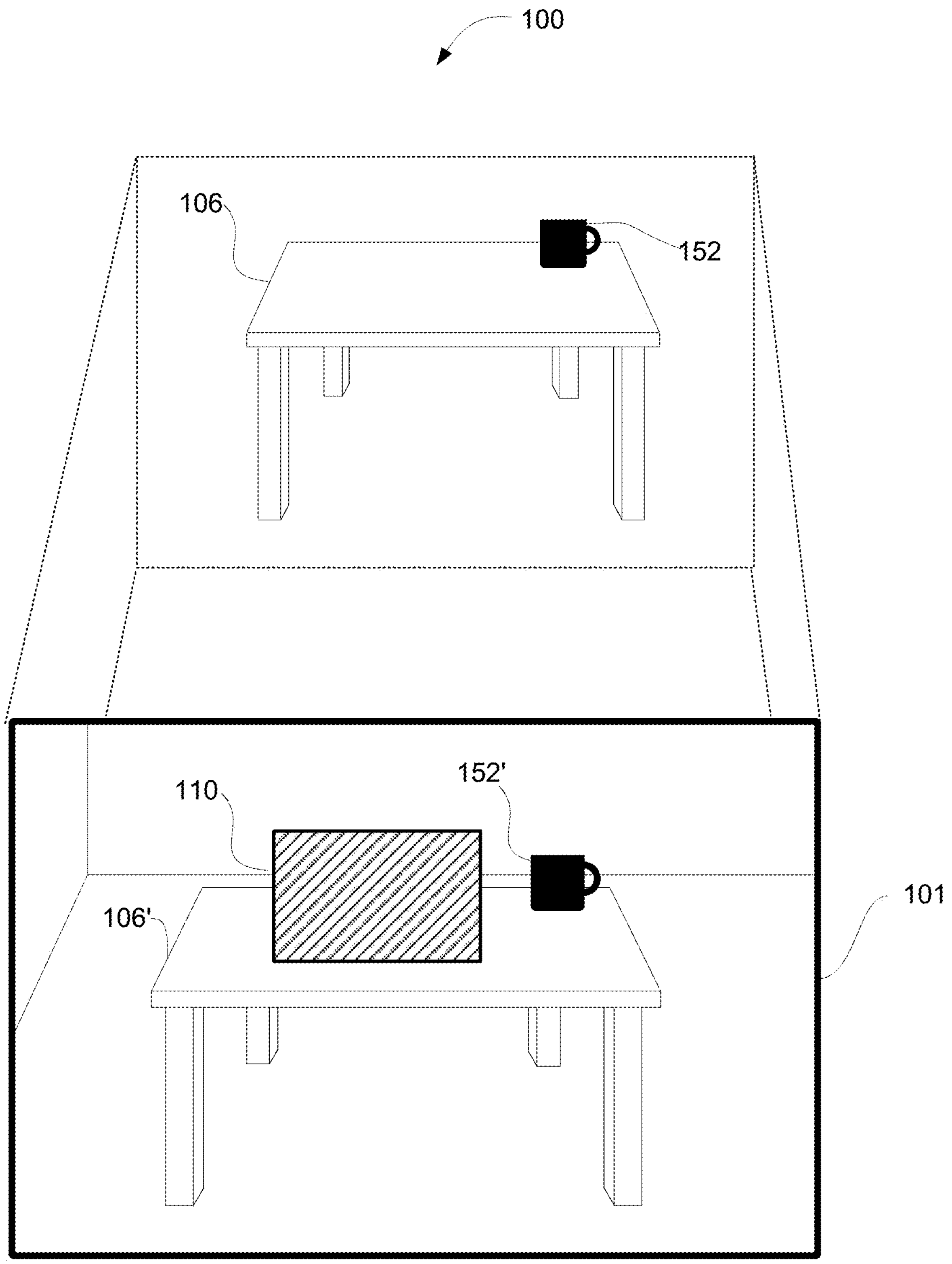
FIG. 1 illustrates an electronic device presenting an extended reality environment according to some examples of the disclosure.

Some examples of the disclosure are directed to systems and methods for presenting content in a three-dimensional environment by one or more electronic devices in a multi-user communication session. In some examples, a first electronic device and a second electronic device are communicatively linked in a multi-user communication session, wherein the first electronic device and the second electronic device are configured to display a three-dimensional environment, respectively. In some examples, the first electronic device and the second electronic device are grouped in a first spatial group within the multi-user communication session. In some examples, the first electronic device displays an avatar corresponding to a user of the second electronic device in the three-dimensional environment, and the second electronic device displays an avatar corresponding to a user of the first electronic device in the three-dimensional environment. In some examples, an audio corresponding to a voice of the user of the first electronic device and the second electronic device, respectively, is presented with the avatar in the multi-user communication session. In some examples, the first electronic device and the second electronic device may share and present content in the three-dimensional environment. In some examples, if the second electronic device determines that the first electronic device changes states (and/or vice versa), the user of the first electronic device and the user of the second electronic device are no longer grouped into the same spatial group within the multi-user communication session. In some examples, when the users of the electronic devices are grouped into separate spatial groups in the multi-user communication session, the first electronic device replaces display of the avatar corresponding to the user of the second electronic device with a two-dimensional representation of the user of the second electronic device, and the second electronic device replaces display of the avatar corresponding to the user of the first electronic device with a two-dimensional representation of the user of the first electronic device.

In some examples, while the first electronic device and the second electronic device are communicatively linked and grouped into a first spatial group (e.g., a baseline spatial group) within the multi-user communication session, the determination that one of the electronic devices has changed states is based on a manner in which the avatars and/or content is displayed in the shared three-dimensional environment. In some examples, while the avatars corresponding to the users of the first electronic device and the second electronic device are displayed, if the first electronic device activates an audio mode, which causes the avatar corresponding to the user of the first electronic device to no longer be displayed at the second electronic device, the first electronic device and the second electronic device are no longer operating in the same state. Accordingly, the user of the first electronic device is grouped into a second spatial group (e.g., an audio-only spatial group), separate from the first spatial group. In some examples, if the first electronic device displays content that is private and exclusive to the user of the first electronic device, the first electronic device and the second electronic device are no longer operating in the same state, which causes the user of the first electronic device to be grouped into a second spatial group (e.g., a private exclusive spatial group), separate from the first spatial group. In some examples, while the first electronic device and the second electronic device are displaying shared content in the three-dimensional environment, if the first electronic device displays the shared content in a full-screen mode, the first electronic device and the second electronic device are no longer operating in the same state. Accordingly, the user of the first electronic device is grouped into a second spatial group (e.g., a shared exclusive spatial group), separate from the first spatial group.

In some examples, a spatial group in the multi-user communication session has a spatial arrangement that dictates locations of users and content that are located in the spatial group. In some examples, users in the same spatial group within the multi-user communication session experience spatial truth according to the spatial arrangement of the spatial group. In some examples, when the user of the first electronic device is in a first spatial group and the user of the second electronic device is in a second spatial group in the multi-user communication session, the users experience spatial truth that is localized to their respective spatial groups. In some examples, while the user of the first electronic device and the user of the second electronic device are grouped into separate spatial groups within the multi-user communication session, if the first electronic device and the second electronic device return to the same operating state, the user of the first electronic device and the user of the second electronic device are regrouped into the same spatial group within the multi-user communication session.

In some examples, displaying content in the three-dimensional environment while in the multi-user communication session may include interaction with one or more user interface elements. In some examples, a user's gaze may be tracked by the electronic device as an input for targeting a selectable option/affordance within a respective user interface element that is displayed in the three-dimensional environment. For example, gaze can be used to identify one or more options/affordances targeted for selection using another selection input. In some examples, a respective option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of device 101 are described below with reference to the architecture block diagram of FIG. 2. As shown in FIG. 1, electronic device 101, table 106, and coffee mug 152 are located in the physical environment 100. The physical environment may include physical features such as a physical surface (e.g., floor, walls) or a physical object (e.g., table, lamp, etc.). In some examples, electronic device 101 may be configured to capture images of physical environment 100 including table 106 and coffee mug 152 (illustrated in the field of view of electronic device 101). In some examples, in response to a trigger, the electronic device 101 may be configured to display a virtual object 110 (e.g., two-dimensional virtual content) in the computer-generated environment (e.g., represented by a rectangle illustrated in FIG. 1) that is not present in the physical environment 100, but is displayed in the computer-generated environment positioned on (e.g., anchored to) the top of a computer-generated representation 106' of real-world table 106. For example, virtual object 110 can be displayed on the surface of the computer-generated representation 106' of the table in the computer-generated environment next to the computer-generated representation 152' of real-world coffee mug 152 displayed via device 101 in response to detecting the planar surface of table 106 in the physical environment 100.

It should be understood that virtual object 110 is a representative virtual object and one or more different virtual objects (e.g., of various dimensionality such as two-dimensional or three-dimensional virtual objects) can be included and rendered in a three-dimensional computer-generated environment. For example, the virtual object can represent an application, or a user interface displayed in the computer-generated environment. In some examples, the virtual object can represent content corresponding to the application and/or displayed via the user interface in the computer-generated environment. In some examples, the virtual object 110 is optionally configured to be interactive and responsive to user input, such that a user may virtually touch, tap, move, rotate, or otherwise interact with, the virtual object. In some examples, the virtual object 110 may be displayed in a three-dimensional computer-generated environment within a multi-user communication session ("multi-user communication session," "communication session"). In some such examples, as described in more detail below, the virtual object 110 may be viewable and/or configured to be interactive and responsive to multiple users and/or user input provided by multiple users, respectively. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display, and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
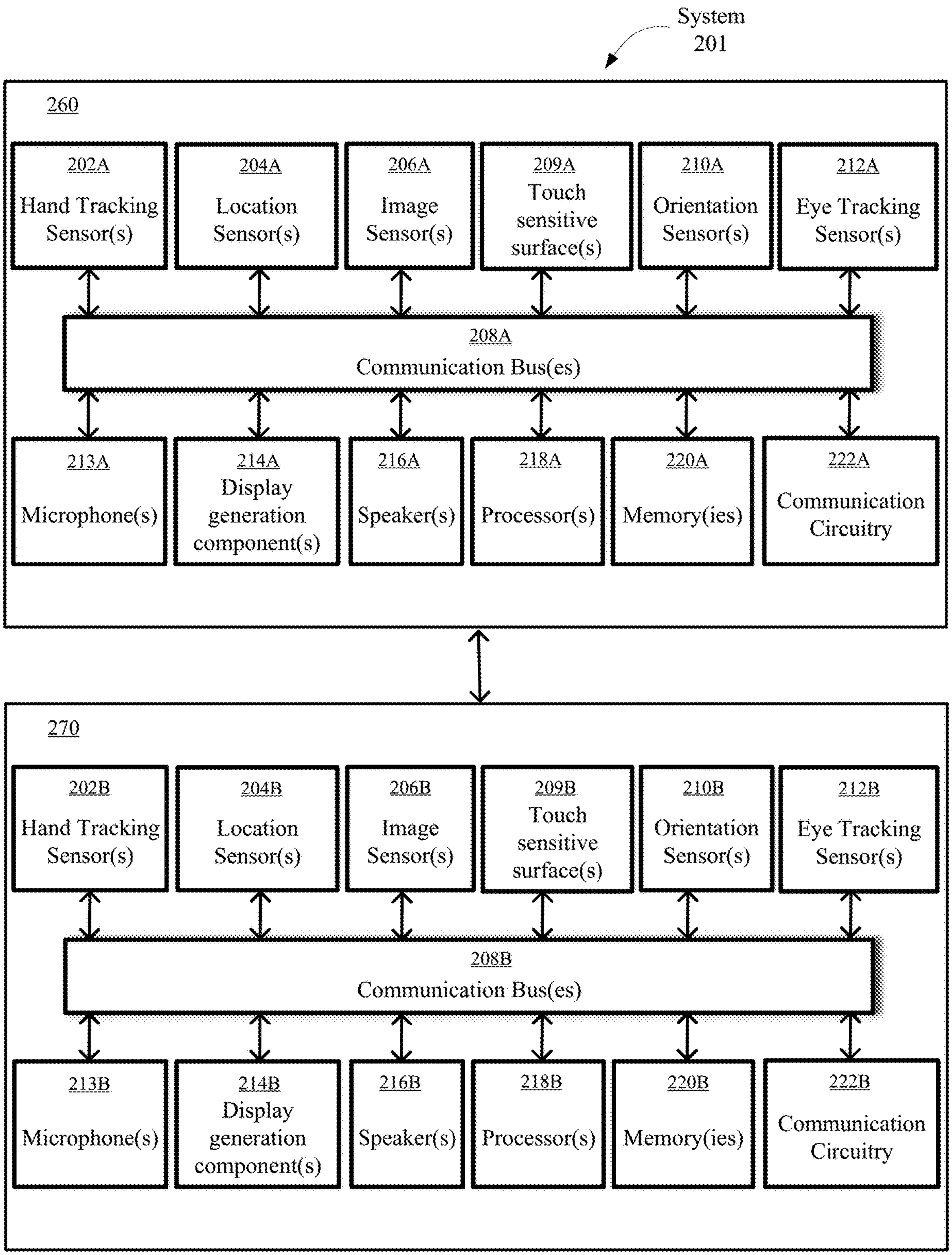
FIG. 2 illustrates a block diagram of an exemplary architecture for a system according to some examples of the disclosure.

FIG. 2 illustrates a block diagram of an exemplary architecture for a system 201 according to some examples of the disclosure. In some examples, system 201 includes multiple devices. For example, the system 201 includes a first electronic device 260 and a second electronic device 270, wherein the first electronic device 260 and the second electronic device 270 are in communication with each other. In some examples, the first electronic device 260 and the second electronic device 270 are a portable device, such as a mobile phone, smart phone, a tablet computer, a laptop computer, an auxiliary device in communication with another device, etc., respectively.

As illustrated in FIG. 2, the first device 260 optionally includes various sensors (e.g., one or more hand tracking sensor(s) 202A, one or more location sensor(s) 204A, one or more image sensor(s) 206A, one or more touch-sensitive surface(s) 209A, one or more motion and/or orientation sensor(s) 210A, one or more eye tracking sensor(s) 212A, one or more microphone(s) 213A or other audio sensors, etc.), one or more display generation component(s) 214A, one or more speaker(s) 216A, one or more processor(s) 218A, one or more memories 220A, and/or communication circuitry 222A. In some examples, the second device 270 optionally includes various sensors (e.g., one or more hand tracking sensor(s) 202B, one or more location sensor(s) 204B, one or more image sensor(s) 206B, one or more touch-sensitive surface(s) 209B, one or more motion and/or orientation sensor(s) 210B, one or more eye tracking sensor(s) 212B, one or more microphone(s) 213B or other audio sensors, etc.), one or more display generation component(s) 214B, one or more speaker(s) 216, one or more processor(s) 218B, one or more memories 220B, and/or communication circuitry 222B. One or more communication buses 208A and 208B are optionally used for communication between the above-mentioned components of devices 260 and 270, respectively. First device 260 and second device 270 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, a transparent or translucent display, etc. In some examples, devices 260 and 270 include touch-sensitive surface(s) 209A and 209B, respectively, for receiving user inputs, such as tap inputs and swipe inputs or other gestures. In some examples, display generation component(s) 214A, 214B and touch-sensitive surface(s) 209A, 209B form touch-sensitive display(s) (e.g., a touch screen integrated with devices 260 and 270, respectively, or external to devices 260 and 270, respectively, that is in communication with devices 260 and 270).

Devices 260 and 270 optionally include image sensor(s) 206A and 206B, respectively. Image sensors(s) 206A/206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A/206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A/206B also optionally include one or more cameras configured to capture movement of physical objects in the real-world environment. Image sensor(s) 206A/206B also optionally include one or more depth sensors configured to detect the distance of physical objects from device 260/270. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, devices 260 and 270 use CCD sensors, event cameras, and depth sensors in combination to detect the physical environment around devices 260 and 270. In some examples, image sensor(s) 206A/206B include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, device 260/270 uses image sensor(s) 206A/206B to detect the position and orientation of device 260/270 and/or display generation component(s) 214A/214B in the real-world environment. For example, device 260/270 uses image sensor(s) 206A/206B to track the position and orientation of display generation component(s) 214A/214B relative to one or more fixed objects in the real-world environment.

In some examples, device 260/270 includes microphone(s) 213A/213B or other audio sensors. Device 260/270 uses microphone(s) 213A/213B to detect sound from the user and/or the real-world environment of the user. In some examples, microphone(s) 213A/213B includes an array of microphones (a plurality of microphones) that optionally operate in tandem, such as to identify ambient noise or to locate the source of sound in space of the real-world environment.

In some examples, device 260/270 includes location sensor(s) 204A/204B for detecting a location of device 260/270 and/or display generation component(s) 214A/214B. For example, location sensor(s) 204A/204B can include a GPS receiver that receives data from one or more satellites and allows device 260/270 to determine the device's absolute position in the physical world.

In some examples, device 260/270 includes orientation sensor(s) 210A/210B for detecting orientation and/or movement of device 260/270 and/or display generation component(s) 214A/214B. For example, device 260/270 uses orientation sensor(s) 210A/210B to track changes in the position and/or orientation of device 260/270 and/or display generation component(s) 214A/214B, such as with respect to physical objects in the real-world environment. Orientation sensor(s) 210A/210B optionally include one or more gyroscopes and/or one or more accelerometers.

Device 260/270 includes hand tracking sensor(s) 202A/202B and/or eye tracking sensor(s) 212A/212B, in some examples. Hand tracking sensor(s) 202A/202B are configured to track the position/location of one or more portions of the user's hands, and/or motions of one or more portions of the user's hands with respect to the extended reality environment, relative to the display generation component(s) 214A/214B, and/or relative to another defined coordinate system. Eye tracking sensor(s) 212A/212B are configured to track the position and movement of a user's gaze (eyes, face, or head, more generally) with respect to the real-world or extended reality environment and/or relative to the display generation component(s) 214A/214B. In some examples, hand tracking sensor(s) 202A/202B and/or eye tracking sensor(s) 212A/212B are implemented together with the display generation component(s) 214A/214B. In some examples, the hand tracking sensor(s) 202A/202B and/or eye tracking sensor(s) 212A/212B are implemented separate from the display generation component(s) 214A/214B.

In some examples, the hand tracking sensor(s) 202A/202B can use image sensor(s) 206A/206B (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some examples, one or more image sensor(s) 206A/206B are positioned relative to the user to define a field of view of the image sensor(s) 206A/206B and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212A/212B includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by a respective eye tracking camera/illumination source(s).

Device 260/270 and system 201 are not limited to the components and configuration of FIG. 2, but can include fewer, other, or additional components in multiple configurations. In some examples, system 201 can be implemented in a single device. A person or persons using system 201, is optionally referred to herein as a user or users of the device(s). Attention is now directed towards exemplary concurrent displays of a three-dimensional environment on a first electronic device (e.g., corresponding to device 260) and a second electronic device (e.g., corresponding to device 270). As discussed below, the first electronic device may be in communication with the second electronic device in a multi-user communication session. In some examples, an avatar (e.g., a representation of) a user of the first electronic device may be displayed in the three-dimensional environment at the second electronic device, and an avatar of a user of the second electronic device may be displayed in the three-dimensional environment at the first electronic device. In some examples, the user of the first electronic device and the user of the second electronic device may be associated with a spatial group in the multi-user communication session. In some examples, interactions with content in the three-dimensional environment while the first electronic device and the second electronic device are in the multi-user communication session may cause the user of the first electronic device and the user of the second electronic device to become associated with different spatial groups in the multi-user communication session.

Figure 3:
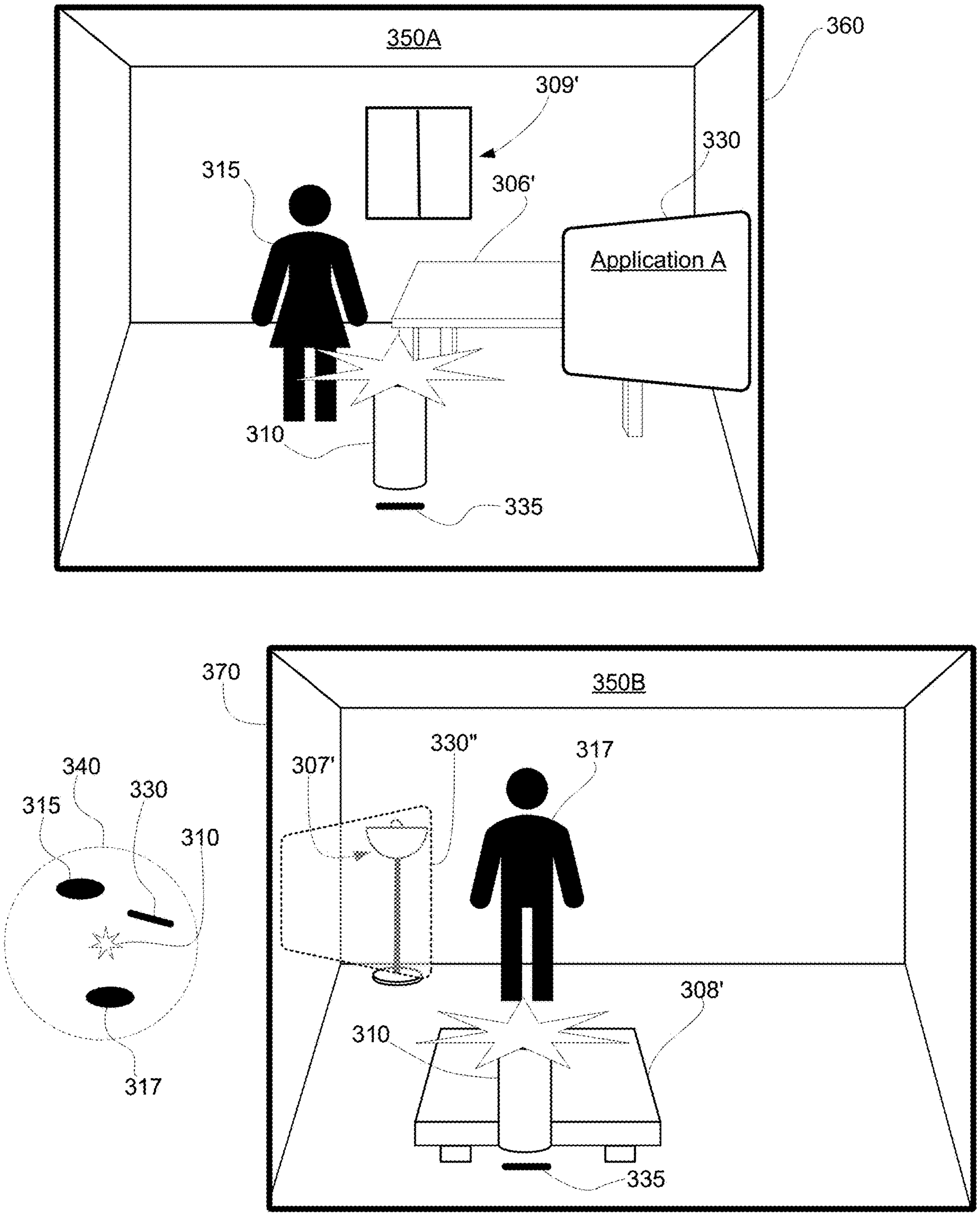
FIG. 3 illustrates an example of a spatial group in a multi-user communication session that includes a first electronic device and a second electronic device according to some examples of the disclosure.

FIG. 3 illustrates an example of a spatial group 340 in a multi-user communication session that includes a first electronic device 360 and a second electronic device 370 according to some examples of the disclosure. In some examples, the first electronic device 360 may present a three-dimensional environment 350A, and the second electronic device 370 may present a three-dimensional environment 350B. The first electronic device 360 and the second electronic device 370 may be similar to device 101 or 260/270, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses), respectively. In the example of FIG. 3, a first user is optionally wearing the first electronic device 360 and a second user is optionally wearing the second electronic device 370, such that the three-dimensional environment 350A/350B can be defined by X, Y and Z axes as viewed from a perspective of the electronic devices (e.g., a viewpoint associated with the electronic device 360/370, which may be a head-mounted display, for example).

As shown in FIG. 3, the first electronic device 360 may be in a first physical environment that includes a table 306 and a window 309. Thus, the three-dimensional environment 350A presented using the first electronic device 360 optionally includes captured portions of the physical environment surrounding the first electronic device 360, such as a representation of the table 306' and a representation of the window 309'. Similarly, the second electronic device 370 may be in a second physical environment, different from the first physical environment (e.g., separate from the first physical environment), that includes a floor lamp 307 and a coffee table 308. Thus, the three-dimensional environment 350B presented using the second electronic device 370 optionally includes captured portions of the physical environment surrounding the second electronic device 370, such as a representation of the floor lamp 307' and a representation of the coffee table 308'. Additionally, the three-dimensional environments 350A and 350B may include representations of the floor, ceiling, and walls of the room in which the first electronic device 360 and the second electronic device 370, respectively, are located.

As mentioned above, in some examples, the first electronic device 360 is optionally in a multi-user communication session with the second electronic device 370. For example, the first electronic device 360 and the second electronic device 370 (e.g., via communication circuitry 222A/222B) are configured to present a shared three-dimensional environment 350A/350B that includes one or more shared virtual objects (e.g., content such as images, video, audio and the like, representations of user interfaces of applications, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices. In some examples, while the first electronic device 360 is in the multi-user communication session with the second electronic device 370, an avatar corresponding to the user of one electronic device is optionally displayed in the three-dimensional environment that is displayed via the other electronic device. For example, as shown in FIG. 3, at the first electronic device 360, an avatar 315 corresponding to the user of the second electronic device 370 is displayed in the three-dimensional environment 350A. Similarly, at the second electronic device 370, an avatar 317 corresponding to the user of the first electronic device 360 is displayed in the three-dimensional environment 350B.

In some examples, the presentation of avatars 315/317 as part of a shared three-dimensional environment is optionally accompanied by an audio effect corresponding to a voice of the users of the electronic devices 370/360. For example, the avatar 315 displayed in the three-dimensional environment 350A using the first electronic device 360 is optionally accompanied by an audio effect corresponding to the voice of the user of the second electronic device 370. In some such examples, when the user of the second electronic device 370 speaks, the voice of the user may be detected by the second electronic device 370 (e.g., via the microphone(s) 213B) and transmitted to the first electronic device 360 (e.g., via the communication circuitry 222B/222A), such that the detected voice of the user of the second electronic device 370 may be presented as audio (e.g., using speaker(s) 216A) to the user of the first electronic device 360 in three-dimensional environment 350A. In some examples, the audio effect corresponding to the voice of the user of the second electronic device 370 may be spatialized such that it appears to the user of the first electronic device 360 to emanate from the location of avatar 315 in the shared three-dimensional environment 350A (e.g., despite being outputted from the speakers of the first electronic device 360). Similarly, the avatar 317 displayed in the three-dimensional environment 350B using the second electronic device 370 is optionally accompanied by an audio effect corresponding to the voice of the user of the first electronic device 360. In some such examples, when the user of the first electronic device 360 speaks, the voice of the user may be detected by the first electronic device 360 (e.g., via the microphone(s) 213A) and transmitted to the second electronic device 370 (e.g., via the communication circuitry 222A/222B), such that the detected voice of the user of the first electronic device 360 may be presented as audio (e.g., using speaker(s) 216B) to the user of the second electronic device 370 in three-dimensional environment 350B. In some examples, the audio effect corresponding to the voice of the user of the first electronic device 360 may be spatialized such that it appears to the user of the second electronic device 370 to emanate from the location of avatar 317 in the shared three-dimensional environment 350B (e.g., despite being outputted from the speakers of the first electronic device 360).

In some examples, while in the multi-user communication session, the avatars 315/317 are displayed in the three-dimensional environments 350A/350B with respective orientations that correspond to and/or are based on orientations of the electronic devices 360/370 (and/or the users of electronic devices 360/370) in the physical environments surrounding the electronic devices 360/370. For example, as shown in FIG. 3, in the three-dimensional environment 350A, the avatar 315 is optionally facing toward the viewpoint of the user of the first electronic device 360, and in the three-dimensional environment 350B, the avatar 317 is optionally facing toward the viewpoint of the user of the second electronic device 370. As a particular user moves the electronic device (and/or themself) in the physical environment, the viewpoint of the user changes in accordance with the movement, which may thus also change an orientation of the user's avatar in the three-dimensional environment. For example, with reference to FIG. 3, if the user of the first electronic device 360 were to look leftward in the three-dimensional environment 350A such that the first electronic device 360 is rotated (e.g., a corresponding amount) to the left (e.g., counterclockwise), the user of the second electronic device 370 would see the avatar 317 corresponding to the user of the first electronic device 360 rotate to the right (e.g., clockwise) relative to the viewpoint of the user of the second electronic device 370 in accordance with the movement of the first electronic device 360.

Additionally, in some examples, while in the multi-user communication session, a viewpoint of the three-dimensional environments 350A/350B and/or a location of the viewpoint of the three-dimensional environments 350A/350B optionally changes in accordance with movement of the electronic devices 360/370 (e.g., by the users of the electronic devices 360/370). For example, while in the communication session, if the first electronic device 360 is moved closer toward the representation of the table 306' and/or the avatar 315 (e.g., because the user of the first electronic device 360 moved forward in the physical environment surrounding the first electronic device 360), the viewpoint of the three-dimensional environment 350A would change accordingly, such that the representation of the table 306', the representation of the window 309' and the avatar 315 appear larger in the field of view. In some examples, each user may independently interact with the three-dimensional environment 350A/350B, such that changes in viewpoints of the three-dimensional environment 350A and/or interactions with virtual objects in the three-dimensional environment 350A by the first electronic device 360 optionally do not affect what is shown in the three-dimensional environment 350B at the second electronic device 370, and vice versa.

In some examples, the avatars 315/317 are a representation (e.g., a full-body rendering) of the users of the electronic devices 370/360. In some examples, the avatar 315/317 is a representation of a portion (e.g., a rendering of a head, face, head and torso, etc.) of the users of the electronic devices 370/360. In some examples, the avatars 315/317 are a user-personalized, user-selected, and/or user-created representation displayed in the three-dimensional environments 350A/350B that is representative of the users of the electronic devices 370/360. It should be understood that, while the avatars 315/317 illustrated in FIG. 3 correspond to full-body representations of the users of the electronic devices 370/360, respectively, alternative avatars may be provided, such as those described above.

As mentioned above, while the first electronic device 360 and the second electronic device 370 are in the multi-user communication session, the three-dimensional environments 350A/350B may be a shared three-dimensional environment that is presented using the electronic devices 360/370. In some examples, content that is viewed by one user at one electronic device may be shared with another user at another electronic device in the multi-user communication session. In some such examples, the content may be experienced (e.g., viewed and/or interacted with) by both users (e.g., via their respective electronic devices) in the shared three-dimensional environment. For example, as shown in FIG. 3, the three-dimensional environments 350A/350B include a shared virtual object 310 (e.g., which is optionally a three-dimensional virtual sculpture) that is viewable by and interactive to both users. As shown in FIG. 3, the shared virtual object 310 may be displayed with a grabber affordance (e.g., a handlebar) 335 that is selectable to initiate movement of the shared virtual object 310 within the three-dimensional environments 350A/350B.

In some examples, the three-dimensional environments 350A/350B include unshared content that is private to one user in the multi-user communication session. For example, in FIG. 3, the first electronic device 360 is displaying a private application window 330 in the three-dimensional environment 350A, which is optionally an object that is not shared between the first electronic device 360 and the second electronic device 370 in the multi-user communication session. In some examples, the private application window 330 may be associated with a respective application that is operating on the first electronic device 360 (e.g., such as a media player application, a web browsing application, a messaging application, etc.). Because the private application window 330 is not shared with the second electronic device 370, the second electronic device 370 optionally displays a representation of the private application window 330" in three-dimensional environment 350B. As shown in FIG. 3, in some examples, the representation of the private application window 330" may be a faded, occluded, discolored, and/or translucent representation of the private application window 330 that prevents the user of the second electronic device 370 from viewing contents of the private application window 330.

As mentioned previously above, in some examples, the user of the first electronic device 360 and the user of the second electronic device 370 are in a spatial group 340 within the multi-user communication session. In some examples, the spatial group 340 may be a baseline (e.g., a first or default) spatial group within the multi-user communication session. For example, when the user of the first electronic device 360 and the user of the second electronic device 370 initially join the multi-user communication session, the user of the first electronic device 360 and the user of the second electronic device 370 are automatically (and initially, as discussed in more detail below) associated with (e.g., grouped into) the spatial group 340 within the multi-user communication session. In some examples, while the users are in the spatial group 340 as shown in FIG. 3, the user of the first electronic device 360 and the user of the second electronic device 370 have a first spatial arrangement (e.g., first spatial template) within the shared three-dimensional environment. For example, the user of the first electronic device 360 and the user of the second electronic device 370, including objects that are displayed in the shared three-dimensional environment, have spatial truth within the spatial group 340. In some examples, spatial truth requires a consistent spatial arrangement between users (or representations thereof) and virtual objects. For example, a distance between the viewpoint of the user of the first electronic device 360 and the avatar 315 corresponding to the user of the second electronic device 370 may be the same as a distance between the viewpoint of the user of the second electronic device 370 and the avatar 317 corresponding to the user of the first electronic device 360. As described herein, if the location of the viewpoint of the user of the first electronic device 360 moves, the avatar 317 corresponding to the user of the first electronic device 360 moves in the three-dimensional environment 350B in accordance with the movement of the location of the viewpoint of the user relative to the viewpoint of the user of the second electronic device 370. Additionally, if the user of the first electronic device 360 performs an interaction on the shared virtual object 310 (e.g., moves the virtual object 310 in the three-dimensional environment 350A), the second electronic device 370 alters display of the shared virtual object 310 in the three-dimensional environment 350B in accordance with the interaction (e.g., moves the virtual object 310 in the three-dimensional environment 350B).

It should be understood that, in some examples, more than two electronic devices may be communicatively linked in a multi-user communication session. For example, in a situation in which three electronic devices are communicatively linked in a multi-user communication session, a first electronic device would display two avatars, rather than just one avatar, corresponding to the users of the other two electronic devices. It should therefore be understood that the various processes and exemplary interactions described herein with reference to the first electronic device 360 and the second electronic device 370 in the multi-user communication session optionally apply to situations in which more than two electronic devices are communicatively linked in a multi-user communication session.

In some examples, it may be advantageous to selectively control the display of the avatars corresponding to the users of electronic devices that are communicatively linked in a multi-user communication session. For example, as described herein, content may be shared and presented in the three-dimensional environment such that the content is optionally viewable by and/or interactive to multiple users in the multi-user communication session. As discussed above, the three-dimensional environment optionally includes avatars corresponding to the users of the electronic devices that are in the communication session. In some instances, the presentation of the content in the three-dimensional environment with the avatars corresponding to the users of the electronic devices may cause portions of the content to be blocked or obscured from a viewpoint of one or more users in the multi-user communication session and/or may distract one or more users in the multi-user communication session. In some examples, the presentation of the content and/or a change in the presentation of the content in the three-dimensional environment corresponds to a change of a state of a first electronic device presenting the content. In some examples, in response to detecting the change of the state of the first electronic device, the user of the first electronic device becomes associated with a second spatial group that is separate from the baseline spatial group (e.g., 340) discussed above in the multi-user communication session. Additionally, in some examples, it may be advantageous to, when the users of the electronic devices are associated with different spatial groups within the multi-user communication session, cease display of the avatars corresponding to the users of the electronic devices depending on the type of content that is being presented, as described herein in more detail.

FIGS. 4A-4F illustrate example interactions within a spatial group in a multi-user communication session according to some examples of the disclosure. In some examples, while a first electronic device 460 is in the multi-user communication session with a second electronic device 470, three-dimensional environment 450A is presented using the first electronic device 460 and three-dimensional environment 450B is presented using the second electronic device 470. In some examples, the electronic devices 460/470 optionally correspond to electronic devices 360/370 discussed above. In some examples, the three-dimensional environments 450A/450B include captured portions of the physical environment in which the electronic devices 460/470 are located. For example, the three-dimensional environment 450A includes a table (e.g., a representation of table 406') and a window (e.g., representation of window 409'), and the three-dimensional environment 450B includes a coffee table (e.g., representation of coffee table 408') and a floor lamp (e.g., representation of floor lamp 407'). In some examples, the three-dimensional environments 450A/450B optionally correspond to the three-dimensional environments 350A/350B described above with reference to FIG. 3. As described above, the three-dimensional environments also include avatars 415/417 corresponding to the users of the electronic devices 470/460, respectively. In some examples, the avatars 415/417 optionally corresponds to avatars 315/317 described above with reference to FIG. 3.

Figure 4A:
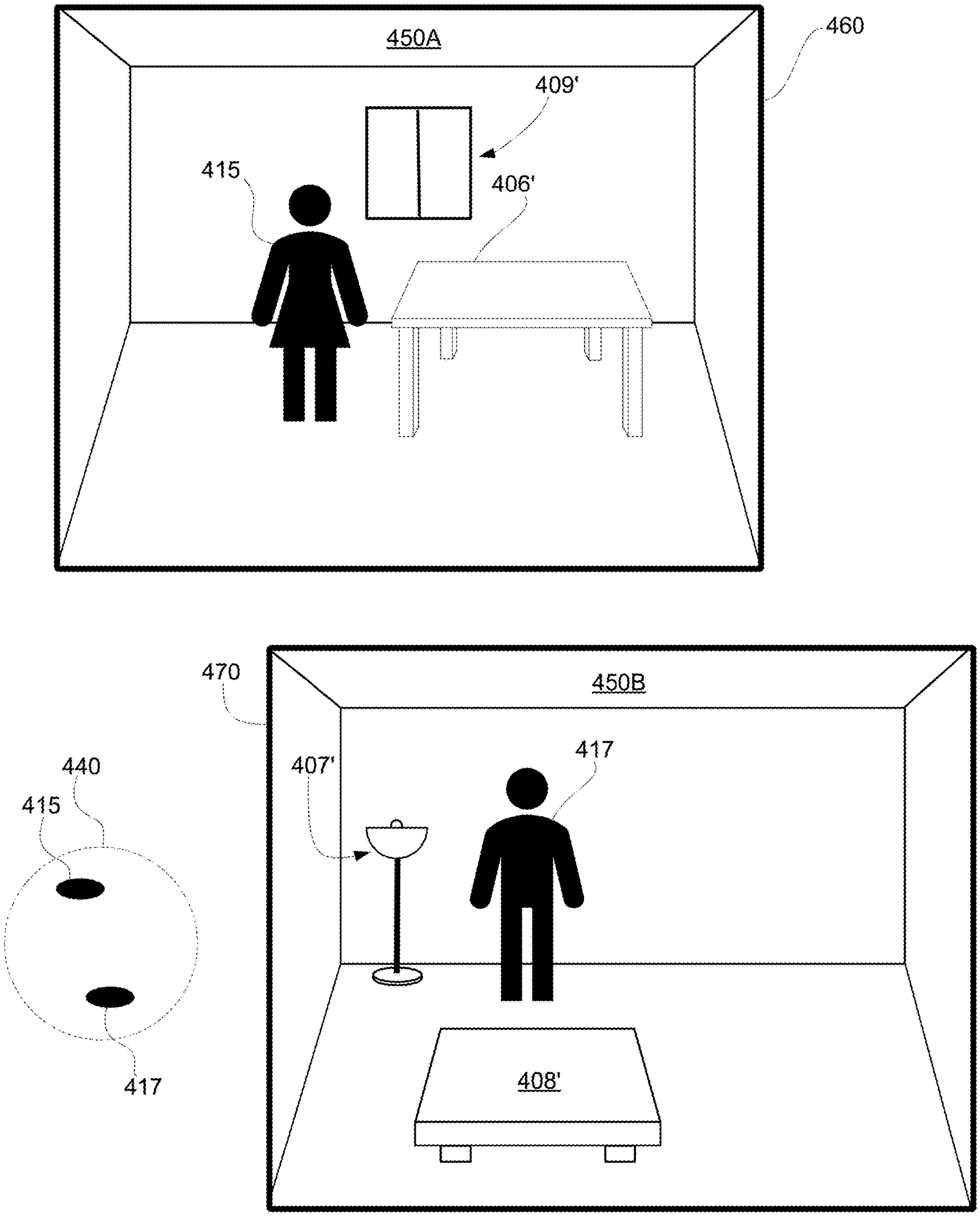
FIGS. 4A-4F illustrate example interactions within a spatial group in a multi-user communication session according to some examples of the disclosure.

As similarly described above with reference to FIG. 3, the user of the first electronic device 460 and the user of the second electronic device 470 may be in a first spatial group (e.g., a baseline spatial group) 440 within the multi-user communication session (e.g., represented by the placement of ovals 415 and 417 within circle 440 in FIG. 4A). In some examples, the first spatial group 440 optionally corresponds to spatial group 340 discussed above with reference to FIG. 3. As similarly described above, while the user of the first electronic device 460 and the user of the second electronic device 470 are in the first spatial group 440 within the multi-user communication session, the users have a first spatial arrangement in the shared three-dimensional environment (e.g., represented by the locations of and/or distance between the ovals 415 and 417 in the circle 440 in FIG. 4A), such that the electronic devices 460/470 maintain consistent spatial relationships (e.g., spatial truth) between locations of the viewpoints of the users (e.g., which correspond to the locations of the avatars 417/415 in the circle 440) and shared virtual content at each electronic device 460/470.

In some examples, the user of the first electronic device 460 and the user of the second electronic device 470 become associated with (e.g., located in) different spatial groups within the multi-user communication session when one of the electronic devices changes state. For example, if one of the electronic device changes states, the electronic device transmits an indication (e.g., directly or indirectly) to the other electronic device(s) in the multi-user communication session indicating that the electronic device has changed state. As described in more detail herein, an electronic device in the multi-user communication session changes state when presentation of an avatar corresponding to the user of the electronic device and/or presentation of content in the shared three-dimensional environment change.

Figure 4B:
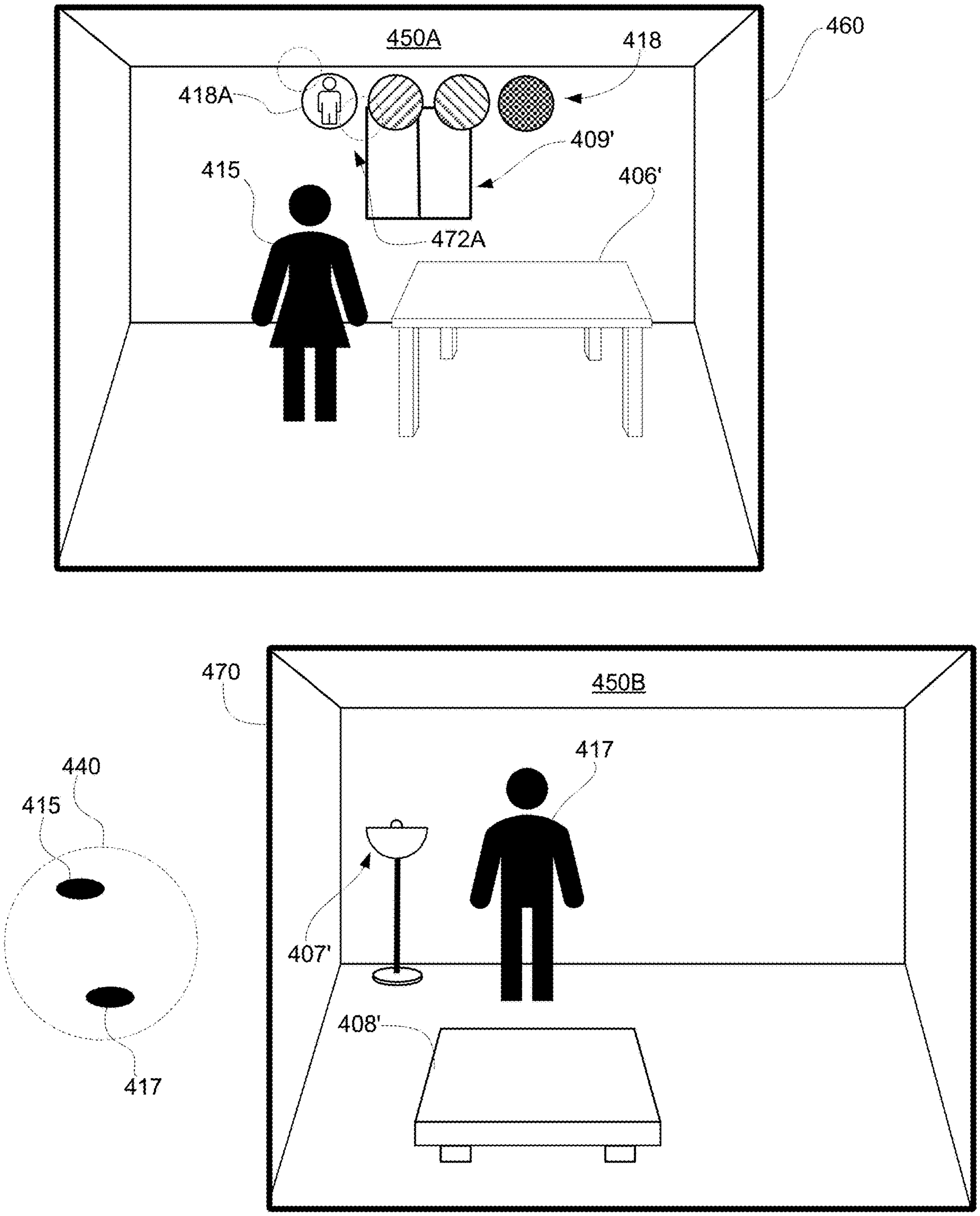

In some examples, as discussed below, an electronic device in the multi-user communication session changes states when the presentation of the avatar corresponding to the user of the electronic device changes in the shared three-dimensional environment. As an example, in FIG. 4B, the first electronic device 460 may display a plurality of user interface objects 418 that is selectable to cause the first electronic device 460 to change one or more characteristics of the virtual objects/elements displayed in the shared three-dimensional environment. In some examples, the plurality of user interface objects 418 are displayed in a predetermined region of the display of the first electronic device 460. For example, as shown in FIG. 4B, the plurality of user interface objects 418 are displayed in a top/upper region of the display of the first electronic device 460 (e.g., separate from the three-dimensional environment 450A). As shown in FIG. 4B, the plurality of user interface objects 418 includes a first user interface object 418A that is selectable to cause the first electronic device 460 to activate an audio mode at the first electronic device 460 (e.g., cease display of the avatar 417 corresponding to the user of the first electronic device 460 in the shared three-dimensional environment). In FIG. 4B, the first electronic device 460 may receive a selection input 472A directed to the first user interface object 418A in the three-dimensional environment 450A. For example, the first electronic device 460 detects a pinch gesture provided by a hand of the user of the first electronic device 460 (e.g., in which an index finger and thumb of the hand make contact) while a gaze of the user is directed to the first user interface object 418A. In some examples, the selection input 472A corresponds to some other suitable input, such as a tap input, gaze for more than a threshold period of time, etc.

Figure 4C:
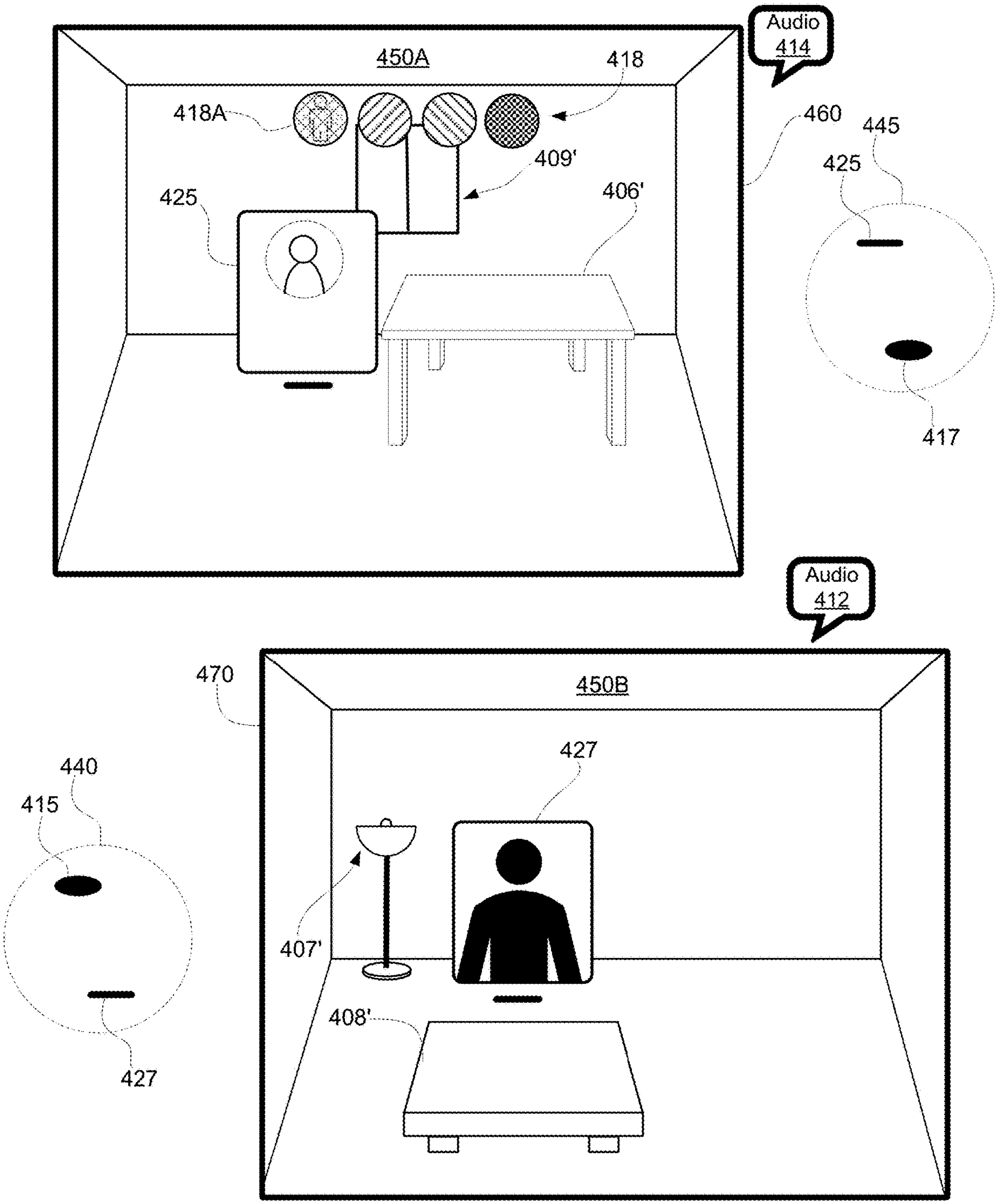

In some examples, in response to receiving the selection input 472A, the first electronic device 460 activates the audio mode at the first electronic device 460, which causes the second electronic device 470 to cease display of the avatar 417 corresponding to the user of the first electronic device 460, as shown in FIG. 4C. For example, the first electronic device 460 transmits an indication (e.g., directly or indirectly, such as via a communication network or server) to the second electronic device 470 that includes commands (e.g., instructions) that cause the second electronic device 470 to cease displaying the avatar 417 corresponding to the user of the first electronic device 460. Alternatively, when the audio mode is activated at the first electronic device 460, the first electronic device 460 ceases transmitting/broadcasting data corresponding to the display of the avatar 417 corresponding to the user of the first electronic device 460, which causes the second electronic device 470 to cease display of the avatar 417 in the three-dimensional environment 450B, as similarly shown in FIG. 4C. In some examples, as discussed in more detail below, while the audio mode is active at the first electronic device 460, the first electronic device 460 continues to transmit/broadcast data corresponding to the presentation of audio of a voice of the user of the first electronic device 460 (e.g., as illustrated by audio bubble 412 in FIG. 4C).

In some examples, when the first electronic device 460 activates the audio mode in response to the selection of the first user interface object 418A, the first electronic device 460 transmits (e.g., directly or indirectly) an indication of the activation of the audio mode at the first electronic device 460 to the second electronic device 470. For example, as previously discussed above, the user of the first electronic device 460 and the user of the second electronic device 470 are in the first spatial group 440 within the multi-user communication session when the selection input 472A is received (e.g., in FIG. 4B). In some examples, in response to receiving the indication of the activation of the audio mode at the first electronic device 460, the second electronic device 470 determines whether the first electronic device 460 and the second electronic device 470 are operating in a same state. For example, the second electronic device 470 may evaluate the data and/or information being transmitted/broadcast between the first electronic device 460 and the second electronic device 470 to determine whether the electronic devices 460/470 are operating in the same state. In some examples, if the data and/or information being transmitted/broadcast between the electronic devices 460/470 are synchronized, the electronic devices are operating in the same state. For example, before receiving the selection input 472A in FIG. 4B, the first electronic device 460 and the second electronic device 470 are operating in the same state because both electronic devices 460/470 are transmitting/broadcasting data for displaying the avatars 417/415 corresponding to the users of the electronic devices 460/470. As discussed above, when the electronic devices 460/470 are operating in the same state, the users of the electronic devices 460/470 are associated with the same spatial group (e.g., first spatial group 440 in FIG. 4B). In FIG. 4C, because the first electronic device 460 is optionally no longer transmitting/broadcasting data for displaying the avatar 417 corresponding to the user of the first electronic device 460 in the three-dimensional environment 450B, the second electronic device 470 determines that the electronic devices 460/470 are no longer operating in the same state. Accordingly, as discussed below, the user of the first electronic device 460 becomes associated with a second spatial group (e.g., an audio-only spatial group) 445 that is different (e.g., separate) from the first spatial group 440 (e.g., represented by placement of oval 417 within circle 445 in FIG. 4C).

In some examples, while the first electronic device 460 and the second electronic device 470 are in the multi-user communication session, the user of the first electronic device 460 and the user of the second electronic device 470 are associated with a communication session token within the multi-user communication session. For example, a first communication session token may be assigned to the users of the electronic devices 460/470 when the users initially join the multi-user communication session (e.g., the token provides the users access to the shared three-dimensional environment in the multi-user communication session). In some examples, changing states of an electronic device in the multi-user communication session may include assigning a different communication session token to the user of the electronic device. For example, when the first electronic device 460 changes states (e.g., when the audio mode is activated at the first electronic device 460), the user of the first electronic device 460 may be associated with a second communication session token, different from the first communication session token discussed above. In some examples, in accordance with a determination that the user of the first electronic device 460 and the user of the second electronic device 470 are associated with different communication session tokens, the users of the electronic devices 460/470 are associated with different spatial groups within the multi-user communication session, as similarly discussed above.

In some examples, as shown in FIG. 4C, when the user of the first electronic device 460 becomes associated with the second spatial group 445, the user of the second electronic device 470 remains in the first spatial group 440 (e.g., represented by placement of oval 415 within circle 440 in FIG. 4C). In some examples, in accordance with a determination that the users of the electronic devices 460/470 are no longer in the same spatial group within the multi-user communication session, the electronic devices 460/470 cease displaying the avatars corresponding to the users of the electronic devices 460/470. For example, as shown in FIG. 4C, the first electronic device 460 ceases display of the avatar 415 corresponding to the user of the second electronic device 470 in the three-dimensional environment 450B. Additionally, in some examples, when the users of the electronic devices 460/470 are no longer in the same spatial group within the multi-user communication session, the electronic devices 460/470 display two-dimensional representations of the users of the electronic devices 460/470. For example, as shown in FIG. 4C, the first electronic device 460 replaces display of the avatar 415 with a two-dimensional object (e.g., canvas/tile) 425 that includes a representation of the user of the second electronic device 470 in the three-dimensional environment 450A, and the second electronic device 470 replaces display of the avatar 417 with a two-dimensional object 427 that includes a representation of the user of the first electronic device 460 in the three-dimensional environment 450B. In some examples, the two-dimensional objects 425/427 include an image (e.g., a photograph) that is representative of the users of the electronic devices 470/460. In some examples, the two-dimensional objects 425/427 include an image of the avatars corresponding to the users of the electronic devices 470/460. In some examples, the two-dimensional objects 425/427 include video (e.g., a live stream of the avatars corresponding to the users or a recorded video that includes the users) that is representative of the users of the electronic devices 470/460. As shown in FIG. 4C, when the users of the electronic devices 460/470 are placed in different spatial groups as a result of the activation of the audio mode at the first electronic device 460 as discussed above, the two-dimensional representations 425/427 are displayed at the locations of the avatars 415/417 in the three-dimensional environments 450A/450B.

As described above with reference to FIG. 3, the display of avatars 415/417 in three-dimensional environments 450A/450B is optionally accompanied by the presentation of an audio effect corresponding to a voice of each of the users of the electronic devices 470/460, which, in some examples, may be spatialized such that the audio appears to the user of the electronic devices 470/460 to emanate from the locations of avatars 415/417 in three-dimensional environments 450A/450B. In some examples, as shown in FIG. 4C, when the avatars 415/417 cease to be displayed in three-dimensional environments 450A/450B, respectively, the electronic devices 460/470 maintain the presentation of the audio of the users of the electronic devices, as indicated by audio bubbles 414/412. However, in some examples, the audio of the users of the electronic devices may no longer be spatialized when the avatars 415/417 cease to be displayed and may instead be presented in mono or stereo. Thus, despite the avatars 415/417 no longer being displayed in three-dimensional environments 450A/450B, respectively, the users of the electronic devices 460/470 may continue communicating (e.g., verbally) since the first electronic device 460 and the second electronic device 470 are still in the multi-user communication session. In other examples, the audio of the users of the electronic devices may be spatialized such that the audio appears to emanate from their respective two-dimensional representations 425/427.

In some examples, the first spatial group 440 has a spatial arrangement (e.g., spatial template) that is different from a spatial arrangement of the second spatial group 445. For example, the display of the two-dimensional representation 425 within the three-dimensional environment 450A may be independent of the display of the two-dimensional representation 427 within the three-dimensional environment 450B. If the first electronic device 460 receives an input corresponding to movement of the two-dimensional representation 425 corresponding to the user of the second electronic device 470, the first electronic device 460 moves the two-dimensional representation 425 within the three-dimensional environment 450A without causing movement of the two-dimensional representation 427 corresponding to the user of the first electronic device 460 at the second electronic device 470. As another example, if the first electronic device 460 detects a change in a location of the viewpoint of the user of the first electronic device 460 (e.g., due to movement of the first electronic device 460 within the physical environment surrounding the first electronic device 460), the second electronic device 470 does not move the two-dimensional representation 427 corresponding to the user of the first electronic device 460 in the three-dimensional environment 450B. Accordingly, spatial truth becomes localized to the particular spatial group that the users are located within. For example, the user of the first electronic device 460 has spatial truth with the two-dimensional representation 425 in the second spatial group 445 (and any other users that may be within the second spatial group 445), and the user of the second electronic device 470 has spatial truth with the two-dimensional representation 427 in the first spatial group 440 (and any other users that may be within the first spatial group 440).

Figure 4D:
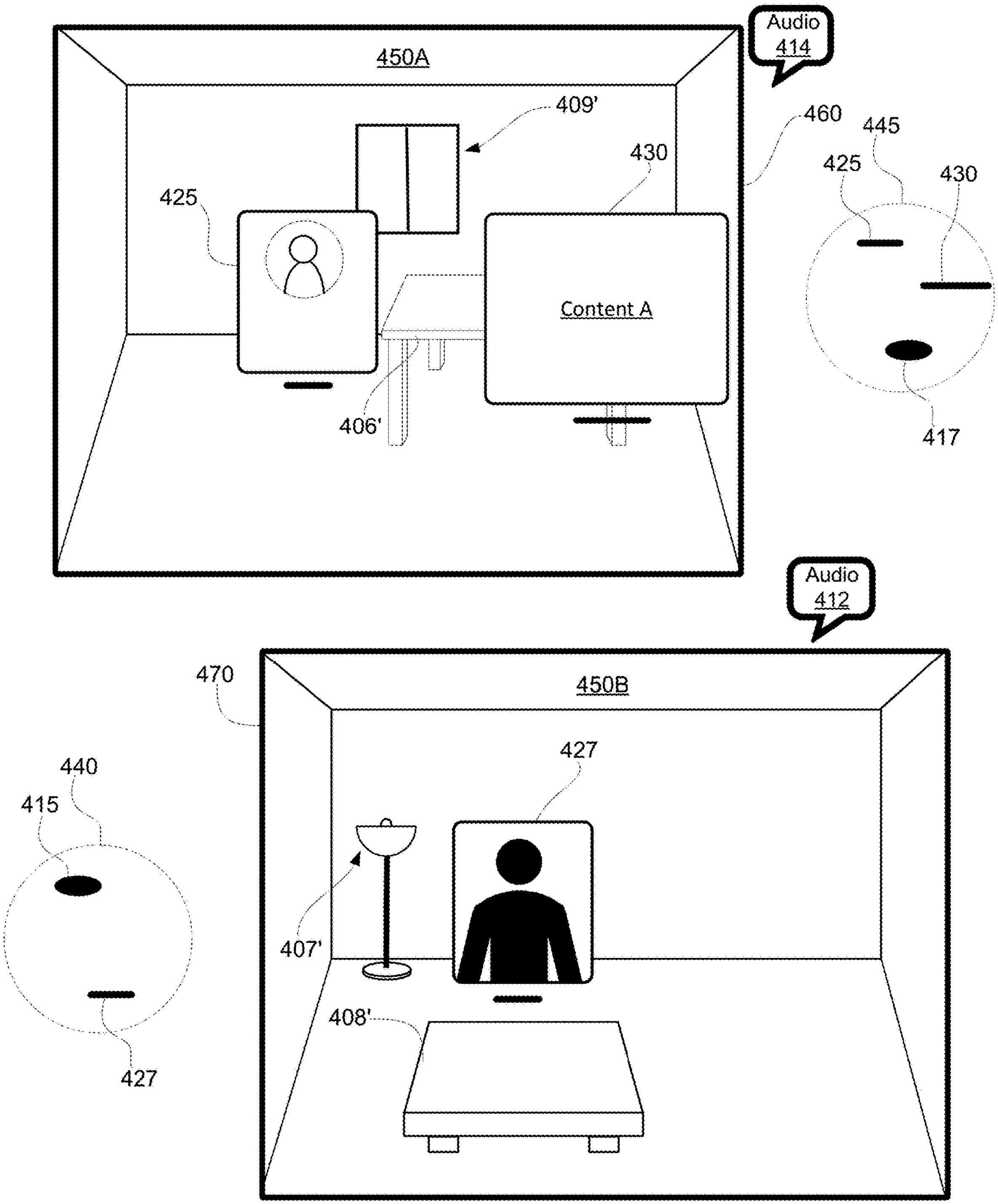

Additionally, display of content in the three-dimensional environment 450A may be independent of display of content in the three-dimensional environment 450B while the users of the electronic devices 460/470 are in different spatial groups within the multi-user communication session. As an example, in FIG. 4D, the first electronic device 460 is displaying a virtual object (e.g., an application window displaying content) 430 in the three-dimensional environment 450A. In some examples, the virtual object 430 may be an application window that includes content ("Content A"), such as image content, video content, audio content, etc., and that is associated with a respective application operating on the first electronic device 460. In some examples, the first electronic device 460 is displaying the virtual object 430 in response to receiving an input corresponding to a request to display content in the three-dimensional environment 450A (e.g., selection input directed to an application icon provided by the user of the first electronic device 460). As shown in FIG. 4D, the display of the virtual object 430 in the three-dimensional environment 450A at the first electronic device 460 does not cause display of the virtual object 430 (or a representation of the virtual object 430) in the three-dimensional environment 450B at the second electronic device 470. In some examples, the virtual object 430 is not displayed at the second electronic device 470 because the users of the electronic devices 460/470 are in different spatial groups. As indicated in FIG. 4D, the virtual object 430 is located within the second spatial group 445 (e.g., because the user of the first electronic device 460 provided the input for displaying the virtual object 430) and thus is only displayed for the user of the first electronic device 460 in the three-dimensional environment 450A.

Further, as similarly discussed above, input directed to the virtual object 430 may only be reflected in the three-dimensional environment 450A. For example, if the first electronic device 460 receives an input corresponding to a request to move the virtual object 430 within the three-dimensional environment 450A, the first electronic device 460 may move the virtual object 430 in accordance with the input. As another example, input received at the second electronic device 470 may not affect the display of the virtual object 430 in the three-dimensional environment 450A at the first electronic device 460. In some examples, if the second electronic device 470 receives input corresponding to a request to display content (e.g., in a virtual object similar to the virtual object 430), the second electronic device 470 displays the content in the three-dimensional environment 450B, without causing the first electronic device 460 to display the content and/or to move the virtual object 430 to make space for the content in the three-dimensional environment 450A. Accordingly, display of content in the three-dimensional environment 450A while the users of the electronic devices 460/470 are in different spatial groups causes the content to only be associated with one spatial group (e.g., such as the second spatial group 445 as discussed above) based on the user who provided the input for causing display of the content.

Figure 4E:
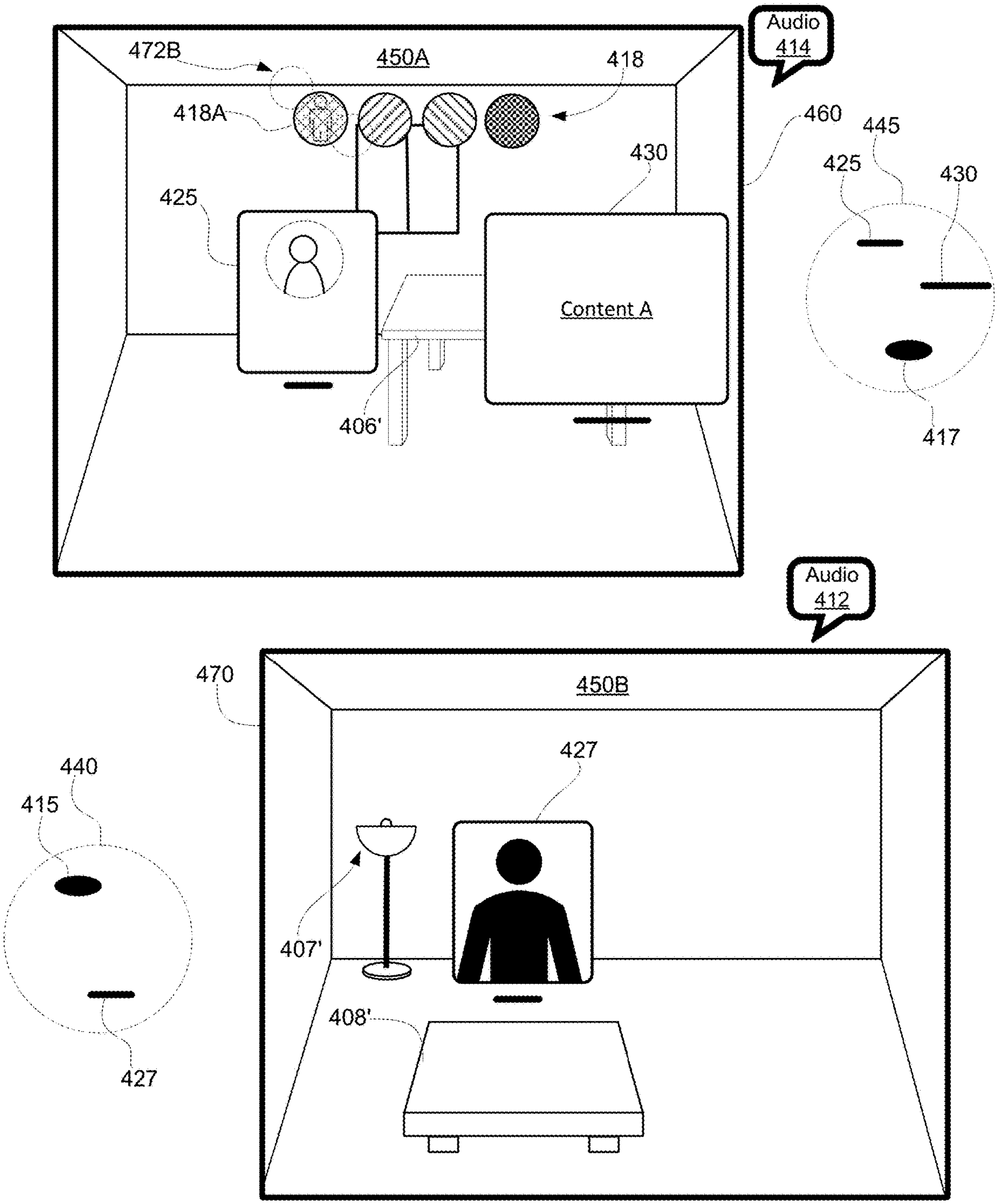

In FIG. 4E, while the users of the electronic devices 460/470 are in different spatial groups within the multi-user communication session, the first electronic device 460 may receive input corresponding to a request to deactivate the audio mode at the first electronic device 460. For example, as shown in FIG. 4E, while the plurality of user interface objects 418 are displayed in the predefined region of the display of the first electronic device 460, the first electronic device 460 receives a selection input 472B directed to the first user interface object 418A of the plurality of user interface objects 418. For example, as similarly discussed above, the first electronic device 460 detects a pinch gesture, a tap or touch gesture, a verbal command, a gaze dwell, etc. directed to the first user interface object 418A.

In some examples, in response to receiving the selection input 412B, the first electronic device 460 deactivates the audio mode. For example, the first electronic device 460 transmits (e.g., directly or indirectly) data including a command to the second electronic device 470 to redisplay the avatar 417 corresponding to the user of the first electronic device 460 in the three-dimensional environment 450B at the second electronic device 470. Alternatively, the first electronic device 460 resumes transmitting/broadcasting data for displaying the avatar 417 corresponding to the user of the first electronic device 460 in the three-dimensional environment 450B at the second electronic device 470. In some examples, when the second electronic device 470 receives the data transmitted/broadcasted by the first electronic device 460, the second electronic device 470 determines whether the first electronic device 460 and the second electronic device 470 are operating in the same state once again. For example, because the first electronic device 460 has resumed broadcasting data for displaying the avatar 417 at the second electronic device 470, and the second electronic device 470 was broadcasting data for displaying the avatar 415 corresponding to the user of the second electronic device 470 at the first electronic device 460 when the audio mode was first activated, the electronic devices 460/470 are now broadcasting the same information, and thus, are operating in the same state once again. Additionally or alternatively, in some examples, when the first electronic device 460 deactivates the audio mode, the user of the first electronic device 460 is reassociated with the first communication session token discussed previously above. In some examples, in accordance with a determination that the user of the first electronic device 460 and the user of the second electronic device 470 are associated with the same communication session token, the users of the electronic devices 460/470 are associated with a same spatial group within the multi-user communication session.

Figure 4F:
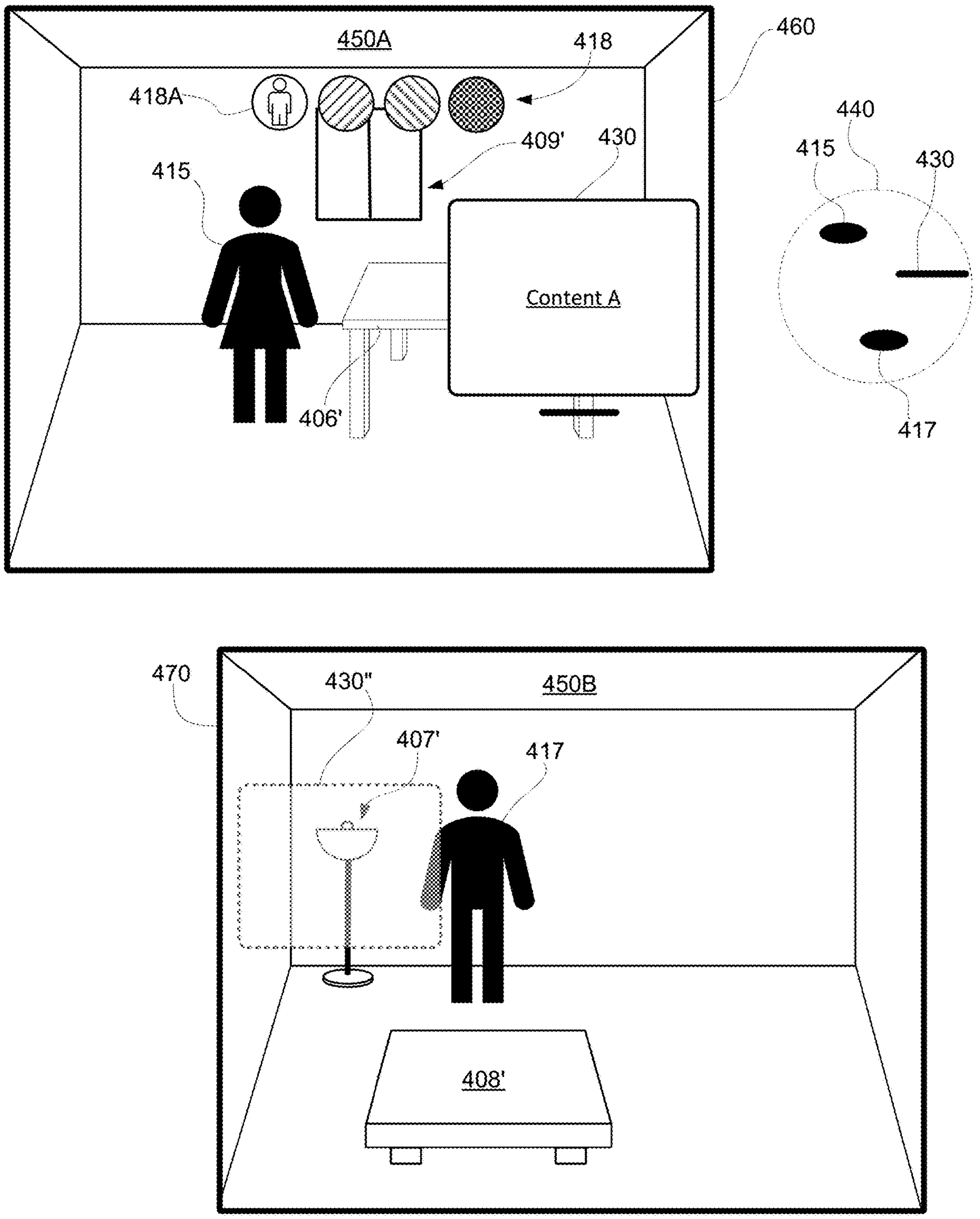

Accordingly, as shown in FIG. 4F, the user of the first electronic device 460 and the user of the second electronic device 470 are placed back in the same spatial group within the multi-user communication session. For example, as shown in FIG. 4F, the user of the first electronic device 460 and the user of the second electronic device 470 are associated with the first spatial group 440 within the multi-user communication session. In some examples, when the users of the electronic devices 460/470 return to the same spatial group in the multi-user communication session, the avatars corresponding to the users of the electronic devices 460/470 are redisplayed in three-dimensional environments 450A/450B. For example, the first electronic device 460 optionally redisplays the avatar 415 corresponding to the user of the second electronic device 470 in three-dimensional environment 450A, and the second electronic device 470 optionally redisplays the avatar 417 corresponding to the user of the first electronic device 460 in three-dimensional environment 450B (e.g., as similarly shown in FIG. 3). Additionally, as shown in FIG. 4F, the electronic devices 460/470 cease display of the two-dimensional representations 425/427 corresponding to the users of the electronic devices. In some examples, the first electronic device 460 and the second electronic device 470 may also re-spatialize the audio corresponding to the voices of the users of the first electronic device 460 and the second electronic device 470.

As discussed above with reference to FIG. 4D, the first electronic device 460 is displaying the virtual object 430 in the three-dimensional environment 450A when the selection input 47BA is received in FIG. 4E. As described above with reference to FIG. 4D, because the user of the first electronic device 460 and the user of the second electronic device 470 were in different spatial groups within the multi-user communication session when the virtual object 430 was displayed in the three-dimensional environment 450A, the virtual object 430 remained locally displayed to the user of the first electronic device 460 in the second spatial group 445. As shown in FIG. 4F, when the users of the electronic devices 460/470 are placed back into the same spatial group (e.g., spatial group 440), the virtual object 430, which was previously displayed only for the user of the first electronic device 460 in the three-dimensional environment 450A, is also placed in the spatial group 440. For example, as shown in FIG. 4F, while the first electronic device 460 is displaying the virtual object 430 in the three-dimensional environment 450A, the second electronic device 470 displays a representation of the virtual object 430" in the three-dimensional environment 450B. As previously discussed herein, because the virtual object 430 is not shared between the first electronic device 460 and the second electronic device 470, the virtual object 430 is currently private to the user of the first electronic device 460, which thus causes the second electronic device 470 to display the representation of the virtual object 430" rather than the virtual object 430 in the three-dimensional environment 450B. Thus, one advantage of the disclosed method of grouping users in a multi-user communication session into spatial groups is that users may continue interacting with each other visually (e.g., via the two-dimensional representations of the users) and verbally (e.g., via the user audio) while promoting privacy for the users within the multi-user communication session. Ceasing display of the avatars when the users are grouped into different spatial groups promotes user privacy because one subset of users in a first spatial group is prevented from viewing user activity (e.g., movement of content or avatars) of another subset of users in a second spatial group.

It should be understood that, in some examples, the determination of the states of the electronic devices 460/470 may occur at both electronic devices 460/470 (e.g., rather than just at the second electronic device 470 as discussed above by way of example). Additionally, it should be understood that, in some examples, the first electronic device 460 and/or the second electronic device 470 may periodically evaluate the states in which the electronic devices 460/470 are operating (e.g., in the manners discussed above) to determine whether the users of the electronic devices 460/470 should be associated with a same spatial group or different spatial groups (and/or any updates therein).

As described above, while electronic devices are in a multi-user communication session, altering display of an avatar corresponding to one user causes the users of the electronic devices to be grouped into different spatial groups within the multi-user communication session. Attention is now directed to displaying private exclusive content in the three-dimensional environment shared between the first electronic device and the second electronic device. As described below, private exclusive content (e.g., such as immersive video or an immersive three-dimensional scene/environment) that is not shared between the first electronic device and the second electronic device and displayed in the three-dimensional environment optionally causes the users of the electronic devices to be grouped into different (e.g., separate) spatial groups within the multi-user communication session.

FIGS. 5A-5E illustrate example interactions within a spatial group in a multi-user communication session according to some examples of the disclosure. In some examples, while a first electronic device 560 is in the multi-user communication session with a second electronic device 570, the three-dimensional environment 550A is presented using the first electronic device 560 and the three-dimensional environment 550B is presented using the second electronic device 570. In some examples, the electronic devices 560/570 optionally correspond to electronic devices 460/470 discussed above and/or electronic devices 360/370 in FIG. 3. In some examples, the three-dimensional environments 550A/550B include captured portions of the physical environment in which the electronic devices 560/570 are located. For example, the three-dimensional environment 550A includes a table (e.g., a representation of table 506') and a window (e.g., representation of window 509'), and the three-dimensional environment 550B includes a coffee table (e.g., representation of coffee table 508') and a floor lamp (e.g., representation of floor lamp 507'). In some examples, the three-dimensional environments 550A/550B optionally correspond to three-dimensional environments 450A/450B described above and/or three-dimensional environments 350A/350B in FIG. 3. As described above, the three-dimensional environments also include avatars 515/517 corresponding to a user of the electronic devices 570/560. In some examples, the avatars 515/517 optionally correspond to avatars 415/417 described above and/or avatars 315/317 in FIG. 3.

Figure 5A:
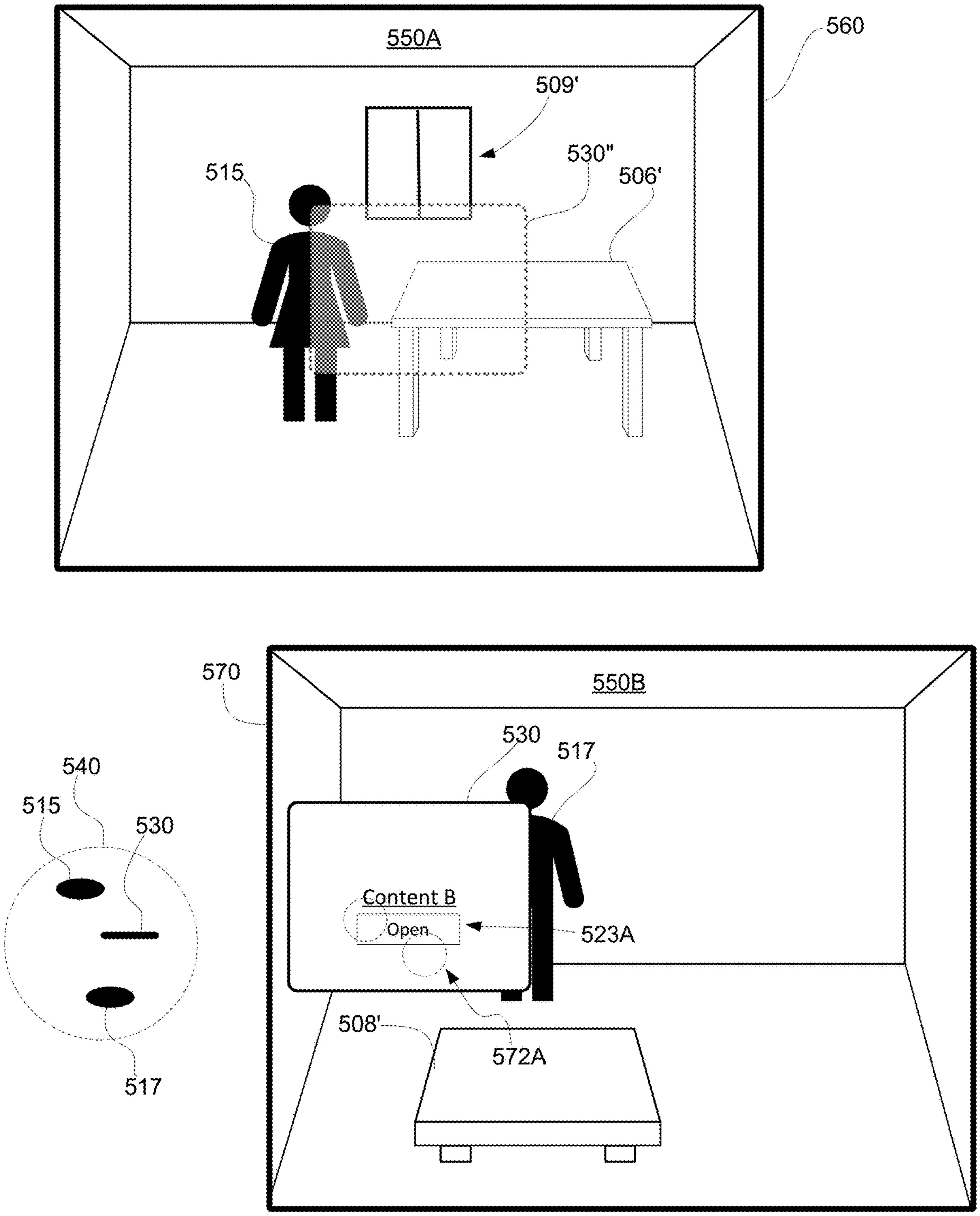
FIGS. 5A-5E illustrate example interactions within a spatial group in a multi-user communication session according to some examples of the disclosure.

As shown in FIG. 5A, the second electronic device 570 is optionally displaying a user interface element 530 corresponding to a respective application running on the second electronic device 570 (e.g., an application configurable to display content in the three-dimensional environment 550B). In some examples, the user interface element 530 is associated with a respective art gallery application that may be launched at the second electronic device 570. For example, as shown, the user interface element 530 includes a selectable option 523A that may be activated (e.g., selectable) in three-dimensional environment 550B to cause the second electronic device 570 to generate and display content associated with the respective art gallery application in the three-dimensional environment 550B. In some examples, the content associated with the respective art gallery application replaces display of three-dimensional environment 550B at the second electronic device 570 (e.g., the content occupies a field of view of the user of the second electronic device 570). As discussed in more detail below, the content associated with the respective art gallery application may be an immersive (e.g., a three-dimensional) art gallery in which the user may (e.g., virtually) explore and walk around in. In other words, in some examples, the user may navigate within immersive content presented within three-dimensional environment 550B with three or six degrees of freedom.

As previously discussed herein, in some examples, virtual objects (e.g., application windows and user interfaces, representations of content, application icons, and the like) that are viewable by a user may be private while the user is participating in a multi-user communication session with one or more other users (e.g., via electronic devices that are communicatively linked in the multi-user communication session). For example, as discussed above, the user of the second electronic device 570 is optionally viewing the user interface element 530 in three-dimensional environment 550B. In some examples, a representation of the user interface element 530" is displayed in the three-dimensional environment 550A at the first electronic device 560 with the avatar 515 corresponding to the user of the second electronic device 570. As similarly discussed above, in some examples, the representation of the user interface element 530" displayed in the three-dimensional environment 550A is optionally an occluded (e.g., a faded or blurred) representation of the user interface element 530 displayed in three-dimensional environment 550B. For example, the user of the first electronic device 560 is prevented from viewing the contents of the user interface element 530 displayed in three-dimensional environment 550B at the second electronic device 570, as shown in FIG. 5A.

As previously discussed herein, in FIG. 5A, the user of the first electronic device 560 and the user of the second electronic device 570 may be in a first spatial group (e.g., a baseline spatial group) 540 within the multi-user communication session. In some examples, the first spatial group 540 optionally corresponds to spatial group 440 discussed above and/or spatial group 340 discussed above with reference to FIG. 3. As similarly described above, while the user of the first electronic device 560 and the user of the second electronic device 570 are in the first spatial group 540 within the multi-user communication session, the users have a first spatial arrangement in the shared three-dimensional environment (e.g., represented by the locations of and/or distance between the ovals 515 and 517 in the circle 540 in FIG. 5A), such that the electronic devices 560/570 maintain consistent spatial relationships (e.g., spatial truth) between locations of the viewpoints of the users (e.g., which correspond to the locations of the avatars 517/515 within the circle 540) and virtual content at each electronic device 560/570 (e.g., the user interface element 530).

In some examples, as previously discussed above, the user of the first electronic device 560 and the user of the second electronic device 570 become associated with (e.g., grouped into) different spatial groups within the multi-user communication session when one of the electronic devices changes states. For example, if one of the electronic device changes states, the electronic device transmits an indication (e.g., directly or indirectly) to the other electronic device(s) in the multi-user communication session indicating that the electronic device has changed states. As described in more detail below, an electronic device in the multi-user communication session changes state when presentation of content in the shared three-dimensional environment changes.

Figure 5B:
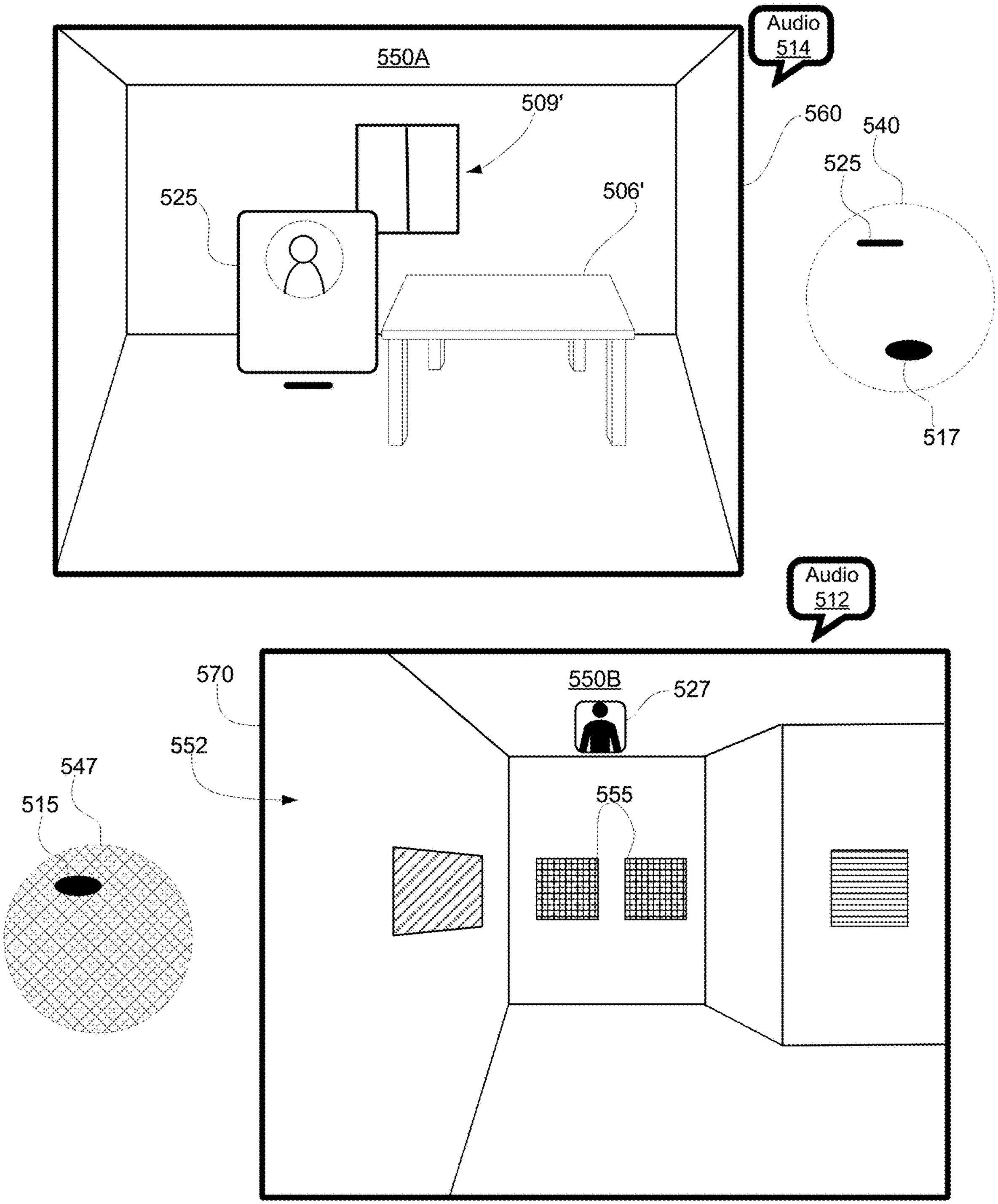

As shown in FIG. 5A, the user of the second electronic device 570 is optionally providing a selection input 572A directed to the selectable option 523A in the user interface element 530 in the three-dimensional environment 550B. For example, as similarly discussed above, the user may provide a pinch input (e.g., in which the index finger and the thumb of the hand of the user make contact) while the gaze of the user is directed toward the selectable option 523A (or other suitable input such as a tap input, a verbal command, gaze for more than a threshold period of time, etc.). In some examples, in response to receiving the selection input 572A directed to the selectable option 523A, the second electronic device 570 may generate and present the immersive content (e.g., the immersive (e.g., three-dimensional) art gallery) 552 associated with the user interface element 530 (e.g., associated with the respective art gallery application) in three-dimensional environment 550B, as shown in FIG. 5B. For example, as shown in FIG. 5B, the second electronic device 570 optionally updates the three-dimensional environment 550B to display the immersive content 552 (e.g., immersive art gallery), which may include art pieces 555 (e.g., paintings, stills, sketches, and the like). As shown, updating display of the three-dimensional environment 550B to include the immersive content 552 optionally does not cause the first electronic device 560 to update display of three-dimensional environment 550A to include the immersive content 552.

As shown in FIG. 5B, the user of the second electronic device 570 is optionally experiencing (e.g., viewing and/or interacting with) the immersive content 552 displayed in three-dimensional environment 550B, and the user of the first electronic device 560 is optionally not experiencing the immersive content 552 because the immersive content 552 is not displayed in the three-dimensional environment 550A. As described herein, the first electronic device 560 is in a multi-user communication session with the second electronic device 570, such that the first electronic device 560 and the second electronic device 570 optionally display the shared three-dimensional environments 550A/550B. Because the second electronic device 570 is now displaying the immersive content 552, as shown in FIG. 5B, the first electronic device 560 and the second electronic device 570 are no longer operating in the same state. For example, as previously discussed herein, the first electronic device 560 and the second electronic device 570 are operating in the same state when the presentation of content in the shared three-dimensional environment is synchronized between the electronic devices 560/570. As discussed above, in FIG. 5A, the second electronic device 570 is displaying the user interface element 530 and the first electronic device 560 is displaying the representation of the user interface element 530". Though the user interface element 530 is private to the user of the second electronic device 570, the user interface element 530 is not exclusive to the user of the second electronic device 570, allowing the representation of the user interface element 530" to be displayed in the three-dimensional environment 550A at the first electronic device 560. In some examples, when the second electronic device 570 displays the immersive content 552 in the three-dimensional environment 550B, the display of the immersive content 552 is exclusive to the user of the second electronic device 570. For example, to prevent display of a representation of the immersive content 552 (e.g., akin to the representation 530" in FIG. 5A), which could be visually distracting and/or obtrusive for the user of the first electronic device 560, the display of the immersive content 552 is localized for the user of the second electronic device 570, which causes the first electronic device 560 and the second electronic device 570 to no longer operate in the same state.

In some examples, while the first electronic device 560 and the second electronic device 570 are in the multi-user communication session, the first electronic device 560 and the second electronic device 570 are associated with an environment identifier (ID) within the multi-user communication session. For example, a first environment ID may be assigned to the users of the electronic devices 560/570 when the users initially join the multi-user communication session (e.g., the environment ID corresponds to the shared three-dimensional environment in the multi-user communication session). In some examples, changing states of an electronic device in the multi-user communication session may include assigning a different environment ID to the user of the electronic device. For example, when the second electronic device 570 changes states (e.g., when the second electronic device 570 displays the immersive content 552 in FIG. 5B), the second electronic device 570 may be associated with a second environment ID, different from the first environment ID discussed above (e.g., because the display of immersive content within the three-dimensional environment 550B at the second electronic device 570 effectively renders the contents of the three-dimensional environment 550B private and exclusive to the user of the second electronic device 570, as similarly discussed above). In some examples, in accordance with a determination that the first electronic device 560 and the second electronic device 570 are associated with different environment IDs, the users of the electronic devices 560/570 are associated with different spatial groups within the multi-user communication session, as similarly discussed above.

In some examples, as similarly discussed above, the users of the electronic devices 560/570 may be grouped into different spatial groups within the multi-user communication session when the first electronic device 560 and the second electronic device 570 are no longer operating in the same state. For example, as shown in FIG. 5B, the user of the second electronic device 570 becomes associated with a second spatial group 547 that is different from (e.g., separate from) the first spatial group 540 in the multi-user communication session. In some examples, the spatial group 547 corresponds to a private exclusive spatial group (e.g., because the user of the second electronic device 570 is viewing private exclusive content in the form of the immersive content 552). As shown in FIG. 5B, because the users of the electronic devices 560/570 are no longer in the same spatial group, the three-dimensional environments 550A/550B are no longer a true shared environment between the electronic devices 560/570. Accordingly, the first electronic device 560 ceases displaying the avatar 515 corresponding to the user of the second electronic device 570, and the second electronic device 570 ceases displaying the avatar 517 corresponding to the user of the first electronic device 560, as shown in FIG. 5B.

In some examples, as shown in FIG. 5B, the electronic devices 560/570 replace display of the avatars 515/517 with two-dimensional representations corresponding to the users of the electronic devices. For example, as shown in FIG. 5B, the first electronic device 560 displays a two-dimensional representation 525 in the three-dimensional environment 550A. In some examples, as previously discussed above, the two-dimensional representation (e.g., a canvas/tile) 525 includes an image, video, or other rendering that is representative of the user of the second electronic device 570. Similarly, as shown in FIG. 5B, the second electronic device 570 displays a two-dimensional representation 527 that optionally includes an image, video, or other rendering that is representative of the user of the first electronic device 560. As shown in FIG. 5B, the first electronic device 560 may display the two-dimensional representation 525 at a location that the avatar 515 was displayed in the three-dimensional environment 550A. The second electronic device 570, on the other hand, may display the two-dimensional representation 527 in a predetermined region of the display of the second electronic device 570. For example, as shown in FIG. 5B, the second electronic device 570 displays the two-dimensional representation 527 in a top/upper region of the display (e.g., similar to the display of the plurality of user interface objects 418 in FIG. 4B), which is thus displayed at a smaller size than the two-dimensional representation 525 that is displayed at the first electronic device 560 (and separate from the three-dimensional environment 550B).

As previously described above, the display of avatars 515/517 in three-dimensional environments 550A/550B is optionally accompanied by the presentation of an audio effect corresponding to a voice of each of the users of the electronic devices 570/560, which, in some examples, may be spatialized such that the audio appears to the user of the electronic devices 570/560 to emanate from the locations of avatars 515/517 in three-dimensional environments 550A/550B. In some examples, as shown in FIG. 5B, when the avatars 515/517 cease to be displayed in three-dimensional environments 550A/550B, respectively, the electronic devices 560/570 maintain the presentation of the audio of the users of the electronic devices, as indicated by audio bubbles 514/512. However, in some examples, the audio of the users of the electronic devices may no longer be spatialized when the avatars 515/517 cease to be displayed and may instead be presented in mono or stereo. Thus, despite the avatars 515/517 no longer being displayed in three-dimensional environments 550A/550B, respectively, the users of the electronic devices 560/570 may continue communicating (e.g., verbally) since the first electronic device 560 and the second electronic device 570 are still in the multi-user communication session. In other examples, the audio of the users of the electronic devices may be spatialized such that the audio appears to emanate from their respective two-dimensional representations 525/527.

Figure 5C:
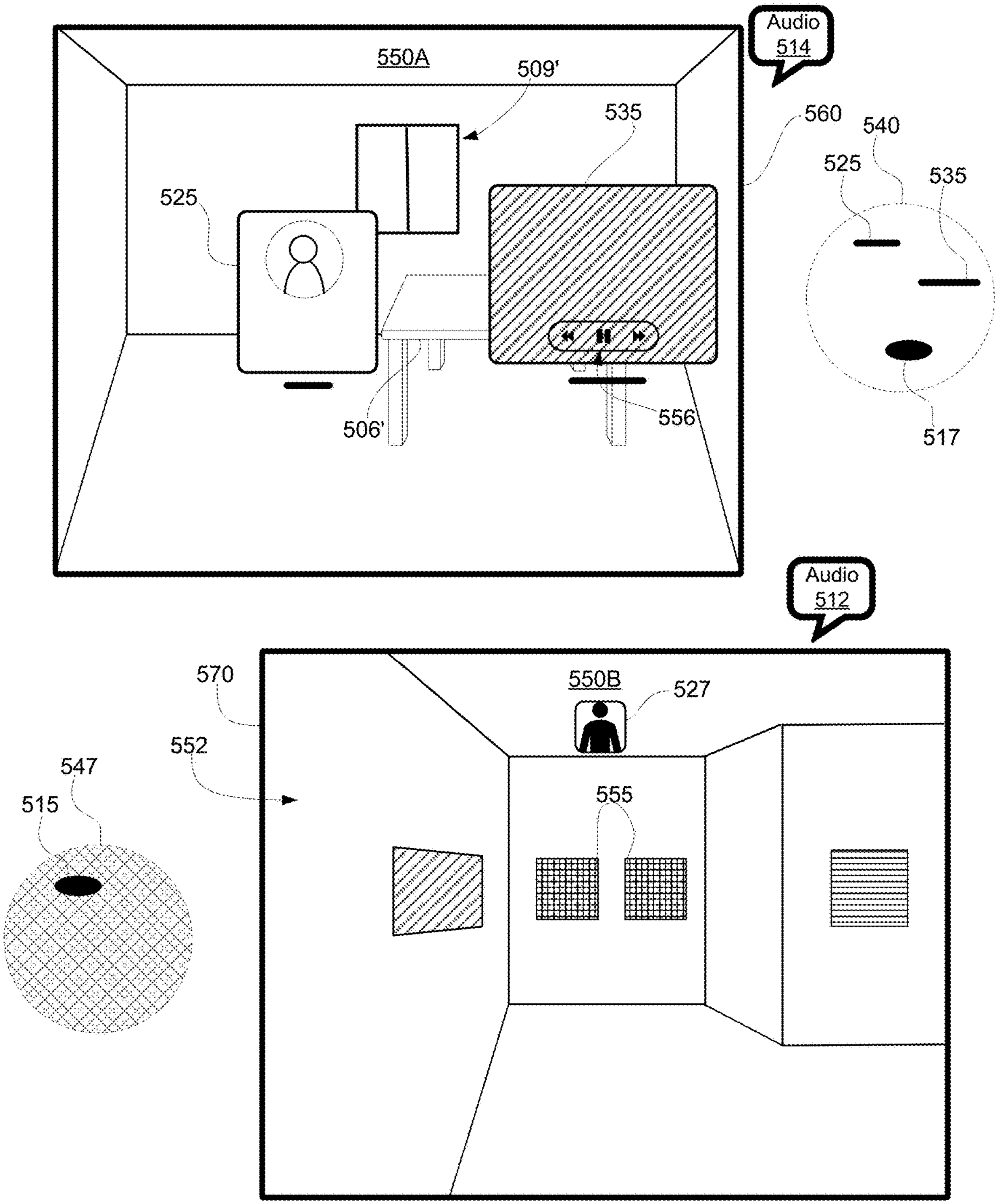

As mentioned previously herein, in some examples, while the users of the electronic devices 560/570 are grouped in different spatial groups within the multi-user communication session, the users experience spatial truth that is localized based on the spatial group each user is located in. For example, as previously discussed above, the display of content (and subsequent interactions with the content) in the three-dimensional environment 550A at the first electronic device 560 may be independent of the display of content in the three-dimensional environment 550B the second electronic device 570. As an example, in FIG. 5C, the first electronic device 560 is displaying an application window 535 in the three-dimensional environment 550A. In some examples, the application window 535 may be a video playback application window associated with a media player application running on the first electronic device 560. For example, the application window 535 is displaying video content, which is controllable via playback controls 556 in the application window 535, that is only visible to the user of the first electronic device 560. In some examples, because the users of the electronic devices 560/570 are in different spatial groups within the multi-user communication session, the display of the application window 535 is local to the first electronic device 560. For example, as shown in FIG. 5C, the application window 535 is only displayed in the three-dimensional environment 550A at the first electronic device 560. Further, because the application window 535 is in the first spatial group 540 with the user of the first electronic device 560, any user interaction directed to the application window 535 remains local to the first spatial group 540. For example, as similarly discussed above, if the first electronic device 560 receives input corresponding to a request to move the application window 535 in the three-dimensional environment 550A, the application window 535 is only moved in the three-dimensional environment 550A.

Figure 5D:
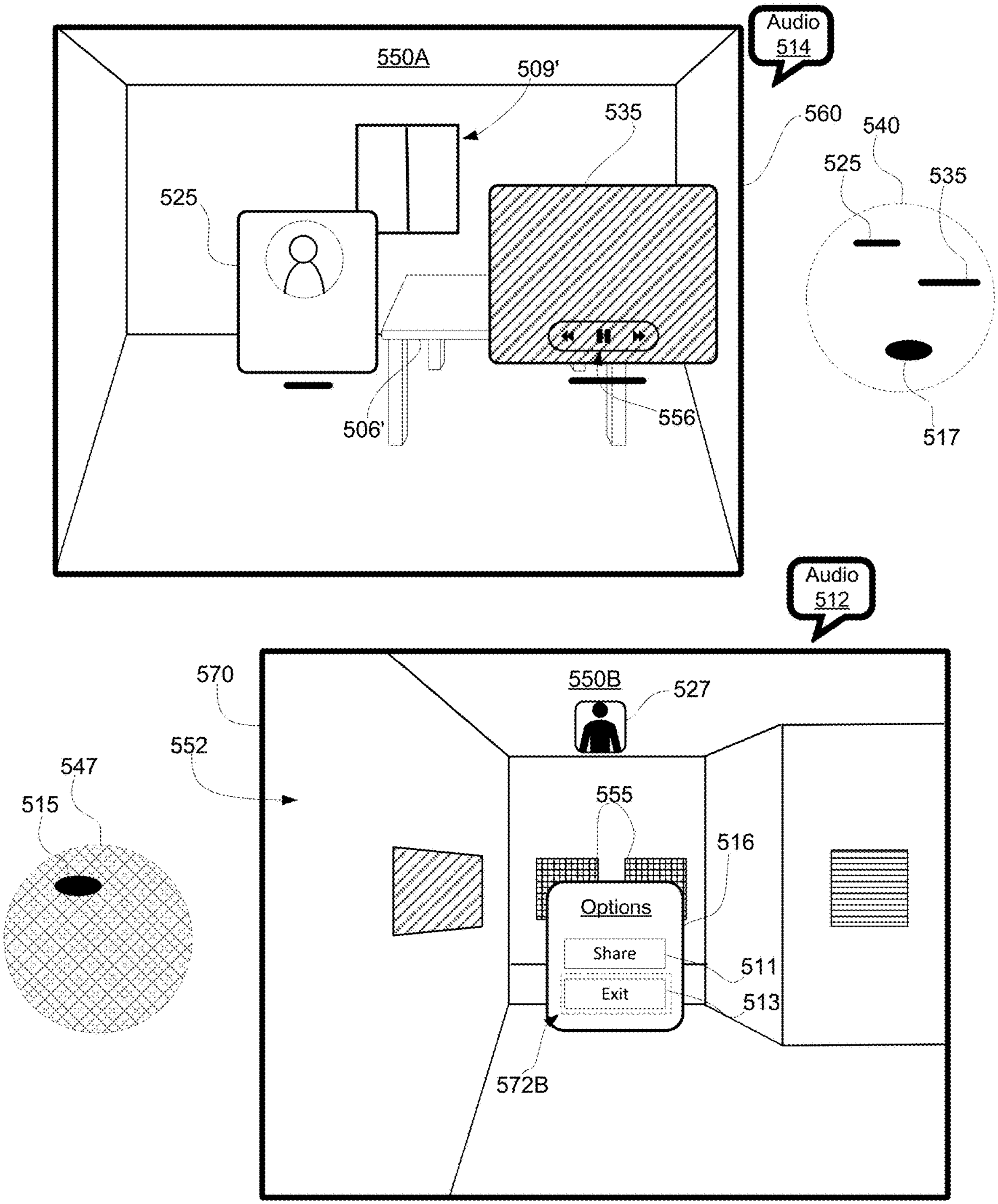

In FIG. 5D, while the users of the electronic devices 560/570 are in different spatial groups within the multi-user communication session, the user of the second electronic device 570 may provide input corresponding to a request to cease display of the immersive content 552 in the three-dimensional environment 550B. For example, as shown in FIG. 5D, the second electronic device 570 may display one or more viewing options for the immersive content 552 within a menu element 516 in the three-dimensional environment 550B. As shown in FIG. the one or more viewing options may include a share option 511 and an exit option 513. In some examples, the share option 511 is optionally selectable to initiate a process to share the immersive content with another user in the multi-user communication session (e.g., such as the user of the first electronic device 560), such that the immersive content 552 becomes viewable for the other user. In some examples, the exit option 513 is selectable to close the respective art gallery application and cease display of the immersive content 552 in the three-dimensional environment 550B. As shown in FIG. 5D, the second electronic device 570 receives a selection input (e.g., a pinch input, a tap or touch input, a verbal command, a gaze dwell, etc.) 572B directed to the exit option 513 in the menu element 516 in the three-dimensional environment 550B.

Figure 5E:
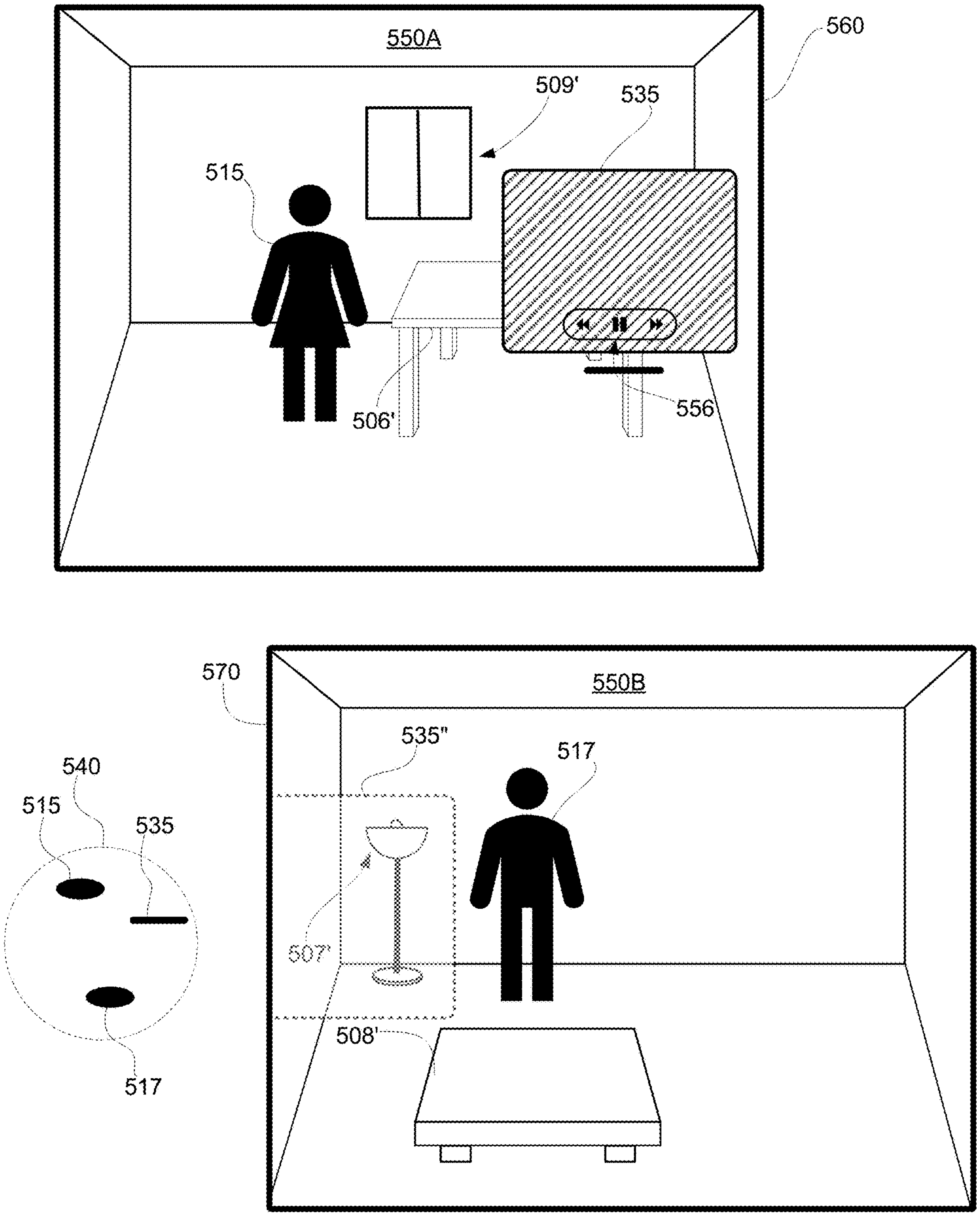

In some examples, in response to receiving the selection input 572B directed to the exit option 513 while the first electronic device 560 and the second electronic device 570 are in different spatial groups, the second electronic device 570 ceases display of the immersive content 552 in the three-dimensional environment 550B, as shown in FIG. 5E. In some examples, when the second electronic device 570 ceases display of the immersive content 552, the second electronic device 570 transmits (e.g., directly or indirectly) an indication to the first electronic device 560 that the second electronic device 570 is no longer displaying the immersive content 552 in the three-dimensional environment 550B. In some examples, when the second electronic device 570 receives the indication transmitted by the second electronic device 570, the first electronic device 560 determines whether the first electronic device 560 and the second electronic device 570 are operating in the same state once again. For example, because the second electronic device 570 is no longer displaying the immersive content 552, which is private content that is exclusive to the user of the second electronic device 570, the display of content in the three-dimensional environment 550B is no longer exclusive, and thus the three-dimensional environments 550A/550B shared between the first electronic device 560 and the second electronic device 570 return to a true shared three-dimensional environment, as previously discussed above. Accordingly, the first electronic device 560 and the second electronic device 570 are operating in the same state once again. Additionally or alternatively, in some examples, when the second electronic device 570 ceases display of the immersive content 552 in the three-dimensional environment 550B, the second electronic device 570 is reassociated with the first environment ID discussed previously above. In some examples, in accordance with a determination that he first electronic device 560 and the second electronic device 570 are associated with the same environment ID, the users of the electronic devices 560/570 are associated with a same spatial group within the multi-user communication session.

Therefore, as shown in FIG. 5E, the user of the first electronic device 560 and the user of the second electronic device 570 are placed back in the same spatial group within the multi-user communication session. For example, as shown in FIG. 5E, the user of the first electronic device 560 and the user of the second electronic device 570 are associated with the first spatial group 540 within the multi-user communication session. In some examples, when the users of the electronic devices 560/570 return to the same spatial group in the multi-user communication session, the avatars corresponding to the users of the electronic devices 560/570 are redisplayed in three-dimensional environments 550A/550B. For example, the first electronic device 560 optionally redisplays the avatar 515 corresponding to the user of the second electronic device 570 in three-dimensional environment 550A, and the second electronic device 570 optionally redisplays the avatar 517 corresponding to the user of the first electronic device 560 in three-dimensional environment 550B (e.g., as similarly shown in FIG. 5A). Additionally, as shown in FIG. 5E, the electronic devices 560/570 cease display of the two-dimensional representations 525/527 corresponding to the users of the electronic devices. In some examples, the first electronic device 560 and the second electronic device 570 may also re-spatialize the audio corresponding to the voices of the users of the first electronic device 560 and the second electronic device 570.

As discussed above with reference to FIG. 5C, the first electronic device 560 is displaying the application window 535 in the three-dimensional environment 550A when the selection input 572B is received in FIG. 5D. As described above with reference to FIG. 5C, because the user of the first electronic device 560 and the user of the second electronic device 570 were in different spatial groups within the multi-user communication session when the application window 535 was displayed in the three-dimensional environment 550A, the virtual object 535 remained locally displayed to the user of the first electronic device 560 in the first spatial group 540. As shown in FIG. 5E, when the users of the electronic devices 560/570 are placed back into the same spatial group (e.g., spatial group 540), the application window 535, which was previously displayed only for the user of the first electronic device 560 in the three-dimensional environment 550A, remains in the spatial group 540. For example, as shown in FIG. while the first electronic device 560 is displaying the application window 535 in the three-dimensional environment 550A, the second electronic device 570 displays a representation of the application window 535" in the three-dimensional environment 550B. In other words, when the user of the second electronic device 570 rejoins the spatial group 540 in which the user of the first electronic device 560 is located, the state (e.g., application states) and spatial characteristics (e.g., spatial truth) of the spatial group 540 are applied to the three-dimensional environment 550B displayed at the second electronic device 570, which causes the location of the application window 535 (more specifically the representation of the application window 535") in the three-dimensional environment 550B to be selected based on a location of the application window 535 relative to the viewpoint of the user of the first electronic device 560 in the three-dimensional environment 550A at the first electronic device 560. It should be understood that, in some examples, the application of the existing state and spatial characteristics of a particular spatial group is similarly applied to three-dimensional environments of users who newly join the spatial group, such as if a user were to join the spatial group 540, such that the three-dimensional environment of the new user would similarly include representation of the application window 535".

As previously discussed herein, because the application window 535 is not shared between the first electronic device 560 and the second electronic device 570, the application window 535 is currently private to the user of the first electronic device 560 (e.g., but is not exclusive to the user of the first electronic device 560). Accordingly, as shown in FIG. 5E, the second electronic device 570 may display the representation of the application window 535" rather than the application window 535 in the three-dimensional environment 550B. However, if application window 535 corresponds to a shared window or application, the second electronic device 570 may similarly display application window 535 in three-dimensional environment 550B. Thus, one advantage of the disclosed method of grouping users in a multi-user communication session into spatial groups is that users may continue interacting with each other visually (e.g., via the two-dimensional representations of the users) and verbally (e.g., via the user audio) while an unobscured view of the immersive content is maintained in the three-dimensional environment. Additionally, grouping the users into different spatial groups helps prevent the immersive content from obscuring a viewpoint of or distracting other users who are not viewing the immersive content in the three-dimensional environment.

It should be understood that, while the immersive content 552 was described above as being an immersive art gallery, any type of immersive content can be provided. For example, the immersive content may refer to a video game, an immersive environmental rendering (e.g., a three-dimensional representation of a beach or a forest), a computer-generated model (e.g., a three-dimensional mockup of a house designed in a computer graphics application), and the like. Each of these types of immersive content optionally follow the above-described behavior for dictating the grouping of users into spatial groups within the multi-user communication session. In some examples, the immersive content may refer to any content that may be navigated by a user with three or six degrees of freedom.

As described above, while electronic devices are in a multi-user communication session, displaying private exclusive content at one electronic device causes the users of the electronic devices to be grouped into different spatial groups within the multi-user communication session. Attention is now directed to altering display of content that is shared among a first electronic device, a second electronic device, and a third electronic device in a multi-user communication session. As described below, changing a manner in which content (e.g., such as video content displayed in a two-dimensional application window) that is shared among the electronic devices is displayed in the three-dimensional environment optionally causes the users of the electronic devices to be grouped into different (e.g., separate) spatial groups within the multi-user communication session.

Figure 6A:
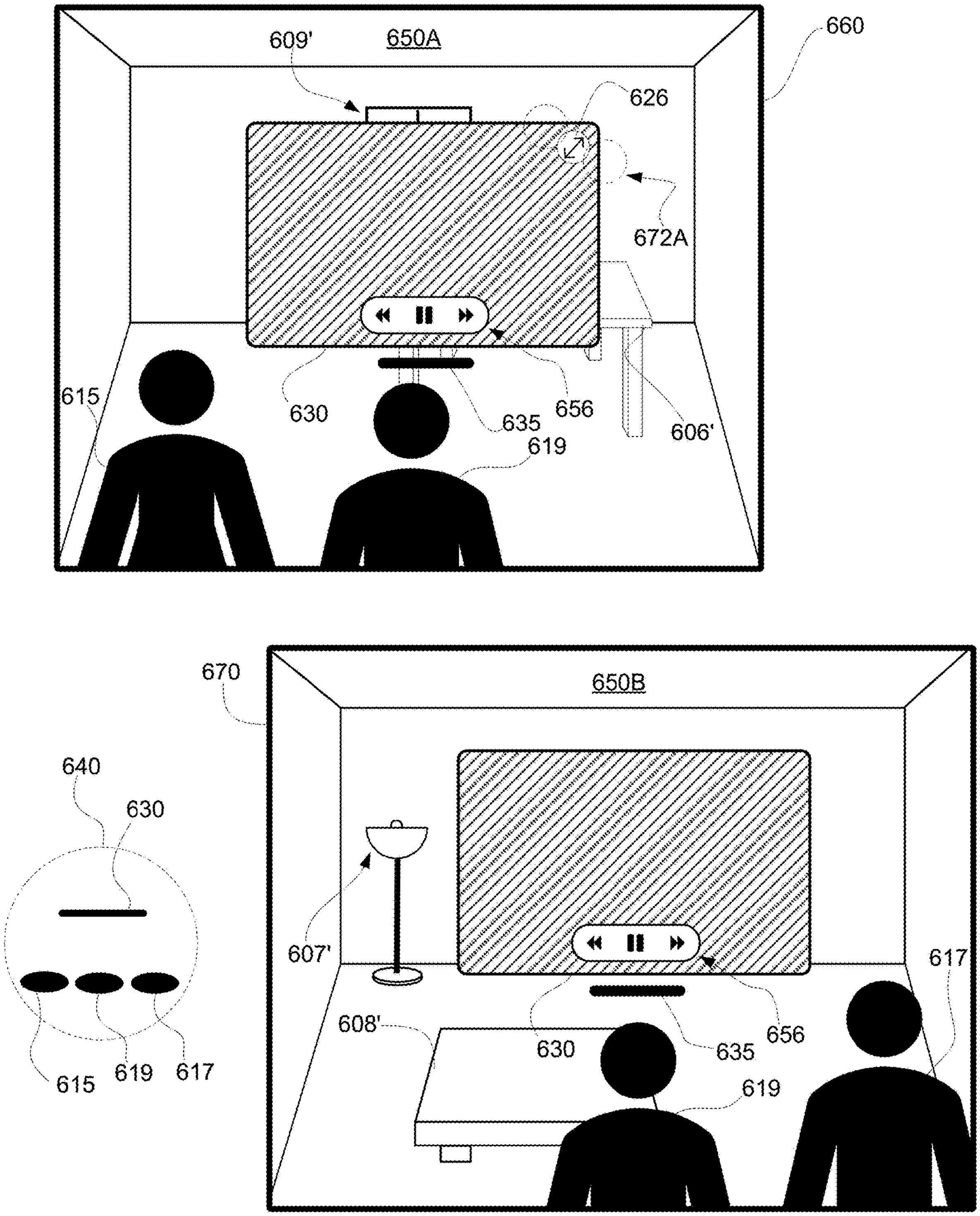
FIGS. 6A-6K illustrate example interactions within a spatial group in a multi-user communication session according to some examples of the disclosure.

FIGS. 6A-6K illustrate example interactions within a spatial group in a multi-user communication session according to some examples of the disclosure. In some examples, a first electronic device 660, a second electronic device 670, and a third electronic device (not shown) may be communicatively linked in a multi-user communication session, as shown in FIG. 6A. In some examples, while the first electronic device 660 is in the multi-user communication session with the second electronic device 670, the three-dimensional environment 650A is presented using the first electronic device 660 and the three-dimensional environment 650B is presented using the second electronic device 670. It should be understood that it then follows that the third electronic device (not shown) is displaying a three-dimensional environment (not shown) akin to the three-dimensional environments 650A/650B. In some examples, the electronic devices 660/670 optionally correspond to electronic devices 560/570 discussed above, electronic devices 460/470 in FIGS. 4A-4F, and/or electronic devices 360/370 in FIG. 3. In some examples, the three-dimensional environments 650A/650B include captured portions of the physical environment in which electronic device 660/670 is located. For example, the three-dimensional environment 650A includes a table (e.g., a representation of table 606') and a window (e.g., representation of window 609'), and the three-dimensional environment 650B includes a coffee table (e.g., representation of coffee table 608') and a floor lamp (e.g., representation of floor lamp 607'). In some examples, the three-dimensional environments 650A/650B optionally correspond to three-dimensional environments 550A/550B described above, three-dimensional environments 450A/450B in FIGS. 4A-4F, and/or three-dimensional environments 350A/350B in FIG. 3. As described above, the three-dimensional environments also include avatars 615/617 corresponding to users of the electronic devices 670/660. In some examples, the avatars 615/617 optionally correspond to avatars 515/517 described above, avatars 415/417 in FIGS. 4A-4F, and/or avatars 315/317 in FIG. 3. Further, as shown in FIG. 6A, the three-dimensional environments 650A/650B also include an avatar 619 corresponding to a user of the third electronic device (not shown).

As shown in FIG. 6A, the first electronic device 660 is optionally displaying an application window 630 associated with a respective application running on the first electronic device 660 (e.g., an application configurable to display content in the three-dimensional environment 650A, such as a video player application). For example, as shown, the application window 630 is optionally displaying video content (e.g., corresponding to a movie, television episode, or other video clip) that is visible to the user of the first electronic device 660. In some examples, the application window 630 is displayed with a grabber affordance (e.g., a handlebar) 635 that is selectable to initiate movement of the application window 630 within the three-dimensional environment 650A. Additionally, as shown in FIG. 6A, the application window may include playback controls 656 that are selectable to control playback of the video content displayed in the application window 630 (e.g., rewind the video content, pause the video content, fast-forward through the video content, etc.).

In some examples, the application window 630 may be a shared virtual object in the shared three-dimensional environment. For example, as shown in FIG. 6A, the application window 630 may also be displayed in the three-dimensional environment 650B at the second electronic device 670. As shown in FIG. 6A, the application window 630 may be displayed with the grabber affordance 635 and the playback controls 656 discussed above. In some examples, because the application window 630 is a shared virtual object, the application window 630 (and the video content of the application window 630) may also be visible to the user of the third electronic device (not shown).

As previously discussed herein, in FIG. 6A, the user of the first electronic device 660, the user of the second electronic device 670, and the user of the third electronic device (not shown) may be in a first spatial group (e.g., a baseline spatial group) 640 within the multi-user communication session. In some examples, the first spatial group 640 optionally corresponds to spatial group 540 discussed above, spatial group 440 discussed above with reference to FIGS. 4A-4F, and/or spatial group 340 discussed above with reference to FIG. 3. As similarly described above, while the user of the first electronic device 660, the user of the second electronic device 670, and the user of the third electronic device (not shown) are in the first spatial group 640 within the multi-user communication session, the users have a first spatial arrangement in the shared three-dimensional environment (e.g., represented by the locations of and/or distance between the ovals 615, 617, and 619 in the circle 640 in FIG. 6A), such that the first electronic device 660, the second electronic device 670, and the third electronic device (not shown) maintain consistent spatial relationships (e.g., spatial truth) between locations of the viewpoints of the users (e.g., which correspond to the locations of the avatars 617/615/619 within the circle 640) and virtual content at each electronic device (e.g., the application window 630). As shown in FIG. 6A, in the first spatial group 640, the users (e.g., represented by their avatars 615, 619, and 617) are positioned side-by-side with a front-facing surface of the application window 630 facing toward the users.

In some examples, as previously discussed above, the user of the first electronic device 660 and the user of the second electronic device 670 become associated with (e.g., grouped into) different spatial groups within the multi-user communication session when one of the electronic devices changes states. For example, if one of the electronic device changes states, the electronic device transmits an indication (e.g., directly or indirectly) to the other electronic device(s) in the multi-user communication session indicating that the electronic device has changed states. As described in more detail below, an electronic device in the multi-user communication session changes state when a manner in which shared content is presented in the shared three-dimensional environment changes.

In some examples, the video content of the application window 630 is being displayed in a window mode in the shared three-dimensional environment. For example, the video content displayed in the three-dimensional environment is bounded/limited by a size of the application window 630, as shown in FIG. 6A. In some examples, the video content of the application window 630 can alternatively be displayed in a full-screen mode in the three-dimensional environment. As used herein, display of video content in a "full-screen mode" in the three-dimensional environments 650A/650B optionally refers to display of the video content at a respective size and/or with a respective visual emphasis in the three-dimensional environments 650A/650B. For example, the electronic devices 660/670 may display the video content at a size that is larger than (e.g., 1.2×, 1.4×, 1.5×, 2×, 2.5×, or 3×) the size of the application window 630 displaying the video content in three-dimensional environments 650A/650B. Additionally, for example, the video content may be displayed with a greater visual emphasis than other virtual objects and/or representations of physical objects displayed in three-dimensional environments 650A/650B. As described in more detail below, while the video content is displayed in the full-screen mode, the captured portions of the physical environment surrounding the electronic devices may become faded and/or darkened in the three-dimensional environment. As shown in FIG. 6A, the application window 630 in the three-dimensional environment 650A may include a selectable option 626 that is selectable to cause the video content of the application window 630 to be displayed in the full-screen mode.

Figure 6B:
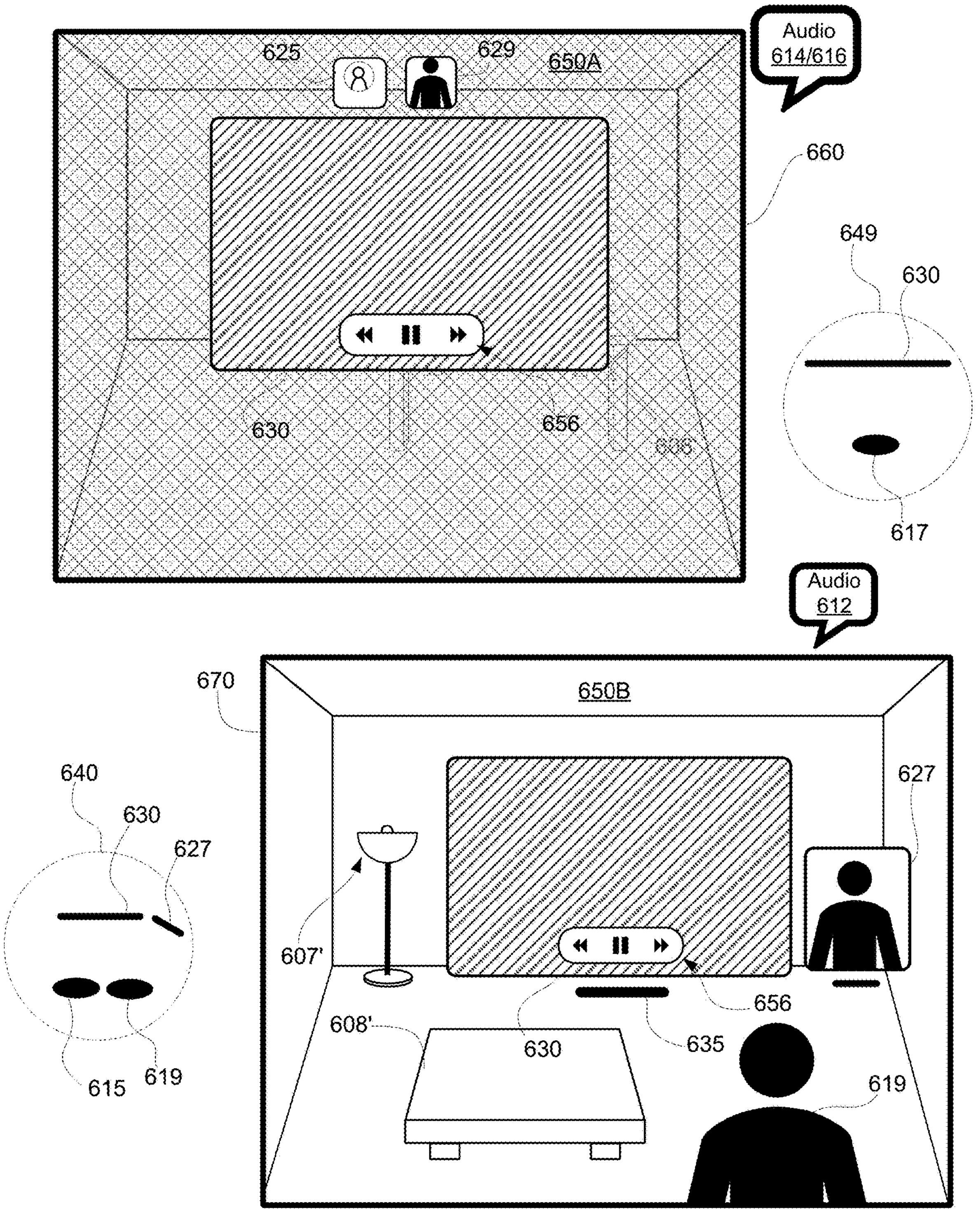

As shown in FIG. 6A, the user of the first electronic device 660 is optionally providing a selection input 672A directed to the selectable option 626 in the application window 630. For example, the first electronic device 660 detects a pinch input (e.g., one in which the index finger and thumb of the user come into contact), a tap or touch input (e.g., provided by the index finger of the user), a verbal command, or some other direct or indirect input while the gaze of the user of the first electronic device 660 is directed to the selectable option 626. In some examples, in response to receiving the selection input 672A, the first electronic device 660 displays the video content in three-dimensional environment 650A in the full-screen mode, as shown in FIG. 6B. For example, as shown in FIG. 6B, the first electronic device 660 increases the size of the application window 630 that is displaying the video content and docks (e.g., positions the application window at a fixed location (e.g., a central location)) in the three-dimensional environment 650A (e.g., such that the application window 630 is no longer movable in the three-dimensional environment 650A while the full-screen mode is active). Additionally, in some examples, when presenting the video content in the full-screen mode, the first electronic device 660 visually deemphasizes display of the representations of the captured portions of the physical environment surrounding the first electronic device 660. For example, as shown in FIG. 6B, the representation of the table 606', the representation of the window 609' and the representations of the floor, ceiling, and walls surrounding the first electronic device 660 may be visually deemphasized (e.g., faded, darkened, or adjusted to be translucent or transparent) in the three-dimensional environment 650A such that attention of the user is drawn predominantly to the video content in the enlarged application window 630.

As described herein, the first electronic device 660, the second electronic device 670, and the third electronic device (not shown) are in a multi-user communication session, such that the first electronic device 660, the second electronic device 670, and the third electronic device optionally display the shared three-dimensional environments 650A/650B. Because the first electronic device 660 is now displaying the video content of the application window 630 in the full-screen mode in the three-dimensional environment 650A, as shown in FIG. 6B, the first electronic device 660, the second electronic device 670, and the third electronic device are no longer operating in the same state. For example, as similarly discussed above, the first electronic device 660, the second electronic device 670, and the third electronic device are operating in the same state when the presentation of content in the shared three-dimensional environment is synchronized among the three electronic devices. As discussed above, in FIG. 6A, the first electronic device 660, the second electronic device 670, and the third electronic device (not shown) are displaying the shared application window 630 (e.g., the shared application window 630 is visible to and interactive to all three users in the multi-user communication session). In some examples, when the first electronic device 660 displays the video content of the application window 630 in the full-screen mode in the three-dimensional environment 650A, the display of the video content in the full-screen mode is exclusive to the user of the first electronic device 660. For example, though the user of the first electronic device 660 has elected to view the video content in the full-screen mode at the first electronic device 660, the user of the second electronic device 670 and the user of the third electronic device (not shown) are still viewing the shared application window in the window-mode at their respective electronic devices. Accordingly, the display of the video content in the full-screen mode at the first electronic device is localized for the user of the first electronic device 660, which causes the first electronic device 660, the second electronic device 670, and the third electronic device (not shown) to no longer all operate in the same state.

In some examples, the user of the first electronic device 660 may be grouped into a different spatial group from the user of the second electronic device 670 and the third electronic device within the multi-user communication session when the three electronic devices are no longer operating in the same state. For example, as shown in FIG. 6B, the user of the first electronic device 660 becomes associated with a second spatial group 649 that is different from (e.g., separate from) the first spatial group 640 in the multi-user communication session. In some examples, the spatial group 649 corresponds to a shared exclusive spatial group (e.g., because the user of the first electronic device 660 is viewing shared exclusive content in the form of the full-screen video content in the shared application window 630). Additionally, as shown in FIG. 6B, the user of the second electronic device 670 and the user of the third electronic device (not shown) remain in the first spatial group 640 in the multi-user communication session. For example, the second electronic device 670 and the third electronic device are still operating in the same state, and thus remain in the same spatial group (e.g., spatial group 640), because the shared application window 630 is still being displayed in the window mode in the three-dimensional environments displayed at the second electronic device 670 and the third electronic device.

As shown in FIG. 6B, because the user of the first electronic device 660 is no longer in the same spatial group as the user of the second electronic device 670 and the user of the third electronic device (not shown), the three-dimensional environments 650A/650B are no longer a true shared environment. Accordingly, the first electronic device 660 ceases displaying the avatar 615 corresponding to the user of the second electronic device 670 and the avatar 619 corresponding to the user of the third electronic device (not shown). In some examples, as shown in FIG. 6B, because the user of the second electronic device 670 and the user of the third electronic device remain in the first spatial group 640, the avatars 615/619 corresponding to the users of the second electronic device 670 and the third electronic device remain displayed. For example, as shown in FIG. 6B, the second electronic device 670 ceases displaying the avatar 617 corresponding to the user of the first electronic device 660 but maintains display of the avatar 619 corresponding to the user of the third electronic device (not shown) in the three-dimensional environment 650B.

In some examples, as shown in FIG. 6B, the first electronic device 660 replaces display of the avatars 615/619 with two-dimensional representations corresponding to the users of the other electronic devices. For example, as shown in FIG. 6B, the first electronic device 660 displays a first two-dimensional representation 625 and a second two-dimensional representation 629 in the three-dimensional environment 650A. In some examples, as similarly discussed above, the two-dimensional representations 625/629 include an image, video, or other rendering that is representative of the user of the second electronic device 670 and the user of the third electronic device. Similarly, the second electronic device 670 and the third electronic device (not shown) replaces display of the avatar 617 corresponding to the user of the first electronic device 660 with a two-dimensional representation corresponding to the user of the first electronic device 660. For example, as shown in FIG. 6B, the second electronic device 670 displays a two-dimensional representation 627 that optionally includes an image, video, or other rendering that is representative of the user of the first electronic device 660. As shown in FIG. 6B, the first electronic device 660 may display the two-dimensional representations 625/629 in a predetermined region of the display of the first electronic device 660. For example, as shown in FIG. 6B, the first electronic device 660 displays the two-dimensional representations 625/629 in a top/upper region of the display (e.g., similar to the display of the plurality of user interface objects 418 in FIG. 4B). The second electronic device 670 and the third electronic device (not shown) may display the two-dimensional representation 627 corresponding to the user of the first electronic device 660 relative to the shared application window 630. For example, as shown in FIG. 6B, the second electronic device 670 displays the two-dimensional representation 627 with (e.g., adjacent to) the application window 630 in the three-dimensional environment 650B.

As similarly described above, the display of avatars 615/617/619 in three-dimensional environments 650A/650B is optionally accompanied by the presentation of an audio effect corresponding to a voice of each of the users of the three electronic devices, which, in some examples, may be spatialized such that the audio appears to the users of the three electronic devices to emanate from the locations of avatars 615/617/619 in the three-dimensional environments 650A/650B. In some examples, as shown in FIG. 6B, when the avatars 615/619 cease to be displayed in the three-dimensional environment 650A at the first electronic device 660, the first electronic device 660 maintains the presentation of the audio of the users of the second electronic device 670 and the third electronic device (not shown), as indicated by audio bubbles 614/616. Similarly, when the avatar 617 ceases to be displayed in the three-dimensional environment 650B at the second electronic device 670, the second electronic device 670 maintains the presentation of the audio of the user of the first electronic device 660, as indicated by audio bubble 612. However, in some examples, the audio of the users of the electronic devices may no longer be spatialized and may instead be presented in mono or stereo. Thus, despite the avatars 615/619 no longer being displayed in the three-dimensional environment 650A and the avatar 617 no longer being displayed in the three-dimensional environment 650B, the users of the three electronic devices may continue communicating (e.g., verbally) since the first electronic device 660, the second electronic device 670, and the third electronic device (not shown) are still in the multi-user communication session. In other examples, the audio of the users of the electronic devices may be spatialized such that the audio appears to emanate from their respective two-dimensional representations 625/627/629.

In some examples, when the user of the first electronic device 660 is grouped into the second spatial group 649 that is separate from the first spatial group 640, the user of the second electronic device 670 and the user of the third electronic device (not shown) are arranged in a new spatial arrangement (e.g., spatial template) within the first spatial group 640. For example, as discussed above, in FIG. 6A, the users of the three electronic devices (e.g., represented by ovals 615, 617, and 619 in the circle 640 in FIG. 6A) are arranged side-by-side in a line within the first spatial group 640, where the user of the third electronic device (e.g., represented by oval 619) is positioned in the middle of the line. As shown in FIG. 6B, when the user of the first electronic device 660 is grouped into the second spatial group 649, the user of the second electronic device (e.g., represented by oval 615) and the user of the third electronic device (e.g., represented by oval 619) are shifted to the left in the spatial group 640, such that an average position of the user of the second electronic device and the user of the third electronic device is centered with respect to the shared application window 630.

As mentioned previously herein, in some examples, while the users of the three electronic devices are grouped in separate spatial groups within the multi-user communication session, the users experience spatial truth that is localized based on the spatial group each user is located in. For example, as previously discussed above, the display of content (and subsequent interactions with the content) in the three-dimensional environment 650A at the first electronic device 660 may be independent of the display of content in the three-dimensional environment 650B at the second electronic device 670, though the content of the application window(s) may still be synchronized (e.g., the same portion of video content (e.g., movie or television show content) is being played back in the application window(s) across the first electronic device 660 and the second electronic device 670). As an example, if the first electronic device 660 detects a scrubbing input (or similar input) provided by the user of the first electronic device 660 directed to the application window 630 in the three-dimensional environment 650A that causes the playback position within the video content to change (e.g., rewind, fast-forward, pause, etc.), the second electronic device 670 would also update the playback position within the video content in the application window 630 in the three-dimensional environment 650B to maintain synchronization of the playback of the video content.

Figure 6C:
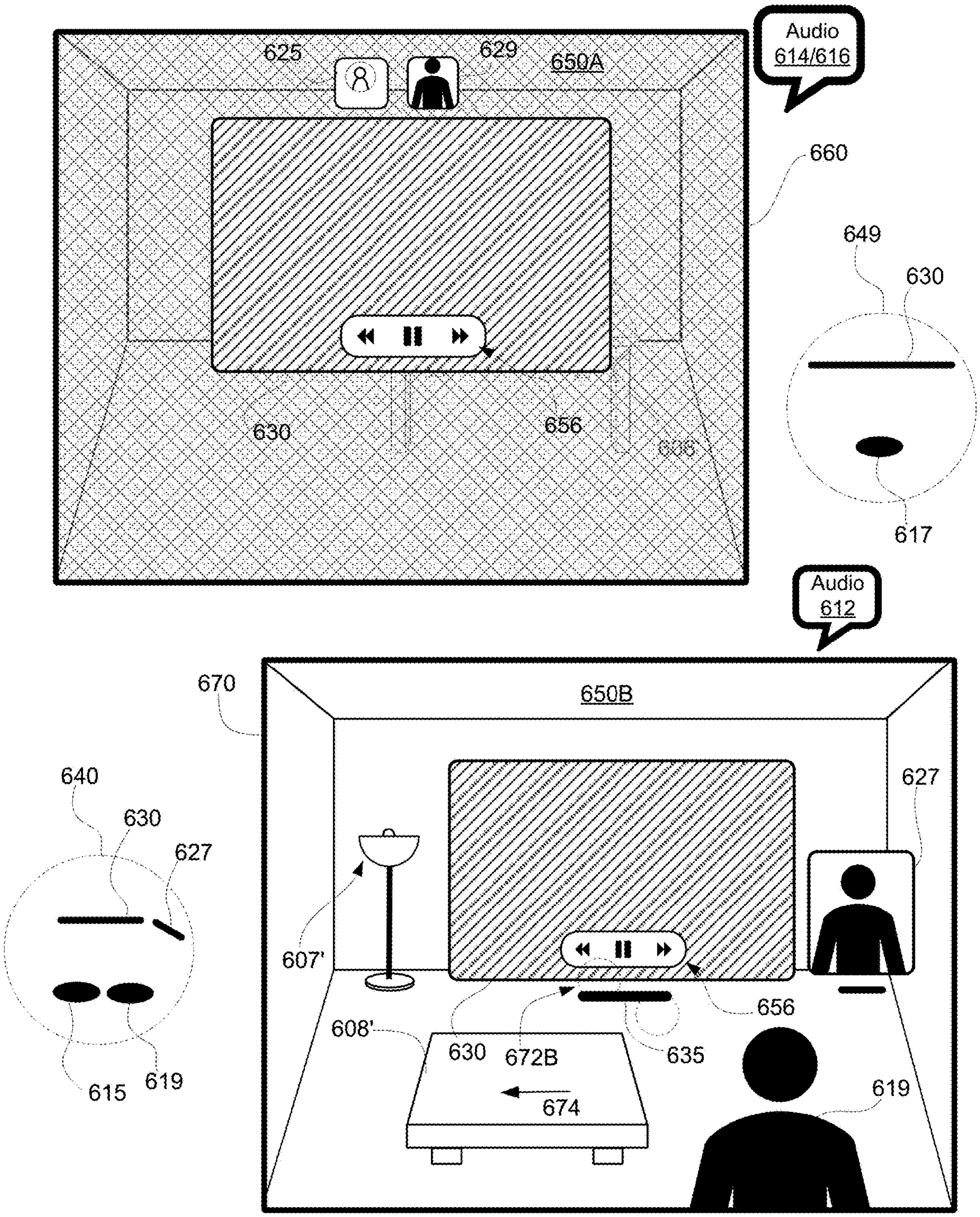

As an example, as shown in FIG. 6C, the user of the second electronic device 670 may provide input corresponding to a request to move the application window 630 within the three-dimensional environment 650B. In some examples, as shown in FIG. 6C, the second electronic device 670 receives a selection input 672B directed to the grabber affordance 635, followed by a movement input 674. For example, the second electronic device 670 receives a pinch or tap input provided by a hand of the user of the second electronic device 670 while the gaze of the user is directed to the application window 630, followed by movement of the hand of the user in space (e.g., leftward in space).

Figure 6D:
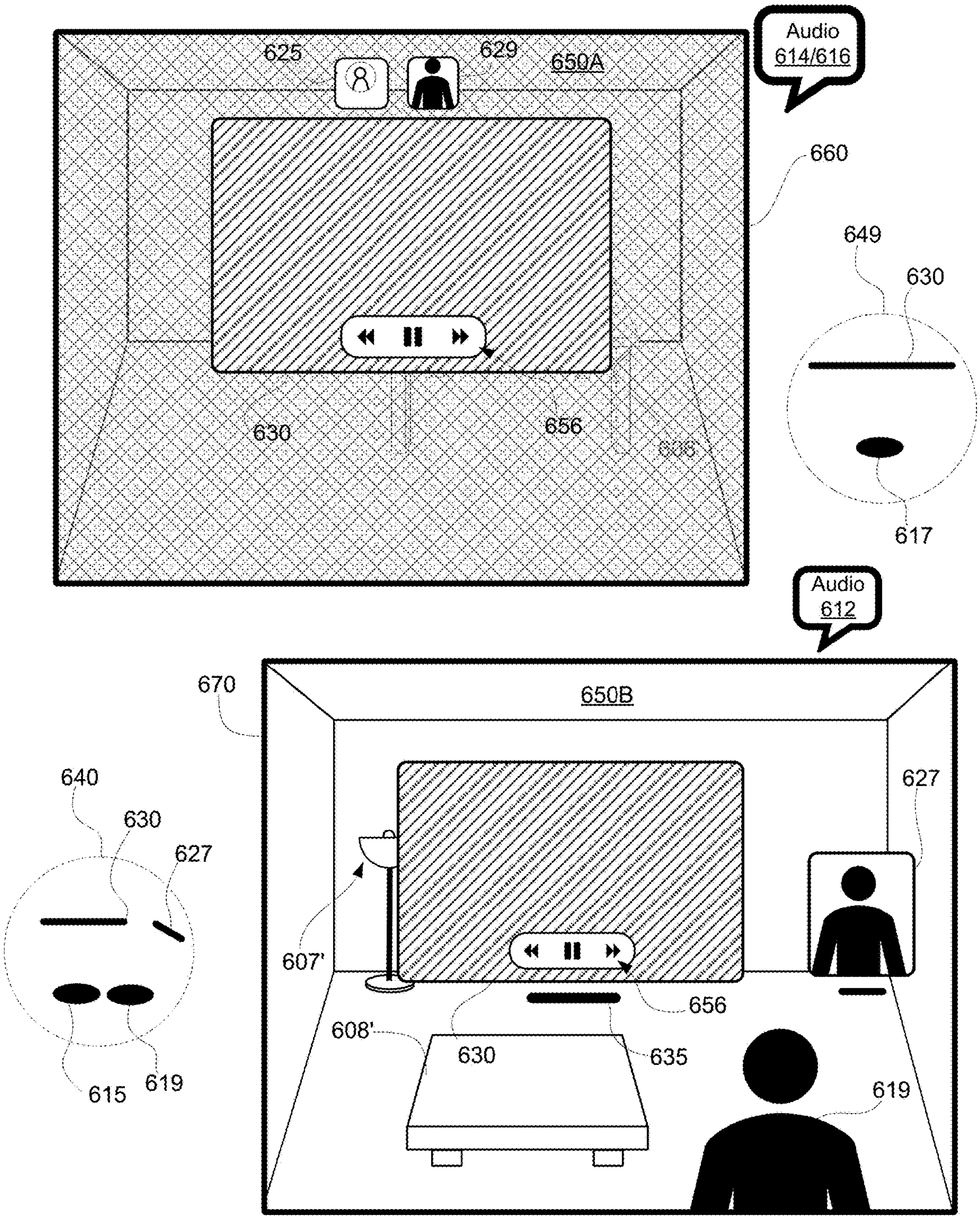

In some examples, in response to receiving the selection input 672B followed by the movement input 674, the second electronic device 670 moves the application window 630 in accordance with the movement input 674. For example, as shown in FIG. 6D, the second electronic device 670 moves the application window 630 leftward in the three-dimensional environment 650B. It should be understood that, because the user of the second electronic device 670 and the user of the third electronic device (not shown) are in the first spatial group 640 within the multi-user communication session, the application window 630 also moves in the three-dimensional environment displayed at the third electronic device (e.g., as similarly indicated by the leftward movement of the line 630 (e.g., representing the application window 630 in three-dimensional environment 650B) in the circle 640). As shown in FIG. 6D, because the user of the first electronic device 660 is located in the second spatial group 649 within the multi-user communication session, the movement of the application window 630 at the second electronic device 670 has no effect on the virtual elements displayed at the first electronic device 660, as similarly discussed above. For example, as shown in FIG. 6D, the movement of the application window 630 in the three-dimensional environment 650B at the second electronic device 670 does not cause the application window 630 in the three-dimensional environment 650A to move (and does not cause the two-dimensional representations 625/629 to move).

It should be understood that additional or alternative interactions with virtual objects in the shared three-dimensional environment are localized to the spatial group in which the particular users in the multi-user communication session are located. For example, similar to the example provided in FIG. 6C, if the second electronic device 670 detects an input corresponding to a request to resize (e.g., scale) the application window 630, the second electronic device 670 resizes the application window 630 in response to the input but the first electronic device 660 does not resize the application window 630 in the three-dimensional environment 650A because the user of the first electronic device 660 and the user of the second electronic device 670 are located in different spatial groups, as similarly discussed above.

In some examples, a respective spatial group that is associated with the multi-user communication session may be associated with a local driver (e.g., a particular electronic device associated with a user in the multi-user communication session) that is configured to control one or more aspects of the display of shared content within the respective spatial group. For example, the local driver controls a location at which shared content is displayed in the three-dimensional environment, a size at which the shared content is displayed in the three-dimensional environment, and/or an orientation with which the shared content is displayed in the three-dimensional environment. Accordingly, in some examples, if the local driver causes one or more aspects of the display of the shared content (e.g., location, size, orientation, etc.) to change in a particular spatial group, the display of the shared content will be synchronized for other users who are also in the spatial group, such that changes in the one or more aspects of the display of the shared content are reflected in the respective three-dimensional environments of the other users (e.g., as similarly described above).

In some examples, the local driver corresponds to the user in the multi-user communication session who initially shared the content with the other users in the multi-user communication session within the same spatial group (e.g., such that the content becomes viewable to the other users, such as application window 630 in FIG. 6A above). In some such examples, if the local driver corresponds to the user who shared the content in the shared three-dimensional environment, input directed to the shared content provided by another user, different from the user who shared the content, will not update one or more aspects of the display of the shared content within the spatial group. In other words, only the local driver is optionally able to update the one or more aspects of the display of the shared content within the spatial group. For example, in FIG. 6H, the user of the first electronic device 660 is the local driver (e.g., because the user of the first electronic device 660 is the sharer of the application window 630), as indicated by placement of star 655 with oval 617 corresponding to the user of the first electronic device 660 within spatial group 640. Accordingly, as discussed above, in some examples, inputs directed to the application window 630 for updating one or more aspects of the display of the application window 630 (e.g., a location, size, and/or orientation of the application window 630) are responded to only if the input is provided by the user of the first electronic device 660 (e.g., and thus detected by the first electronic device 660).

In some examples, the local driver is updated based on input(s) that cause an orientation mode of the application window 630 to change in the shared three-dimensional environment. For example, as shown in FIG. 6H, the application window 630 is currently displayed in a “landscape” orientation mode (e.g., such that a length of the application window is longer than a height of the application window 630). In some examples, as shown in FIG. 6H, the application window 630 is displayed with an orientation affordance 646 that is selectable to change the orientation mode of the application window 630. In FIG. 6H, because the application window 630 is displayed in the landscape orientation mode as discussed above, the orientation affordance 646 is optionally selectable to update display of the application window 630 to have a “portrait” orientation mode (e.g., such that the length of the application window is shorter than the height of the application window 630). In some examples, input directed toward the orientation affordance 646 is independent of who the local driver currently corresponds to, as discussed in more detail below.

Figure 6E:
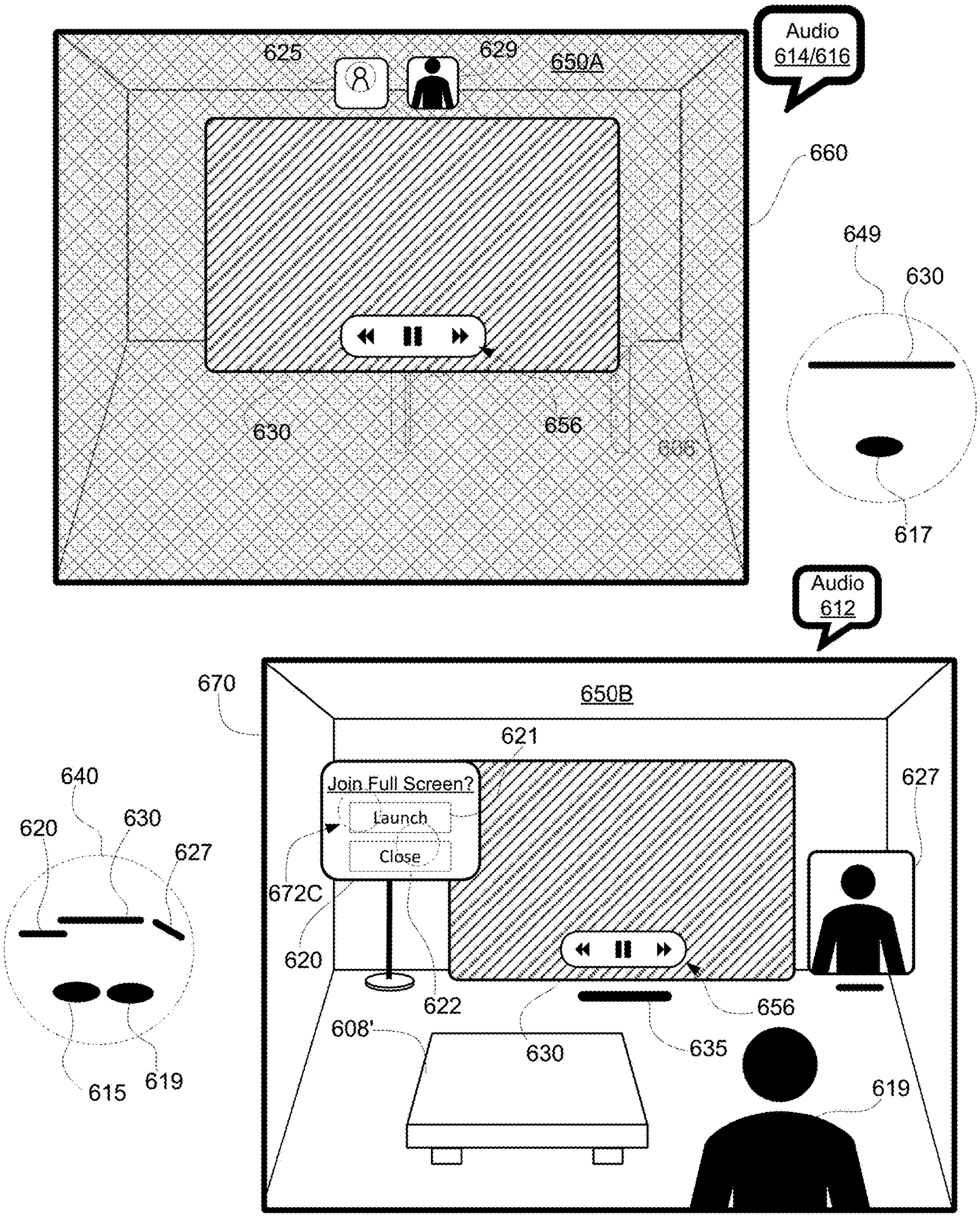
Figure 6F:
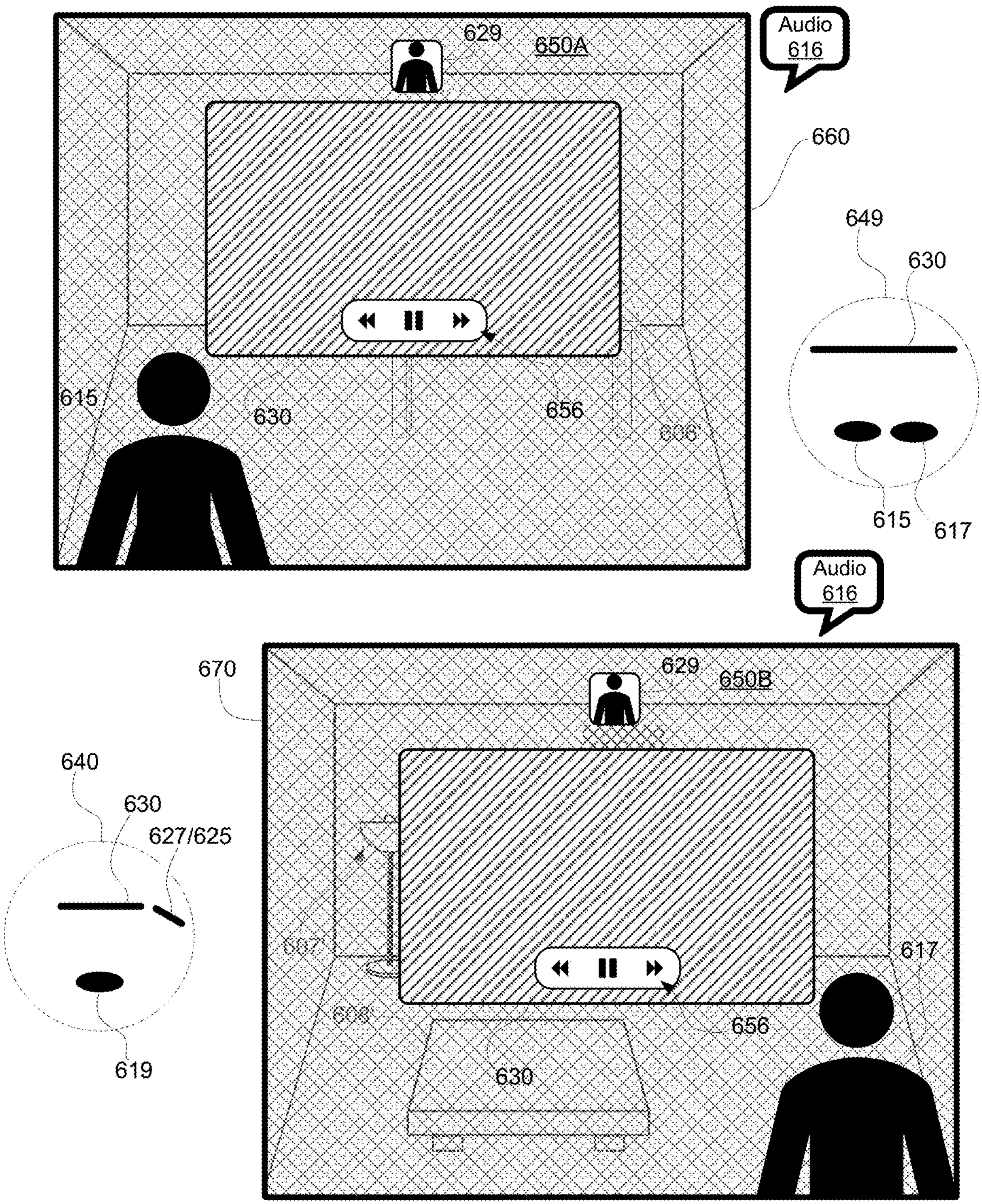
Figure 6G:
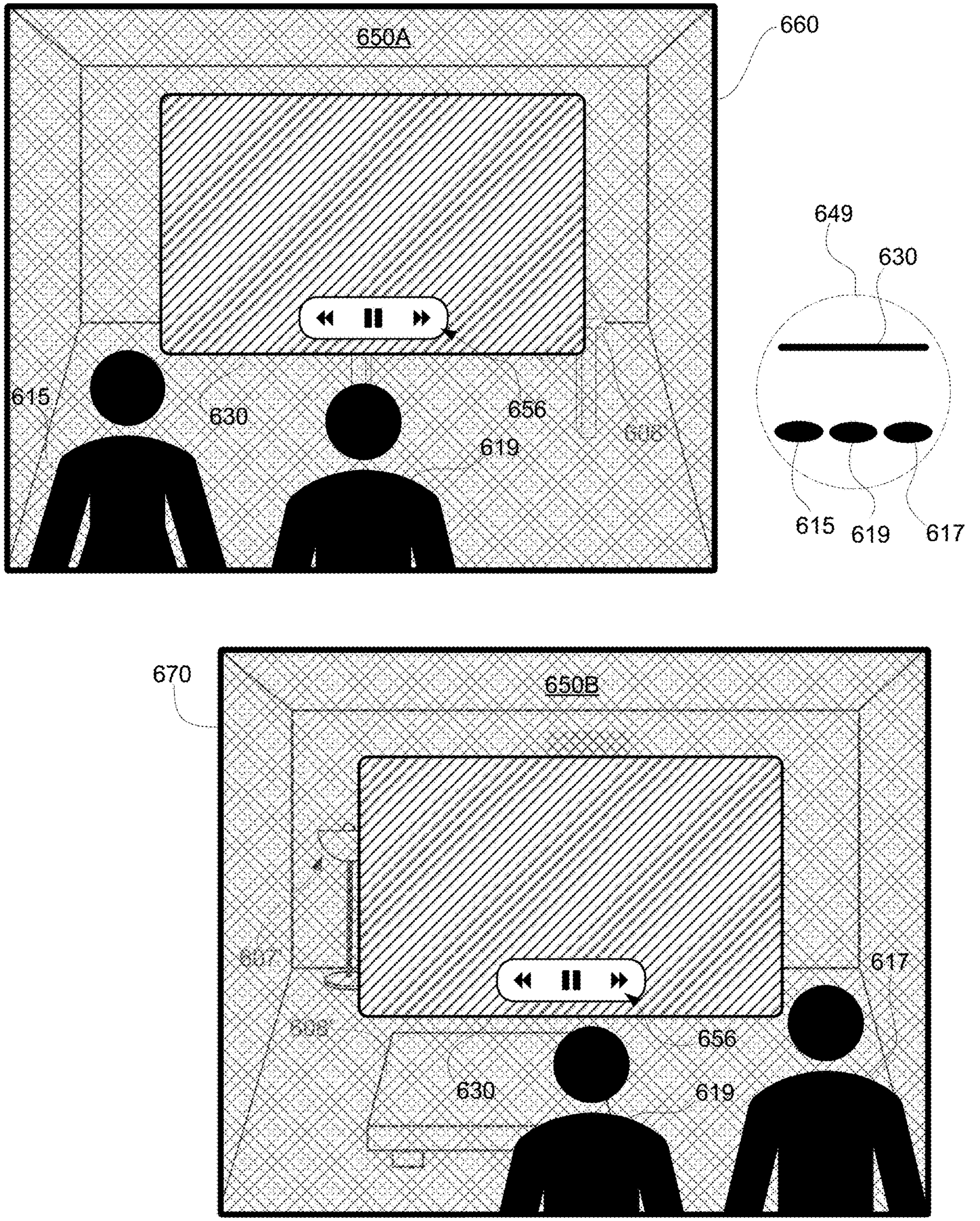
Figure 6H:
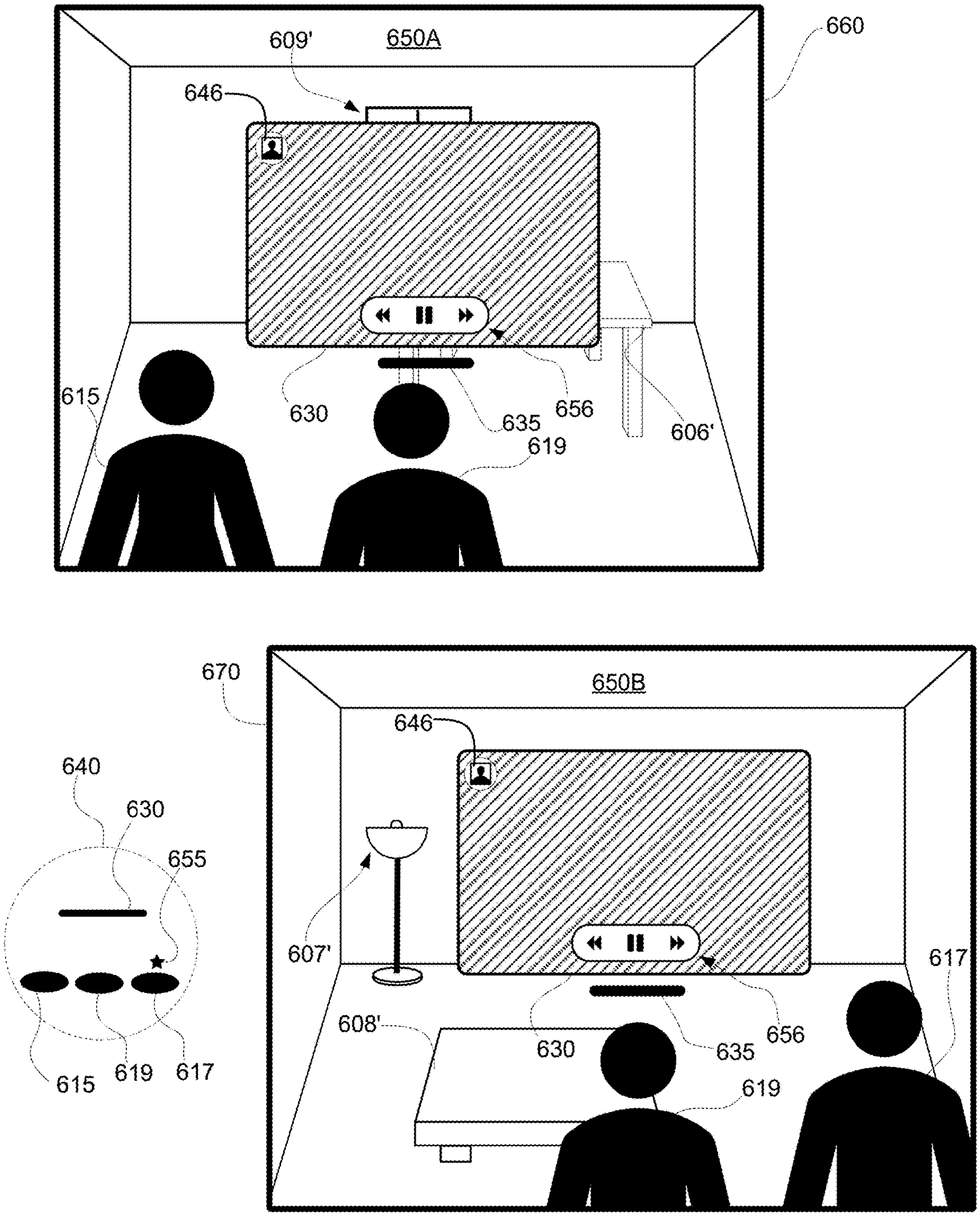
Figure 6I:
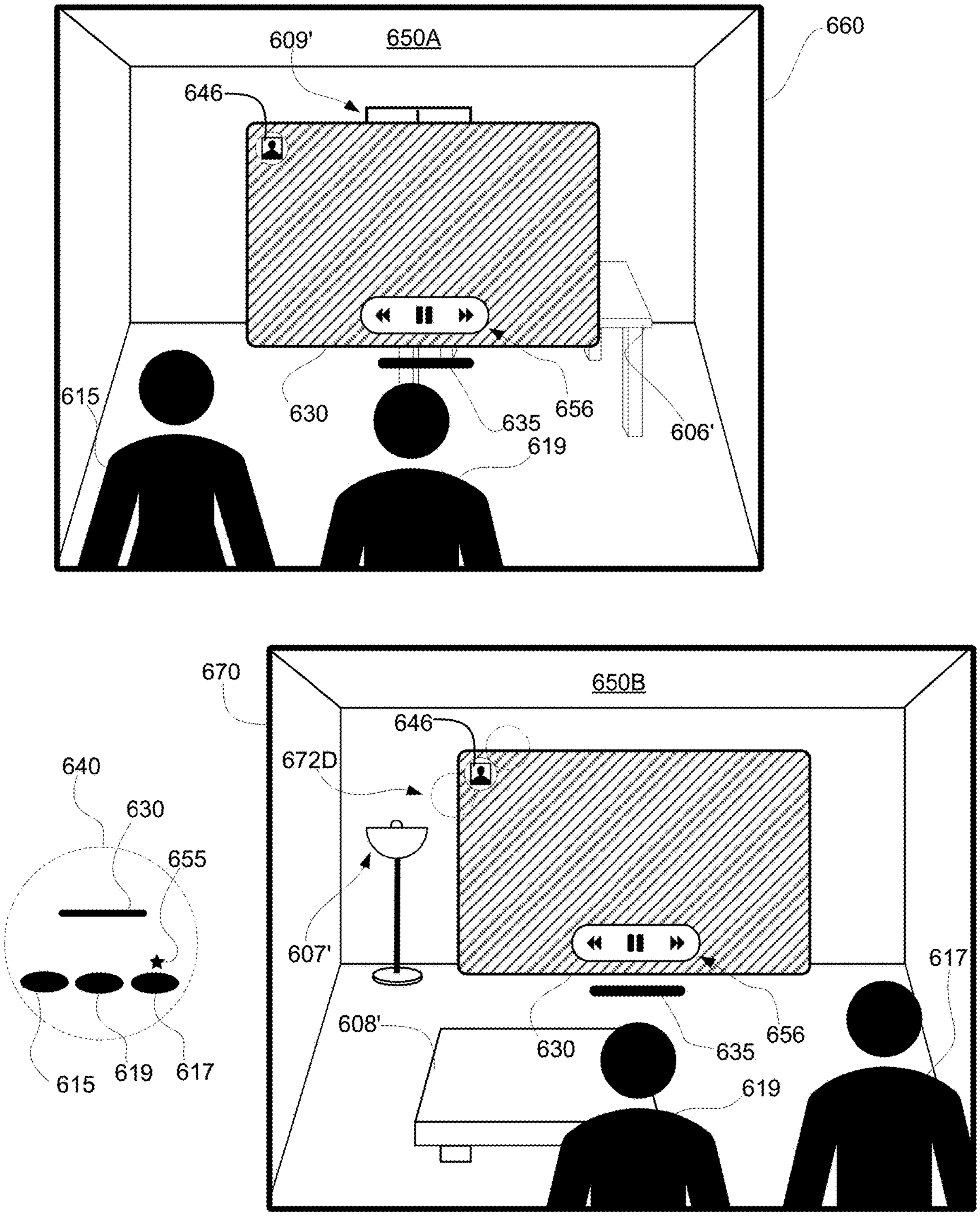

In FIG. 6I, the second electronic device 670 detects a selection input 672D directed to the orientation affordance 646 displayed in the three-dimensional environment 650B. For example, as discussed herein, the second electronic device 670 detects an air gesture, such as an air pinch gesture, an air tap or touch gesture, a gaze dwell, a verbal command, etc. corresponding to a request to select the orientation affordance 646. As mentioned above, in some examples, interaction with the orientation affordance 646 is not limited to the local driver, which currently corresponds to the user of the first electronic device 660. Accordingly, in FIG. 6I, the second electronic device 670 responds to the selection input 672D provided by the user of the second electronic device 670.

Figure 6J:
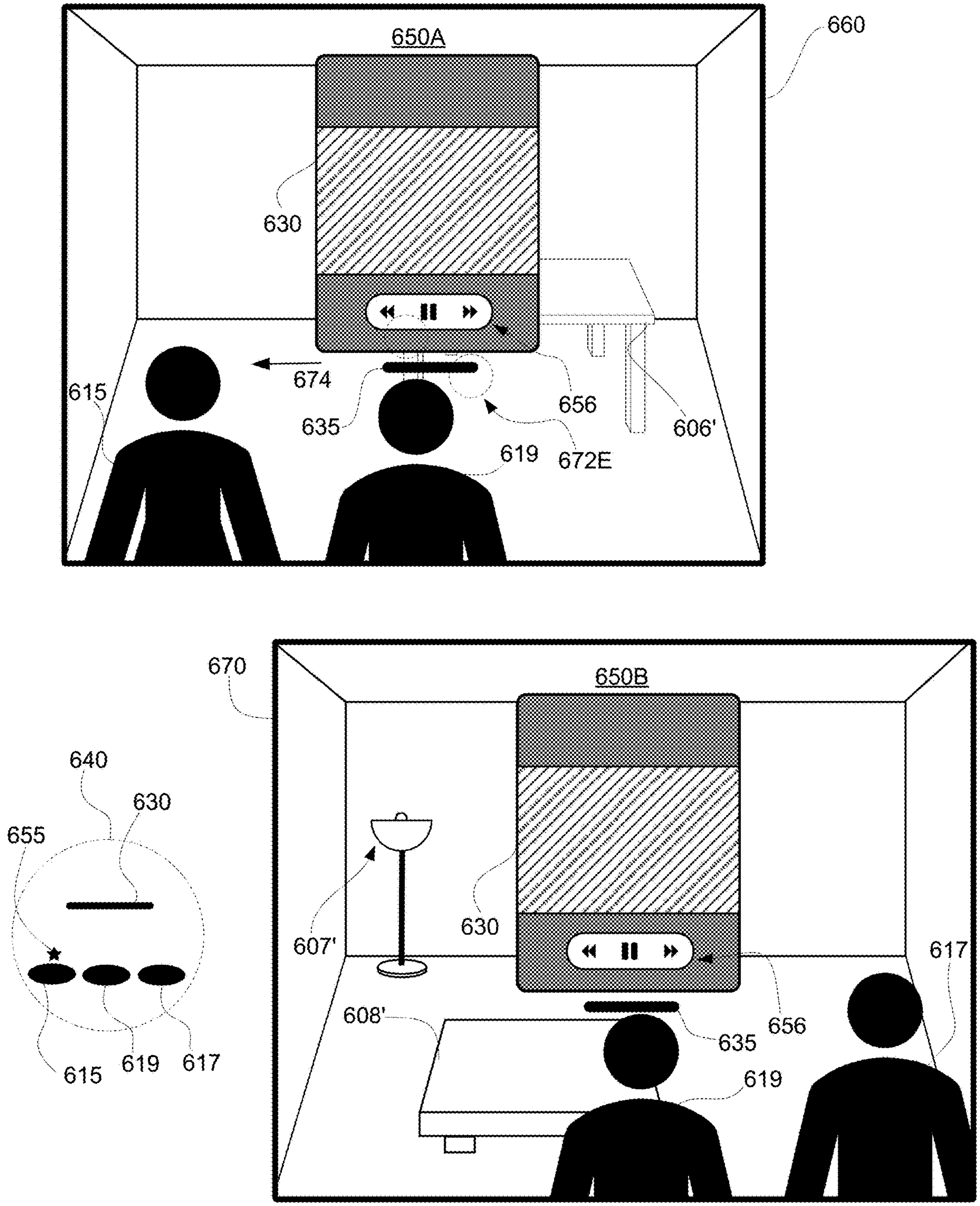

In some examples, as shown in FIG. 6J, in response to detecting the selection input 672D, the first electronic device 660 and the second electronic device 670 (e.g., and the electronic device associated with the other users in the spatial group 640) update display of the application window 630 to transition from being displayed in the landscape orientation mode to being displayed in the portrait orientation mode discussed above in the three-dimensional environment 650A/650B. As shown in FIG. 6J, when the application window 630 is displayed in the portrait orientation mode in response to detecting the selection input 672D, the video content itself is also updated to be displayed in the portrait orientation mode in the three-dimensional environment 650A/650B. Additionally, in some examples, as shown in FIG. 6J, when the application window 630 is updated to be displayed in the portrait orientation mode, the playback controls 656 and the grabber bar 635 remain horizontally aligned such that to remain interactive and understandable to the users.

In some examples, when the orientation mode of the application window 630 is updated in response to the selection of the orientation affordance 646 in FIG. 6I, the local driver is updated to no longer correspond to the user of the first electronic device 660 and to now correspond to a different user in the spatial group 640. In some examples, the user who provided the input selecting the orientation affordance 646 (thereby causing the orientation mode of the application window 630 to be updated as shown in FIG. 6J) becomes the local driver in the spatial group 640. Accordingly, in FIG. 6J, as indicated by the placement of star 655 with oval 615 in the spatial group 640, the user of the second electronic device 670 corresponds to the local driver of the spatial group 640.

As discussed previously above, in some examples, interactions directed to the application window 630 that cause one or more aspects of the display of the application window 630 to be updated (e.g., other than the orientation mode as discussed above) are permitted only for the local driver of the spatial group 640. Accordingly, in the example of FIG. 6J, because the user of the second electronic device 670 corresponds to the local driver, only the user of the second electronic device 670 is able to provide input for changing the location, size, and/or orientation (e.g., a tilt or rotation rather than the orientation mode) of the application window 630. In FIG. 6J, while the local driver corresponds to the user of the second electronic device 670, the first electronic device 660 detects a movement input 674 directed to the application window 630 in the three-dimensional environment 650A. For example, as shown in FIG. 6J, the first electronic device 660 detects a selection input 672E of the application window 630, followed by movement (e.g., of the hand of the user) leftward in the three-dimensional environment 650A.

Figure 6K:
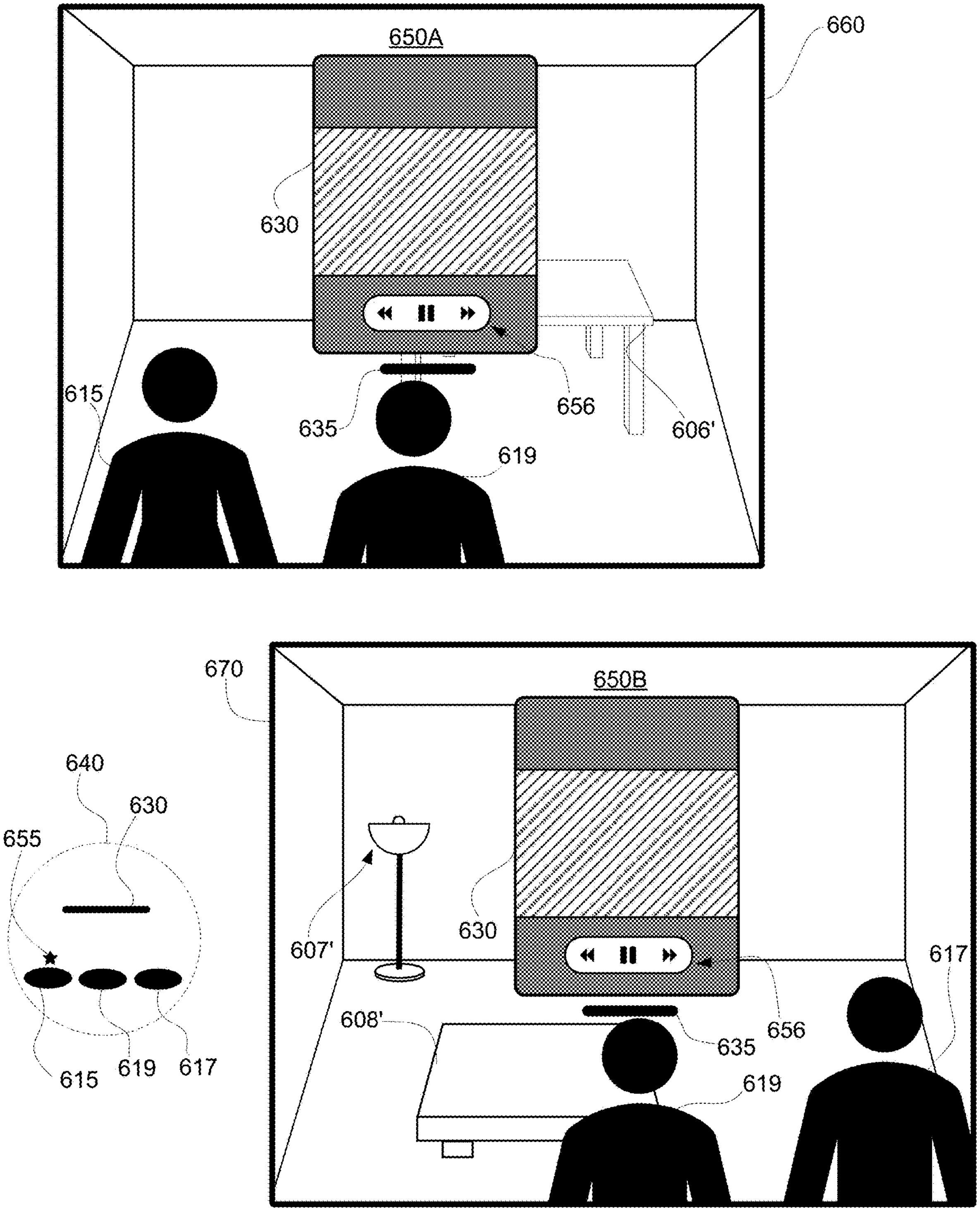

In some examples, as shown in FIG. 6K, in response to detecting the movement input 674, the first electronic device 660 forgoes moving the application window 630 in accordance with the movement input in the three-dimensional environment 650A. Additionally, as shown in FIG. 6K, the second electronic device 670 does not move the application window 630 in the three-dimensional environment 650B based on the movement input 672E detected at the first electronic device 660. As discussed above, the location of the application window 630 is optionally not updated within the spatial group 640 because the movement input for changing the location of the application window 630 was not provided by the local driver (e.g., the user of the second electronic device 670). Accordingly, as discussed above, providing a local driver for a particular spatial group helps maintain spatial consistency of users and content within the spatial group and/or helps prevent and/or reduce instances of erroneous and/or repetitive inputs that could negatively impact the users' experience of shared content within the spatial group.

In some examples, it may be advantageous to facilitate user input for maintaining the users in the multi-user communication session within the same spatial group. For example, the display of avatars of users of electronic devices in a shared three-dimensional environment while the electronic devices are in the multi-user communication session enables the users to experience content in the shared three-dimensional environment with an indication of the presence of the other users, which enhances the users' collective shared experience and interactions. As discussed herein above, changing states of one of the electronic devices in the multi-user communication session causes the user of the electronic device to be grouped into a separate spatial group in the multi-user communication session, which breaks continuity of experiencing the same content. Accordingly, in some examples, when shared content (e.g., shared application window 630) is displayed in the shared three-dimensional environment, if one of the electronic devices changes states (e.g., due to the display of the shared content in the full-screen mode as discussed above), the electronic device transmits an indication to the other electronic devices that prompts user input for synchronizing the display of the shared content.

As an example, as shown in FIG. 6E, when the user of the first electronic device 660 is grouped into the second spatial group 649 within the multi-user communication session, the first electronic device 660 transmits an indication (e.g., directly or indirectly, such as via a communication network or server) to the second electronic device 670 and the third electronic device (not shown) for joining the user of the first electronic device 660 in viewing the video content of the application window 630 in full-screen. In some examples, in response to receiving the indication transmitted from the first electronic device 660, the second electronic device 670 (and the third electronic device) displays a notification element 620 in the three-dimensional environment 650B corresponding to an invitation for viewing the video content in the full-screen mode. For example, as shown in FIG. 6E, the notification element 620 includes a first option 621 that is selectable to cause the second electronic device 670 to display the video content of the application window 630 in the full-screen mode, and a second option 622 that is selectable to cause the second electronic device 670 to close the notification element 620 (and continue displaying the application window 630 as shown in FIG. 6E). In some examples, the notification element 620 is alternatively displayed in the three-dimensional environment 650B. For example, the notification element 620 may be displayed over the two-dimensional representation 627 corresponding to the user of the first electronic device 660 and/or may be displayed as a message within the two-dimensional representation 627 (e.g., "Join me in viewing the content in full-screen") that includes the selectable options 621 and 622.

As shown in FIG. 6E, the user of the second electronic device 670 is optionally providing a selection input 672C directed to the first option 621 in the notification element 634 in three-dimensional environment 650B. For example, the second electronic device 670 optionally detects a pinch input, touch or tap input, verbal command, or some other direct or indirect input while the gaze of the user of the second electronic device 670 is directed to the first option 621. In some examples, the user of the third electronic device does not join in viewing the video content in the application window 630 in the full-screen mode. For example, the third electronic device (not shown) receives a selection input directed to the second option 622 in the notification element 620 displayed at the third electronic device.

In some examples, in response to detecting the selection input 672C, the second electronic device 670 optionally presents the video content of the application window 630 in the full-screen mode in the three-dimensional environment 650B, as shown in FIG. 6F. For example, as similarly described above, the second electronic device 670 may increase the size of the application window 630 in the three-dimensional environment 650B such that the video content is displayed with a greater degree of visual prominence in the three-dimensional environment 650B. Additionally, as discussed above, the second electronic device 670 may dock the application window 630 (e.g., positions the application window at a fixed location (e.g., a central location)) in the three-dimensional environment 650B (e.g., such that the application window 630 is no longer movable in the three-dimensional environment 650B while the full-screen mode is active). Additionally, in some examples, when presenting the video content in the full-screen mode, the second electronic device 670 may visually deemphasize the representations of the captured portions of the physical environment surrounding the second electronic device 670. For example, as shown in FIG. 6F, the representation of the coffee table 608', the representation of the floor lamp 607' and the representations of the floor, ceiling, and walls surrounding the second electronic device 670 may be visually deemphasized (e.g., faded, darkened, or adjusted to be translucent or transparent) in the three-dimensional environment 650B such that attention is drawn predominantly to the video content of the application window 630 in the full-screen mode.

In some examples, when the second electronic device 670 displays the video content of the application window 630 in the full-screen mode in the three-dimensional environment 650B, the user of the second electronic device 670 joins the user of the first electronic device 660 in the second spatial group 649, as shown in FIG. 6F. For example, because both the first electronic device 660 and the second electronic device 670 are displaying the video content in the full-screen mode, the electronic devices 660/670 are operating in the same state and are thus grouped into the same spatial group within the multi-user communication session, as previously discussed herein. Additionally, as shown in FIG. 6F, the user of the first electronic device 660 (e.g., represented by the oval 617 in the circle 649) and the user of the second electronic device 670 (e.g., represented by the oval 615 in the circle 649) are arranged in a new spatial arrangement (e.g., spatial template) within the second spatial group 649. For example, as shown in the circle 649 in FIG. 6F, the user of the first electronic device 660 (e.g., represented by the oval 617) is shifted to the right in the second spatial group 649 to account for the placement of the user of the second electronic device 670 (e.g., represented by the oval 615) in the second spatial group 649. As mentioned previously above, the user of the third electronic device (not shown) optionally does not accept the invitation from the user of the first electronic device 660 to join the view of the video content in the full-screen mode. Accordingly, the third electronic device is operating in a different state from the first electronic device 660 and the second electronic device 670, which causes the user of the third electronic device (e.g., represented by the oval 619 in the circle 640) to remain in the first spatial group 640. Further, as shown in FIG. 6F, the user of the third electronic device is arranged in a new spatial arrangement within the first spatial group 640. For example, as shown in the circle 640 in FIG. 6F, the user of the third electronic device is positioned centrally within the first spatial group 640 relative to the application window 630.

Additionally, in some examples, as previously described herein, when the user of the second electronic device 670 joins the user of the first electronic device 660 in the second spatial group 649 as shown in FIG. 6F, the electronic devices 660/670 redisplay the avatars 615/617 in the three-dimensional environments 650A/650B. For example, as shown in FIG. 6F, the first electronic device 660 ceases display of the two-dimensional representation 625 and redisplays the avatar 615 corresponding to the user of the second electronic device 670 in the three-dimensional environment 650A based on the spatial arrangement of the second spatial group 649 (e.g., the avatar 615 is displayed to the left of the viewpoint of the user of the first electronic device 660). Similarly, as shown, the second electronic device 670 ceases display of the two-dimensional representation 627 and redisplays the avatar 617 corresponding to the user of the first electronic device 660 in the three-dimensional environment 650B based on the spatial arrangement of the second spatial group 649 (e.g., the avatar 617 is displayed to the right of the viewpoint of the user of the second electronic device 670). Additionally, because the user of the second electronic device 670 and the user of the third electronic device (not shown) are no longer in the same spatial group (e.g., spatial group 640), the second electronic device 670 ceases display of the avatar 619 corresponding to the user of the third electronic device in the three-dimensional environment 650B. For example, as shown in FIG. 6F, the second electronic device 670 displays a two-dimensional representation 629 corresponding to the user of the third electronic device (e.g., in the predefined region of the display of the second electronic device 670). Additionally, when the avatar 619 ceases to be displayed in the three-dimensional environment 650B at the second electronic device 670, the second electronic device 670 maintains the presentation of the audio of the user of the third electronic device, as indicated by audio bubble 616. However, in some examples, the audio of the user of the third electronic device may no longer be spatialized and may instead be presented in mono or stereo, as similarly discussed above. In other examples, the audio of the user of the third electronic device may be spatialized such that the audio appears to emanate from the two-dimensional representation 629.

In some examples, rather than display a notification (e.g., such as notification element 620) corresponding to an invitation from the first electronic device 660 to join in viewing the video content of the application window 630 in the full-screen mode as discussed above with reference to FIG. 6E, the electronic devices in the multi-user communication session may implement an "auto-follow" behavior to maintain the users in the multi-user communication session within the same spatial group. For example, when the user of the first electronic device 660 is grouped into the second spatial group 649 in response to the display of the video content of the application window 630 in the full-screen mode in FIG. 6B, the first electronic device 660 may transmit (e.g., directly or indirectly) to the second electronic device 670 and the third electronic device (not shown) one or more commands for causing the second electronic device 670 and the third electronic device to auto-follow the first electronic device 660. As shown in FIG. 6G, in response to receiving the one or more commands transmitted by the first electronic device 660, the second electronic device 670 and the third electronic device display the video content of the application window 630 in the full-screen mode, as discussed above.

In some examples, as similarly described above, when the second electronic device 670 and the third electronic device (not shown) join the first electronic device 660 in viewing the video content in the full-screen mode as shown in FIG. 6G, the users of the three electronic devices are grouped into the same spatial group within the multi-user communication session once again. For example, as shown in FIG. 6G, because the first electronic device 660, the second electronic device 670, and the third electronic device (not shown) are displaying the video content in the full-screen mode, the three electronic devices are operating in the same state and are thus grouped into the same spatial group (e.g., spatial group 649) within the multi-user communication session, as previously discussed herein. Additionally, as shown in FIG. 6G, the user of the first electronic device 660 (e.g., represented by the oval 617 in the circle 649), the user of the second electronic device 670 (e.g., represented by the oval 615 in the circle 649), and the user of the third electronic device (e.g., represented by the oval 619 in the circle 649) are arranged in a new spatial arrangement (e.g., spatial template) within the second spatial group 649 (e.g., compared to the spatial arrangement shown in FIG. 6B). For example, as shown in the circle 649 in FIG. 6G, the user of the first electronic device 660 (e.g., represented by the oval 617) is shifted to the right in the second spatial group 649 to account for the placement of the user of the second electronic device 670 (e.g., represented by the oval 615) and the user of the third electronic device (e.g., represented by the oval 619) in the second spatial group 649.

Additionally, in some examples, as previously described herein, when the user of the second electronic device 670 and the user of the third electronic device (not shown) join the user of the first electronic device 660 in the second spatial group 649 as shown in FIG. 6G, the three electronic devices redisplay the avatars 615/617/619 in the three-dimensional environments 650A/650B. For example, as shown in FIG. 6G, the first electronic device 660 ceases display of the two-dimensional representations 625/629 (e.g., from FIG. 6B) and redisplays the avatar 615 corresponding to the user of the second electronic device 670 and the avatar 619 corresponding to the user of the third electronic device in the three-dimensional environment 650A based on the spatial arrangement of the second spatial group 649 (e.g., the avatars 615/619 are displayed to the left of the viewpoint of the user of the first electronic device 660). Similarly, as shown, the second electronic device 670 ceases display of the two-dimensional representation 627 (e.g., from FIG. 6B) and redisplays the avatar 617 corresponding to the user of the first electronic device 660 with the avatar 619 corresponding to the user of the third electronic device in the three-dimensional environment 650B based on the spatial arrangement of the second spatial group 649 (e.g., the avatars 617/619 are displayed to the right of the viewpoint of the user of the second electronic device 670). Thus, as one advantage, the disclosed method provides for a shared and unobscured viewing experience for multiple users in a communication session while enabling individual user-interactions with the content in the three-dimensional environment.

It is understood that the examples shown and described herein are merely exemplary and that additional and/or alternative elements may be provided within the three-dimensional environment for interacting with the illustrative content. It should be understood that the appearance, shape, form and size of each of the various user interface elements and objects shown and described herein are exemplary and that alternative appearances, shapes, forms and/or sizes may be provided. For example, the virtual objects representative of application windows (e.g., virtual objects 330, 430, 535 and 630) may be provided in an alternative shape than a rectangular shape, such as a circular shape, triangular shape, etc. In some examples, the various selectable options (e.g., the option 523A, the options 511 and 513, the option 626, and/or the options 621 and 622), user interface elements (e.g., user interface element 516 or user interface element 620), control elements (e.g., playback controls 556 or 656), etc. described herein may be selected verbally via user verbal commands (e.g., "select option" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

FIG. 7 illustrates a flow diagram illustrating an example process for displaying content in a spatial group within a multi-user communication session according to some examples of the disclosure. In some examples, process 700 begins at a first electronic device in communication with a display, one or more input devices, and a second electronic device. In some examples, the first electronic device and the second electronic device are optionally a head-mounted display, respectively, similar or corresponding to device 200 of FIG. 2. As shown in FIG. 7, in some examples, at 702, while in a communication session with the second electronic device (e.g., such as second electronic device 370 in FIG. 3), the first electronic device (e.g., such as first electronic device 360 in FIG. 3) displays, via the display (e.g., a display of the first electronic device), a computer-generated environment (e.g., such as three-dimensional environment 350A in FIG. 3) including an avatar corresponding to a user of the second electronic (e.g., such as avatar 315 corresponding to the user of the second electronic device 370, as shown in FIG. 3). In some examples, the avatar corresponding to the user of the second electronic device may be provided with an audio effect (e.g., spatial audio) corresponding to a voice of the user of the second electronic device. In some examples, an avatar corresponding to a user of the first electronic device may be displayed in the first computer-generated environment at the second electronic device (e.g., such as avatar 317 corresponding to the user of the first electronic device 360, as shown in FIG. 3). In some examples, the avatar corresponding to the user of the first electronic device may be provided with an audio effect (e.g., spatial audio) corresponding to a voice of the user of the first electronic device. In some examples, the user of the first electronic device and the user of the second electronic device are in a first spatial group (e.g., such as spatial group 340) in the communication session.

As shown in FIG. 7, in some examples, at 704, while displaying the computer-generated environment including the avatar corresponding to the user of the second electronic device, the first electronic device receives, via the one or more input devices, a first input corresponding to a request to display content in the computer-generated environment. For example, as similarly shown in FIG. 5A, the second electronic device 570 receives a selection input 572A directed to selectable option 523A for causing display of content in the three-dimensional environment 550B at the second electronic device 570. In some examples, at 706, in response to receiving the first input, at 708, in accordance with a determination that the content is a first type of content (e.g., such as private immersive (three-dimensional) content), at 710, the first electronic device displays, via the display, a first object corresponding to the content in the computer-generated environment. For example, as shown in FIG. 5C, in response to receiving the selection input 572A, the second electronic device 570 displays immersive content 552 in the three-dimensional environment 550B. In some examples, the user of the first electronic device becomes associated with a different spatial group from the user of the second electronic device when the first object is displayed.

Additionally, in some examples, at 712, the first electronic device replaces display of the avatar corresponding to the user of the second electronic device with a two-dimensional representation of the user of the second electronic device. For example, as shown in FIG. 5C, the second electronic device 570 replaces display of the avatar 517 corresponding to the user of the first electronic device 560 with a two-dimensional representation 527 that includes an image, video, or other rendering representative of the user of the first electronic device 560. In some examples, at 714, in accordance with a determination that the content is a second type of content (e.g., such as shared content), different from the first type of content, the first electronic device concurrently displays, via the display, the first object corresponding to the content and the avatar corresponding to the user of the second electronic device in the computer-generated environment. For example, as shown in FIG. 6A, the first electronic device 660 displays an application window 630 that is displaying video content in the three-dimensional environment 650A while maintaining display of the avatar 615 corresponding to the user of the second electronic device 670. In some examples, the user of the first electronic device and the user of the second electronic device remain in the first spatial group (e.g., such as spatial group 640) in the communication session. In some examples, the audio corresponding to the voice of the user of the second electronic device continues to be presented at the first electronic device when the avatar corresponding to the user of the second electronic device is replaced with the two-dimensional representation (e.g., such as the presentation of audio, represented by audio bubble 512, corresponding to the voice of the user of the first electronic device 560, as shown in FIG. 5B). In some examples, the audio corresponding to the voice of the user of the second electronic device optionally changes from spatial audio to non-spatial audio (e.g., mono or stereo audio).

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

Figure 8:
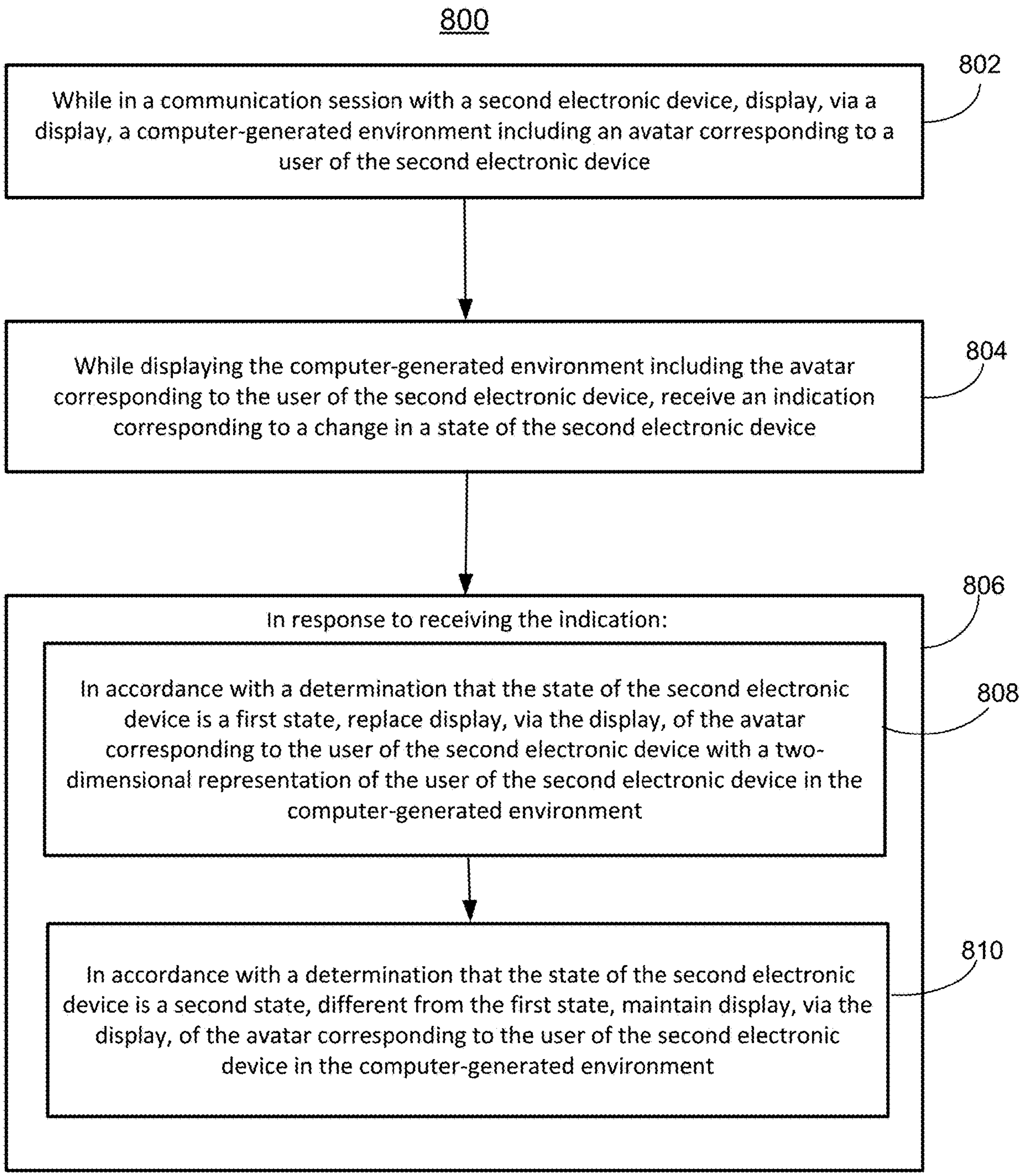
FIG. 8 illustrates a flow diagram illustrating an example process for changing spatial groups within a multi-user communication session according to some examples of the disclosure.

FIG. 8 illustrates a flow diagram illustrating an example process for changing spatial groups within a multi-user communication session according to some examples of the disclosure. In some examples, process 800 begins at a first electronic device in communication with a display, one or more input devices, and a second electronic device. In some examples, the first electronic device and the second electronic device are optionally a head-mounted display, respectively, similar or corresponding to device 200 of FIG. 2. As shown in FIG. 8, in some examples, at 802, while in a communication session with the second electronic device, the first electronic device displays, via the display, a computer-generated environment including an avatar corresponding to a user of the second electronic device. For example, as similarly shown in FIG. 3, the first electronic device 360 displays a three-dimensional environment 350A that includes an avatar 315 corresponding to the user of the second electronic device 370. In some examples, the avatar corresponding to the user of the first electronic device may be provided with an audio effect (e.g., spatial audio) corresponding to a voice of the user of the first electronic device. In some examples, the user of the first electronic device and the user of the second electronic device are in a first spatial group (e.g., such as spatial group 340) in the communication session.

In some examples, at 804, while displaying the computer-generated environment including the avatar corresponding to the user of the second electronic device, the first electronic device receives an indication corresponding to a change in a state of the second electronic device. For example, as described with reference to FIG. 4C, the second electronic device 470 receives an indication from the first electronic device 460 that the first electronic device 460 has activated an audio mode. Alternatively, as described with reference to FIG. 5B, the first electronic device 560 receives an indication from the second electronic device 570 has displayed immersive content 552 in the three-dimensional environment 550B. Alternatively, as described with reference to FIG. 6B, the second electronic device 670 receives an indication from the first electronic device 560 that the first electronic device 560 has displayed shared video content in a full-screen mode in the three-dimensional environment 650A.

In some examples, at 806, in response to receiving the indication, at 808, in accordance with a determination that the state of the second electronic device is a first state, the first electronic device replaces display, via the display, of the avatar corresponding to the user of the second electronic device with a two-dimensional representation of the user of the second electronic device in the computer-generated environment. For example, as shown in FIG. 5B, in response to receiving the indication that the second electronic device 570 is displaying the immersive content 552 in the three-dimensional environment 550B, the first electronic device 560 replaces display of the avatar 515 corresponding to the user of the second electronic device 570 with a two-dimensional representation 525 in the three-dimensional environment 550A. In some examples, the user of the first electronic device becomes associated with a different spatial group from the user of the second electronic device when the avatar ceases to be displayed. In some examples, the audio corresponding to the voice of the user of the second electronic device continues to be presented at the first electronic device when the avatar corresponding to the user of the second electronic device is replaced with the two-dimensional representation (e.g., such as the presentation of audio, represented by audio bubble 514, corresponding to the voice of the user of the second electronic device 570, as shown in FIG. 5B). In some examples, the audio corresponding to the voice of the user of the second electronic device optionally changes from spatial audio to non-spatial audio (e.g., mono or stereo audio).

In some examples, at 810, in accordance with a determination that the state of the second electronic device is a second state, different from the first state, the first electronic device maintains display, via the display, of the avatar corresponding to the user of the second electronic device in the computer-generated environment. For example, as shown in FIG. 6F, while the first electronic device 660 is displaying the shared video content in the full-screen mode in the three-dimensional environment 650A, in response to receiving the indication that the second electronic device 670 is also displaying the shared video content in the full-screen mode in the three-dimensional environment 650B, the first electronic device 660 maintains display of the avatar 615 corresponding to the user of the second electronic device 670. In some examples, the user of the first electronic device and the user of the second electronic device remain in the first spatial group (e.g., such as spatial group 649) in the communication session.

It is understood that process 800 is an example and that more, fewer, or different operations can be performed in the same or in a different order. Additionally, the operations in process 800 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at a first electronic device in communication with a display, one or more input devices, and a second electronic device: while in a communication session with the second electronic device, displaying, via the display, a computer-generated environment including an avatar corresponding to a user of the second electronic device; while displaying the computer-generated environment including the avatar corresponding to the user of the second electronic device, receiving, via the one or more input devices, a first input corresponding to a request to display content in the computer-generated environment; and in response to receiving the first input, in accordance with a determination that the content is a first type of content, displaying, via the display, a first object corresponding to the content in the computer-generated environment and replacing display of the avatar corresponding to the user of the second electronic device with a two-dimensional representation of the user of the second electronic device, and in accordance with a determination that the content is a second type of content, different from the first type of content, concurrently displaying, via the display, the first object corresponding to the content and the avatar corresponding to the user of the second electronic device in the computer-generated environment.

Additionally or alternatively, in some examples, the first electronic device and the second electronic device are a head-mounted display, respectively. Additionally or alternatively, in some examples, the first type of content includes content that is private to a user of the first electronic device. Additionally or alternatively, in some examples, the first object is a private application window associated with an application operating on the first electronic device. Additionally or alternatively, in some examples, the first object is a three-dimensional immersive environment. Additionally or alternatively, in some examples, the second type of content includes content that is shared between a user of the first electronic device and the user of the second electronic device. Additionally or alternatively, in some examples, the first object is a shared application window associated with an application operating on the first electronic device. Additionally or alternatively, in some examples, before receiving the first input, a user of the first electronic device and the user of the second electronic device are in a first spatial group within the communication session and while in the first spatial group, content is displayed at a predetermined location relative to a location of the avatar corresponding to the second electronic device and a location of a viewpoint of the user of the first electronic device in the computer-generated environment.

Additionally or alternatively, in some examples, the method further comprises, in response to receiving the first input, in accordance with the determination that the content is the first type of content, associating the user of the first electronic device with a second spatial group, separate from the first spatial group, within the communication session and displaying the first object corresponding to the content at a second predetermined location, different from the predetermined location, relative to the location of the viewpoint of the user of the first electronic device in the computer-generated environment. Additionally or alternatively, in some examples, the method further comprises, in response to receiving the first input, in accordance with the determination that the content is the second type of content, maintaining the user of the first electronic device and the user of the second electronic device in the first spatial group within the communication session and displaying the first object corresponding to the content at the predetermined location in the computer-generated environment. Additionally or alternatively, in some examples, the method further comprises, while displaying the computer-generated environment including the avatar corresponding to the user of the second electronic device and the first object corresponding to the content of the second type, receiving, via the one or more input devices, a second input corresponding to a request to display the content in a full screen mode in the computer-generated environment and in response to receiving the second input, displaying, via the display, the content in the full screen mode in the computer-generated environment.

Additionally or alternatively, in some examples, the method further comprises, in response to receiving the second input, replacing display of the avatar corresponding to the user of the second electronic device with the two-dimensional representation of the user of the second electronic device. Additionally or alternatively, in some examples, the avatar corresponding to the user of the second electronic device is displayed at a first location in the computer-generated environment before the second input is received and the two-dimensional representation of the user of the second electronic device is displayed in a predetermined region of the display that is separate from the first location in the computer-generated environment in response to receiving the second input. Additionally or alternatively, in some examples, the method further comprises, while displaying the computer-generated environment including the avatar corresponding to the user of the second electronic device, receiving, via the one or more input devices, a second input corresponding to a request to activate an audio output mode and, in response to receiving the second input, replacing display of the avatar corresponding to the user of the second electronic device with the two-dimensional representation of the user of the second electronic device. Additionally or alternatively, in some examples, the method further comprises, in response to receiving the second input, presenting audio corresponding to a voice of the user of the second electronic device.

Additionally or alternatively, in some examples, the avatar corresponding to the user of the second electronic device is displayed at a first location in the computer-generated environment before the second input is received and the two-dimensional representation of the user of the second electronic device is displayed at the first location in response to receiving the second input. Additionally or alternatively, in some examples, the method further comprises, while displaying the computer-generated environment including the two-dimensional representation of the user of the second electronic device and the first object corresponding to the content of the first type, receiving, via the one or more input devices, a second input corresponding to a request to move the first object in the computer-generated environment and, in response to receiving the second input, moving the first object corresponding to the content within the computer-generated environment in accordance with the second input, without moving the two-dimensional representation of the user of the second electronic device. Additionally or alternatively, in some examples, the method further comprises, while displaying the computer-generated environment including the two-dimensional representation of the user of the second electronic device and the first object corresponding to the content of the first type, receiving, via the one or more input devices, a second input corresponding to a request to cease display of the content in the computer-generated environment and, in response to receiving the second input, ceasing display of the first object corresponding to the content in the computer-generated environment and replacing display of the two-dimensional representation of the user of the second electronic device with the avatar corresponding to the user of the second electronic device.

Additionally or alternatively, in some examples, the method further comprises, in response to receiving the first input, in accordance with the determination that the content is the first type of content, transmitting, to the second electronic device, an indication of the display of the first object corresponding to the content in the computer-generated environment. Additionally or alternatively, in some examples, the avatar corresponding to the user of the second electronic device is displayed at a first location in the computer-generated environment before the first input is received and, in accordance with the determination that the content is the first type of content, the two-dimensional representation of the user of the second electronic device is displayed at the first location in response to receiving the first input. Additionally or alternatively, in some examples, the first electronic device is further in communication with a third electronic device and the computer-generated environment further includes a respective shared object before the first input is received. In some examples, the method further comprises, in response to receiving the first input, in accordance with the determination that the content is the first type of content, ceasing display of the respective shared object in the computer-generated environment and, in accordance with the determination that the content is the second type of content, concurrently displaying the first object corresponding to the content, the respective shared object, and the avatar corresponding to the user of the second electronic device in the computer-generated environment.

Some examples of the disclosure are directed to a method comprising, at a first electronic device in communication with a display, one or more input devices, and a second electronic device: while in a communication session with the second electronic device, displaying, via the display, a computer-generated environment including an avatar corresponding to a user of the second electronic device; while displaying the computer-generated environment including the avatar corresponding to the user of the second electronic device, receiving an indication corresponding to a change in a state of the second electronic device; and in response to receiving the indication, in accordance with a determination that the state of the second electronic device is a first state, replacing display, via the display, of the avatar corresponding to the user of the second electronic device with a two-dimensional representation of the user of the second electronic device in the computer-generated environment and, in accordance with a determination that the state of the second electronic device is a second state, different from the first state, maintaining display, via the display, of the avatar corresponding to the user of the second electronic device in the computer-generated environment.

Additionally or alternatively, in some examples, the first electronic device and the second electronic device are a head-mounted display, respectively. Additionally or alternatively, in some examples, the method further comprises, in response to receiving the indication, in accordance with the determination that the state of the second electronic device is the first state, presenting audio corresponding to a voice of the user of the second electronic device. Additionally or alternatively, in some examples, the avatar corresponding to the user of the second electronic device is displayed at a first location in the computer-generated environment before the indication is received and, in response to receiving the indication, in accordance with the determination that the state of the second electronic device is the first state, the two-dimensional representation of the user of the second electronic device is displayed at the first location. Additionally or alternatively, in some examples, the computer-generated environment further includes a first shared object before the indication is received. In some examples, the method further comprises, in response to receiving the indication, in accordance with the determination that the state of the second electronic device is a third state, different from the first state and the second state, maintaining display, via the display, of the first shared object in the computer-generated environment and replacing display of the avatar corresponding to the user of the second electronic device with the two-dimensional representation of the user of the second electronic device in the computer-generated environment, wherein the two-dimensional representation of the user is displayed adjacent to the first shared object in the computer-generated environment.

Additionally or alternatively, in some examples, receiving the indication corresponding to the change in the state of the second electronic device includes receiving data corresponding to a change in the display of the avatar corresponding to the user of the second electronic device in the computer-generated environment or receiving data corresponding to presentation of audio corresponding to a voice of the user of the second electronic device. Additionally or alternatively, in some examples, receiving the indication corresponding to the change in the state of the second electronic device includes receiving data corresponding to a change in display of content that is private to the user of the second electronic device in a computer-generated environment displayed at the second electronic device. Additionally or alternatively, in some examples, receiving the indication corresponding to the change in the state of the second electronic device includes receiving data corresponding to a request to display content that is shared by the user of the second electronic device in the computer-generated environment. Additionally or alternatively, in some examples, the computer-generated environment further includes a first shared object before the indication is received, and receiving the indication corresponding to the change in the state of the second electronic device includes receiving data corresponding to a change in display of the first shared object in a computer-generated environment displayed at the second electronic device.

Additionally or alternatively, in some examples, the determination that the state of the second electronic device is the first state is in accordance with a determination that a user of the first electronic device and the user of the second electronic device are in different spatial groups within the communication session and the determination that the state of the second electronic device is the second state is in accordance with a determination that the user of the first electronic device and the user of the second electronic device are in a same spatial group within the communication session. Additionally or alternatively, in some examples, the determination that the user of the first electronic device and the user of the second electronic device are in different spatial groups within the communication session is in accordance with a determination that the first electronic device and the second electronic device have different communication session tokens and the determination that the user of the first electronic device and the user of the second electronic device are in the same spatial group within the communication session is in accordance with a determination that the first electronic device and the second electronic device share a same communication session token. Additionally or alternatively, in some examples, the determination that the user of the first electronic device and the user of the second electronic device are in different spatial groups within the communication session is in accordance with a determination that the first electronic device and the second electronic device are associated with different environment identifiers and the determination that the user of the first electronic device and the user of the second electronic device are in the same spatial group within the communication session is in accordance with a determination that the first electronic device and the second electronic device are associated with a same environment identifier.

Additionally or alternatively, in some examples, the determination that the user of the first electronic device and the user of the second electronic device are in different spatial groups within the communication session is in accordance with a determination that the first electronic device and the second electronic device are displaying a respective object in different manners and the determination that the user of the first electronic device and the user of the second electronic device are in the same spatial group within the communication session is in accordance with a determination that the first electronic device and the second electronic device are displaying the respective object in a same manner.

Some examples of the disclosure are directed to an electronic device comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising: one or more processors; memory; and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:

at a first electronic device in communication with a display, one or more input devices, and a second electronic device:

while in a communication session with the second electronic device, displaying, via the display, a computer-generated environment including an avatar corresponding to a user of the second electronic device;

while displaying the computer-generated environment including the avatar corresponding to the user of the second electronic device, receiving, via the one or more input devices, a first input corresponding to a request to display content in the computer-generated environment; and in response to receiving the first input:

in accordance with a determination that the content is a first type of content:

displaying, via the display, a first object corresponding to the content in the computer-generated environment; and replacing display of the avatar corresponding to the user of the second electronic device with a two-dimensional representation of the user of the second electronic device; and in accordance with a determination that the content is a second type of content, different from the first type of content, concurrently displaying, via the display, the first object corresponding to the content and the avatar corresponding to the user of the second electronic device in the computer-generated environment.

2. The method of claim 1, wherein:

the first type of content includes content that is private to a user of the first electronic device; and the second type of content includes content that is shared between the user of the first electronic device and the user of the second electronic device.

3. The method of claim 1, wherein, before receiving the first input:

a user of the first electronic device and the user of the second electronic device are in a first spatial group within the communication session;

while in the first spatial group, content is displayed at a predetermined location relative to a location of the avatar corresponding to the second electronic device and a location of a viewpoint of the user of the first electronic device in the computer-generated environment; and the method further comprises, in response to receiving the first input:

in accordance with the determination that the content is the first type of content:

associating the user of the first electronic device with a second spatial group, separate from the first spatial group, within the communication session; and displaying the first object corresponding to the content at a second predetermined location, different from the predetermined location, relative to the location of the viewpoint of the user of the first electronic device in the computer-generated environment.

4. The method of claim 3, further comprising:

in response to receiving the first input:

in accordance with the determination that the content is the second type of content:

maintaining the user of the first electronic device and the user of the second electronic device in the first spatial group within the communication session; and displaying the first object corresponding to the content at the predetermined location in the computer-generated environment.

5. The method of claim 1, further comprising:

while displaying the computer-generated environment including the avatar corresponding to the user of the second electronic device and the first object corresponding to the content of the second type, receiving, via the one or more input devices, a second input corresponding to a request to display the content in a full screen mode in the computer-generated environment; and in response to receiving the second input:

displaying, via the display, the content in the full screen mode in the computer-generated environment; and replacing display of the avatar corresponding to the user of the second electronic device with the two-dimensional representation of the user of the second electronic device.

6. The method of claim 1, further comprising:

while displaying the computer-generated environment including the avatar corresponding to the user of the second electronic device, receiving, via the one or more input devices, a second input corresponding to a request to activate an audio output mode; and in response to receiving the second input:

replacing display of the avatar corresponding to the user of the second electronic device with the two-dimensional representation of the user of the second electronic device; and presenting audio corresponding to a voice of the user of the second electronic device.

7. The method of claim 1, further comprising:

while displaying the computer-generated environment including the two-dimensional representation of the user of the second electronic device and the first object corresponding to the content of the first type, receiving, via the one or more input devices, a second input corresponding to a request to move the first object in the computer-generated environment; and in response to receiving the second input:

moving the first object corresponding to the content within the computer-generated environment in accordance with the second input, without moving the two-dimensional representation of the user of the second electronic device.

8. The method of claim 1, further comprising:

while displaying the computer-generated environment including the two-dimensional representation of the user of the second electronic device and the first object corresponding to the content of the first type, receiving, via the one or more input devices, a second input corresponding to a request to cease display of the content in the computer-generated environment; and in response to receiving the second input:

ceasing display of the first object corresponding to the content in the computer-generated environment; and replacing display of the two-dimensional representation of the user of the second electronic device with the avatar corresponding to the user of the second electronic device.

9. A first electronic device comprising:

one or more processors;

memory; and one or more programs stored in the memory and configured to be executed by the one or more processors, the one or more programs including instructions for performing a method comprising:

while in a communication session with a second electronic device, displaying, via a display, a computer-generated environment including an avatar corresponding to a user of the second electronic device;

while displaying the computer-generated environment including the avatar corresponding to the user of the second electronic device, receiving, via one or more input devices, a first input corresponding to a request to display content in the computer-generated environment; and in response to receiving the first input:

in accordance with a determination that the content is a first type of content:

displaying, via the display, a first object corresponding to the content in the computer-generated environment; and replacing display of the avatar corresponding to the user of the second electronic device with a two-dimensional representation of the user of the second electronic device; and in accordance with a determination that the content is a second type of content, different from the first type of content, concurrently displaying, via the display, the first object corresponding to the content and the avatar corresponding to the user of the second electronic device in the computer-generated environment.

10. The electronic device of claim 9, wherein:

the first type of content includes content that is private to a user of the first electronic device; and the second type of content includes content that is shared between the user of the first electronic device and the user of the second electronic device.

11. The electronic device of claim 10, wherein, before receiving the first input:

the user of the first electronic device and the user of the second electronic device are in a first spatial group within the communication session;

while in the first spatial group, content is displayed at a predetermined location relative to a location of the avatar corresponding to the second electronic device and a location of a viewpoint of the user of the first electronic device in the computer-generated environment; and the method further comprises, in response to receiving the first input:

in accordance with the determination that the content is the first type of content:

associating the user of the first electronic device with a second spatial group, separate from the first spatial group, within the communication session; and displaying the first object corresponding to the content at a second predetermined location, different from the predetermined location, relative to the location of the viewpoint of the user of the first electronic device in the computer-generated environment.

12. The electronic device of claim 11, wherein the method further comprises:

in response to receiving the first input:

in accordance with the determination that the content is the second type of content:

maintaining the user of the first electronic device and the user of the second electronic device in the first spatial group within the communication session; and displaying the first object corresponding to the content at the predetermined location in the computer-generated environment.

13. The electronic device of claim 9, wherein the method further comprises:

while displaying the computer-generated environment including the avatar corresponding to the user of the second electronic device and the first object corresponding to the content of the second type, receiving, via the one or more input devices, a second input corresponding to a request to display the content in a full screen mode in the computer-generated environment; and in response to receiving the second input:

displaying, via the display, the content in the full screen mode in the computer-generated environment; and replacing display of the avatar corresponding to the user of the second electronic device with the two-dimensional representation of the user of the second electronic device.

14. The electronic device of claim 9, wherein the method further comprises:

while displaying the computer-generated environment including the avatar corresponding to the user of the second electronic device, receiving, via the one or more input devices, a second input corresponding to a request to activate an audio output mode; and in response to receiving the second input:

replacing display of the avatar corresponding to the user of the second electronic device with the two-dimensional representation of the user of the second electronic device; and presenting audio corresponding to a voice of the user of the second electronic device.

15. The electronic device of claim 14, wherein the method further comprises:

while displaying the computer-generated environment including the two-dimensional representation of the user of the second electronic device and the first object corresponding to the content of the first type, receiving, via the one or more input devices, a second input corresponding to a request to move the first object in the computer-generated environment; and in response to receiving the second input:

moving the first object corresponding to the content within the computer-generated environment in accordance with the second input, without moving the two-dimensional representation of the user of the second electronic device.

16. The electronic device of claim 9, wherein the method further comprises:

while displaying the computer-generated environment including the two-dimensional representation of the user of the second electronic device and the first object corresponding to the content of the first type, receiving, via the one or more input devices, a second input corresponding to a request to cease display of the content in the computer-generated environment; and in response to receiving the second input:

ceasing display of the first object corresponding to the content in the computer-generated environment; and replacing display of the two-dimensional representation of the user of the second electronic device with the avatar corresponding to the user of the second electronic device.

17. A non-transitory computer readable storage medium storing one or more programs, the one or more programs comprising instructions, which when executed by one or more processors of a first electronic device, cause the first electronic device to perform a method comprising:

while in a communication session with a second electronic device, displaying, via a display, a computer-generated environment including an avatar corresponding to a user of the second electronic device;

while displaying the computer-generated environment including the avatar corresponding to the user of the second electronic device, receiving, via one or more input devices, a first input corresponding to a request to display content in the computer-generated environment; and in response to receiving the first input:

in accordance with a determination that the content is a first type of content:

displaying, via the display, a first object corresponding to the content in the computer-generated environment; and replacing display of the avatar corresponding to the user of the second electronic device with a two-dimensional representation of the user of the second electronic device; and in accordance with a determination that the content is a second type of content, different from the first type of content, concurrently displaying, via the display, the first object corresponding to the content and the avatar corresponding to the user of the second electronic device in the computer-generated environment.

18. The non-transitory computer readable storage medium of claim 17, wherein:
the first type of content includes content that is private to a user of the first electronic device; and
the second type of content includes content that is shared between the user of the first electronic device and the user of the second electronic device.

19. The non-transitory computer readable storage medium of claim 18, wherein, before receiving the first input:
the user of the first electronic device and the user of the second electronic device are in a first spatial group within the communication session;
while in the first spatial group, content is displayed at a predetermined location relative to a location of the avatar corresponding to the second electronic device and a location of a viewpoint of the user of the first electronic device in the computer-generated environment; and
the method further comprises, in response to receiving the first input:
in accordance with the determination that the content is the first type of content:
associating the user of the first electronic device with a second spatial group, separate from the first spatial group, within the communication session; and
displaying the first object corresponding to the content at a second predetermined location, different from the predetermined location, relative to the location of the viewpoint of the user of the first electronic device in the computer-generated environment.

20. The non-transitory computer readable storage medium of claim 19, wherein the method further comprises:
in response to receiving the first input:
in accordance with the determination that the content is the second type of content:
maintaining the user of the first electronic device and the user of the second electronic device in the first spatial group within the communication session; and
displaying the first object corresponding to the content at the predetermined location in the computer-generated environment.

21. The non-transitory computer readable storage medium of claim 17, wherein the method further comprises:
while displaying the computer-generated environment including the avatar corresponding to the user of the second electronic device and the first object corresponding to the content of the second type, receiving, via the one or more input devices, a second input corresponding to a request to display the content in a full screen mode in the computer-generated environment; and
in response to receiving the second input:
displaying, via the display, the content in the full screen mode in the computer-generated environment; and
replacing display of the avatar corresponding to the user of the second electronic device with the two-dimensional representation of the user of the second electronic device.

22. The non-transitory computer readable storage medium of claim 17, wherein the method further comprises:
while displaying the computer-generated environment including the avatar corresponding to the user of the second electronic device, receiving, via the one or more input devices, a second input corresponding to a request to activate an audio output mode; and
in response to receiving the second input:
replacing display of the avatar corresponding to the user of the second electronic device with the two-dimensional representation of the user of the second electronic device; and
presenting audio corresponding to a voice of the user of the second electronic device.

23. The non-transitory computer readable storage medium of claim 22, wherein the method further comprises:
while displaying the computer-generated environment including the two-dimensional representation of the user of the second electronic device and the first object corresponding to the content of the first type, receiving, via the one or more input devices, a second input corresponding to a request to move the first object in the computer-generated environment; and
in response to receiving the second input:
moving the first object corresponding to the content within the computer-generated environment in accordance with the second input, without moving the two-dimensional representation of the user of the second electronic device.

24. The non-transitory computer readable storage medium of claim 17, wherein the method further comprises:
while displaying the computer-generated environment including the two-dimensional representation of the user of the second electronic device and the first object corresponding to the content of the first type, receiving, via the one or more input devices, a second input corresponding to a request to cease display of the content in the computer-generated environment; and
in response to receiving the second input:
ceasing display of the first object corresponding to the content in the computer-generated environment; and
replacing display of the two-dimensional representation of the user of the second electronic device with the avatar corresponding to the user of the second electronic device.

* * * * *